US007318448B2

(12) United States Patent
Fleischer et al.

(10) Patent No.: US 7,318,448 B2
(45) Date of Patent: Jan. 15, 2008

(54) SWIMMING POOL CLEANING APPARATUS AND PARTS THEREFOR

(75) Inventors: Eric C. Fleischer, Rockville Centre, NY (US); Donald R. Davidson, Chatham, NJ (US); Bernhard Schaub, University Heights, OH (US); Melvyn L. Henkin, Ventura, CA (US); Jordan M. Laby, Ventura, CA (US)

(73) Assignees: H-Tech, Inc., Wilmington, DE (US); Henkin-Laby, LLC, Ventura, CA (US)

( * ) Notice: Subject to any disclaimer, the term of this patent is extended or adjusted under 35 U.S.C. 154(b) by 0 days.

(21) Appl. No.: 10/282,223

(22) Filed: Oct. 25, 2002

(65) Prior Publication Data

US 2003/0116203 A1 Jun. 26, 2003

Related U.S. Application Data

(60) Provisional application No. 60/335,288, filed on Nov. 30, 2001.

(51) Int. Cl.
*F16K 11/10* (2006.01)
(52) U.S. Cl. .................. 137/624.14; 137/883; 137/885; 137/544; 251/325; 251/251; 15/1.7
(58) Field of Classification Search .......... 137/624.14, 137/883, 885, 544; 251/324, 325, 251; 15/1.7; 210/167.2, 167.17, 242.1, 416.2
See application file for complete search history.

(56) References Cited

U.S. PATENT DOCUMENTS 1,095,281 A  5/1914  Kenney et al.

(Continued)

FOREIGN PATENT DOCUMENTS

JP  54-009457  1/1979

(Continued)

OTHER PUBLICATIONS

International Search Report of the International Searching Authority dated Oct. 25, 2005, issued in connection with International Patent Appln. No. PCT/US2005/025757.

(Continued)

*Primary Examiner*—Kevin Lee
(74) *Attorney, Agent, or Firm*—McCarter & English, LLP

(57) ABSTRACT

A swimming pool cleaning device includes a fluid distribution system for controlling its operation. More particularly, the distribution system includes a housing having an inlet for receiving a supply of pressurized fluid, a pair of outlet openings and a valve chamber positioned between the inlet and the outlet openings. A piston, including a valve member, is movably mounted in the housing so as to be movable between a first position, in which the valve member closes one of the outlet openings so as to divert pressurized fluid to the other one of the outlet openings, and a second position, in which the valve member closes the other one of the outlet openings so as to divert pressurized fluid to the one of the outlet openings. A valve is provided for controlling the movement of the piston between the first and second positions. The piston has a passage extending therethrough so as to permit flow of pressurized fluid from the valve chamber to the valve.

30 Claims, 42 Drawing Sheets

U.S. PATENT DOCUMENTS

| | | | |
|---|---|---|---|
| 1,163,818 A | 12/1915 | Hadden et al. |
| 2,039,741 A | 5/1936 | Richards |
| 2,290,626 A | 7/1942 | Bosomworth |
| 2,393,091 A | 1/1946 | De Lacy-Mulhall |
| 3,291,145 A | 12/1966 | Arneson |
| 3,319,654 A | 5/1967 | Faldi |
| 3,372,708 A | 3/1968 | Hotchkin |
| 3,494,376 A | 2/1970 | Doeringsfeld et al. |
| 3,561,326 A | 2/1971 | Cassaday |
| 3,667,502 A | 6/1972 | Otto |
| 3,931,740 A | 1/1976 | Carter |
| 4,022,239 A | 5/1977 | Schwindt et al. |
| 4,040,864 A | 8/1977 | Steeves |
| 4,086,933 A | 5/1978 | Pansini |
| 4,089,074 A | 5/1978 | Sermons |
| 4,140,634 A | 2/1979 | Harry |
| 4,385,639 A | 5/1983 | Holborow |
| 4,429,429 A | 2/1984 | Altschul |
| 4,522,221 A | 6/1985 | Chivens et al. |
| 4,558,479 A | 12/1985 | Greskovics et al. |
| 4,558,719 A | 12/1985 | Rinkewich |
| 4,575,423 A | 3/1986 | Alanis et al. |
| 4,589,986 A | 5/1986 | Greskovics et al. |
| 4,604,757 A | 8/1986 | Yokomatsu |
| 4,618,420 A | 10/1986 | Alanis |
| 4,739,789 A | 4/1988 | Hamilton |
| 4,746,424 A | 5/1988 | Drew |
| 4,768,532 A | 9/1988 | Johnson |
| 4,838,485 A | 6/1989 | Rinkewich |
| 4,856,913 A | 8/1989 | Campbell |
| 4,889,622 A | 12/1989 | Newcombe-Bond |
| 5,077,853 A | 1/1992 | Campbell |
| 5,143,605 A | 9/1992 | Masciarelli |
| 5,222,873 A | 6/1993 | Whitehead et al. |
| RE34,301 E | 7/1993 | Brooks |
| 5,264,122 A | 11/1993 | Lakotish |
| 5,278,749 A | 1/1994 | De Man |
| 5,279,728 A | 1/1994 | Weiss |
| 5,350,508 A | 9/1994 | Van der Watt |
| 5,381,823 A | 1/1995 | DiBartolo |
| 5,422,001 A | 6/1995 | Yagoda et al. |
| 5,452,747 A | 9/1995 | De Man |
| 5,454,940 A | 10/1995 | Lakotish |
| 5,542,451 A | 8/1996 | Foster |
| 5,682,846 A | 11/1997 | Scharnweber |
| 5,705,058 A | 1/1998 | Fischer |
| 5,779,894 A | 7/1998 | Martensson |
| 5,788,850 A | 8/1998 | Tuomey |
| 5,911,878 A | 6/1999 | Benvenuto et al. |
| 5,985,156 A | 11/1999 | Henkin et al. |
| 6,039,886 A * | 3/2000 | Henkin et al. ................ 15/1.7 |
| 6,063,270 A | 5/2000 | d'Offay |
| 6,074,553 A | 6/2000 | Haski |
| 6,090,219 A * | 7/2000 | Henkin et al. ................ 134/18 |
| 6,193,885 B1 | 2/2001 | Campbell |
| 6,280,611 B1 | 8/2001 | Henkin et al. |
| 6,365,039 B1 * | 4/2002 | Henkin et al. ................ 15/1.7 |
| 6,387,250 B1 * | 5/2002 | Henkin et al. ................ 15/1.7 |
| 6,412,133 B1 * | 7/2002 | Erlich et al. .................. 15/1.7 |
| 6,473,928 B1 * | 11/2002 | Veloskey et al. ...... 137/624.14 |
| 6,581,624 B1 | 6/2003 | Magami et al. |
| 6,601,255 B1 | 8/2003 | van der Meyden et al. |
| 6,652,742 B2 | 11/2003 | Henkin et al. |
| 6,685,843 B2 | 2/2004 | Leaverton |
| RE38,479 E | 3/2004 | Henkin et al. |
| 6,802,963 B2 | 10/2004 | Campbell |
| 2003/0082006 A1 | 5/2003 | Dreyer |
| 2004/0089593 A1 | 5/2004 | Campbell |
| 2005/0279682 A1 | 12/2005 | Davidson et al. |

FOREIGN PATENT DOCUMENTS

| | | |
|---|---|---|
| JP | 54-015365 | 5/1979 |
| JP | 54-056251 | 5/1979 |
| WO | WO 97/01689 A1 | 1/1997 |
| WO | WO 97/49504 A1 | 12/1997 |
| WO | WO 99/33582 | 7/1999 |
| WO | WO 99/34077 | 7/1999 |
| WO | WO 2005/001221 | 1/2005 |
| WO | WO 2006/014746 | 2/2006 |

OTHER PUBLICATIONS

Written Opinion of the International Searching Authority dated Oct. 25, 2005, issued in connection with International Patent Appln. No. PCT/US2005/025757.

* cited by examiner

| RELIEF VALVE 2240a | RELIEF VALVE 2240b | RELIEF VALVE 2254a | RELIEF VALVE 2254b | PISTON 2200 | PISTON 2202 | MODE |
| --- | --- | --- | --- | --- | --- | --- |
| OPEN | CLOSED | CLOSED | CLOSED | EXTENDED | RETRACTED | TOP MODE |
| OPEN | CLOSED | CLOSED | OPEN | EXTENDED | EXTENDED | SPIN-OUT MODE |
| OPEN | OPEN | CLOSED | CLOSED | EXTENDED | RETRACTED | TOP MODE |
| OPEN | OPEN | CLOSED | OPEN | RETRACTED | EXTENDED | SPIN-OUT MODE |
| CLOSED | CLOSED | OPEN | CLOSED | EXTENDED | EXTENDED | BOTTOM MODE |
| CLOSED | OPEN | OPEN | OPEN | EXTENDED | EXTENDED | SPIN-OUT MODE |
| CLOSED | OPEN | OPEN | CLOSED | EXTENDED | EXTENDED | SPIN-OUT MODE |
| CLOSED | CLOSED | OPEN | OPEN | RETRACTED | EXTENDED | BOTTOM MODE |

FIG. 24

SWIMMING POOL CLEANING APPARATUS AND PARTS THEREFOR

CROSS-REFERENCE TO RELATED APPLICATION

This is a non-provisional patent application relating to U.S. Provisional Patent Application No. 60/335,288 field Nov. 30, 2001

FIELD OF THE INVENTION

The present invention relates to swimming pool cleaning apparatus and components useful in connection therewith.

BACKGROUND OF THE INVENTION

U.S. Pat. Nos. 6,090,219 and 6,365,039 and International Patent Publication No. WO 99/33582 disclose swimming pool cleaners adapted to rise proximate to a water surface of a pool for removing floating debris therefrom and to descend proximate to a wall surface of the pool for removing debris therefrom (see also U.S. Pat. Nos. 6,039,886 and 6,387,250 and International Patent Publication No. WO 99/34077). These cleaners utilize fairly complicated and/or complex mechanisms for controlling their water surface cleaning and wall surface cleaning operations. Accordingly, there is a need for a pool cleaner equipped with an enhanced control mechanism for controlling the operation of the cleaner. There is also need for other improvements for enhancing the operation of the pool cleaner.

SUMMARY OF THE INVENTION

The present invention overcomes the disadvantages and shortcomings mentioned above by providing an improved swimming pool cleaning device having a fluid distribution system for controlling its operation. More particularly, the fluid distribution system includes a housing having an inlet for receiving a supply of pressurized fluid, a pair of outlet openings and a valve chamber positioned between the inlet and the outlet openings. The housing also includes a piston chamber positioned on one side thereof and having a first side, which is located adjacent the valve chamber and is in fluid communication with the valve chamber, and a second side, which is spaced outwardly from the first side. A piston is movably mounted in the piston chamber so as to be movable between a first position, in which the piston causes one of the outlet openings to be closed, and a second position, in which the piston causes another of the outlet openings to be closed. The piston also includes a first side, which is located adjacent the first side of the piston chamber and has a first size, and a second side, which is located adjacent the second side of the piston chamber and has a second size which is greater than the first size of the first side of the piston. The piston has a passage extending therethrough so as to permit flow of pressurized fluid from the valve chamber to the second side of the piston chamber. At least one valve is in fluid communication with the second side of the piston chamber such that when the valve is in a closed condition, the second side of the piston chamber is pressurized by pressurized fluid flowing from the valve chamber to the second side of the piston chamber through the passage of the piston so as to cause the piston to move to the first position and such that when the valve is in an open condition, the second side of the piston chamber is depressurized so as to cause the piston to move to the second position. In this manner, flow of pressurized fluid from the valve chamber to one of the outlet openings is selectively controlled by causing the valve to be in the open or closed condition.

BRIEF DESCRIPTION OF THE DRAWINGS

For a more complete understanding of the present invention, reference is made to the following detailed description of exemplary embodiments considered in conjunction with the accompanying drawings, in which:

FIG. 24 is a table summarizing the operation of the modified water distribution system shown in FIGS. 23A and 23B;

DETAILED DESCRIPTION OF THE EXEMPLARY EMBODIMENTS

Although the present invention can be used in conjunction with any type of pool cleaner, it is particularly suitable for use in connection with a pressure-type or positive pressure pool cleaner (i.e., a pool cleaner powered by a supply of pressurized fluid). Accordingly, the present invention will be described hereinafter in connection with such a pool cleaner. It should be understood, however, that the following description is only meant to be illustrative of the present invention and is not meant to limit the scope of the present invention, which has applicability to other types of pool cleaners.

Figure 1:
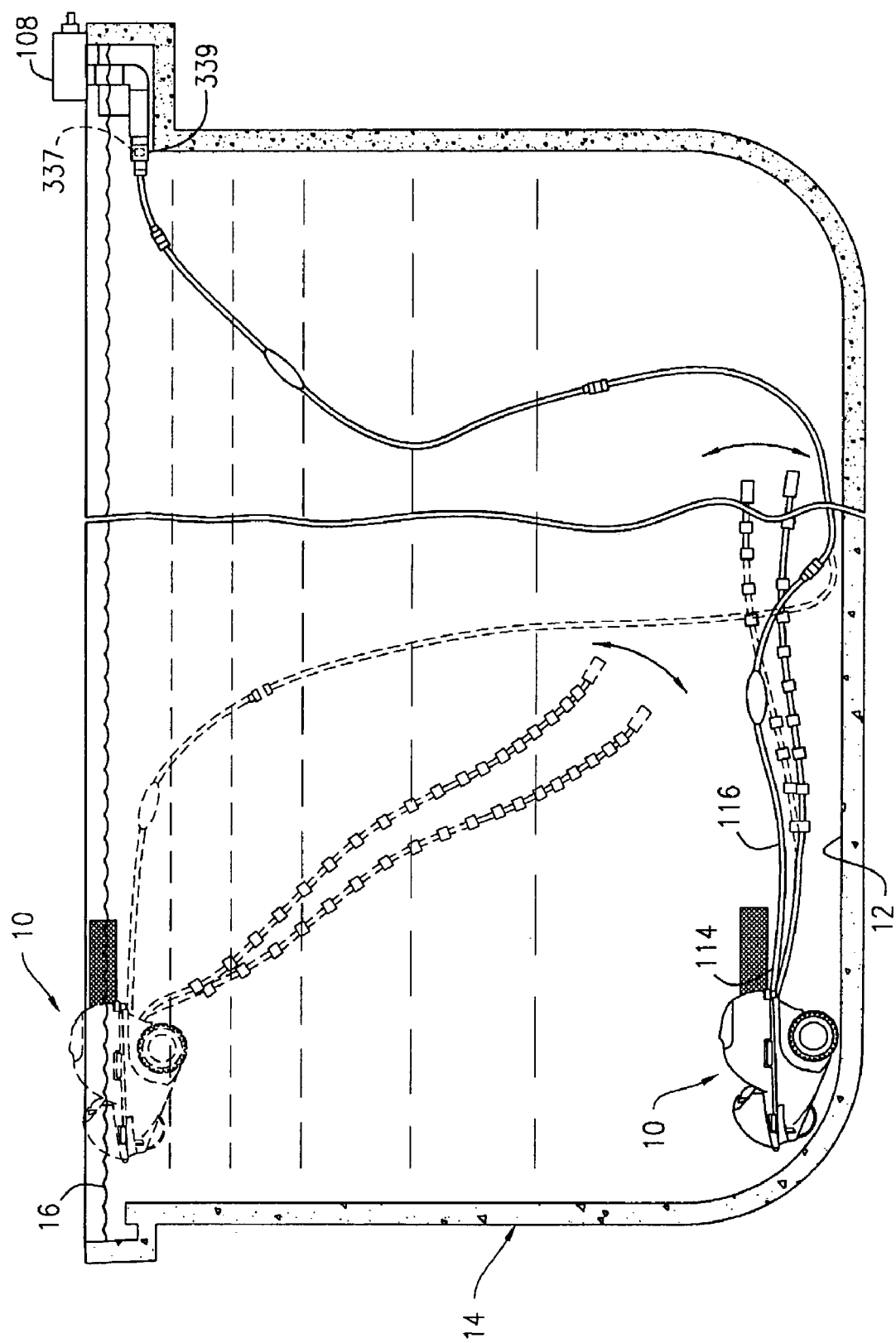
FIG. 1 is a schematic representation depicting the overall operation of a positive pressure pool cleaner constructed in accordance with a first exemplary embodiment of the present invention.
Figure 2:
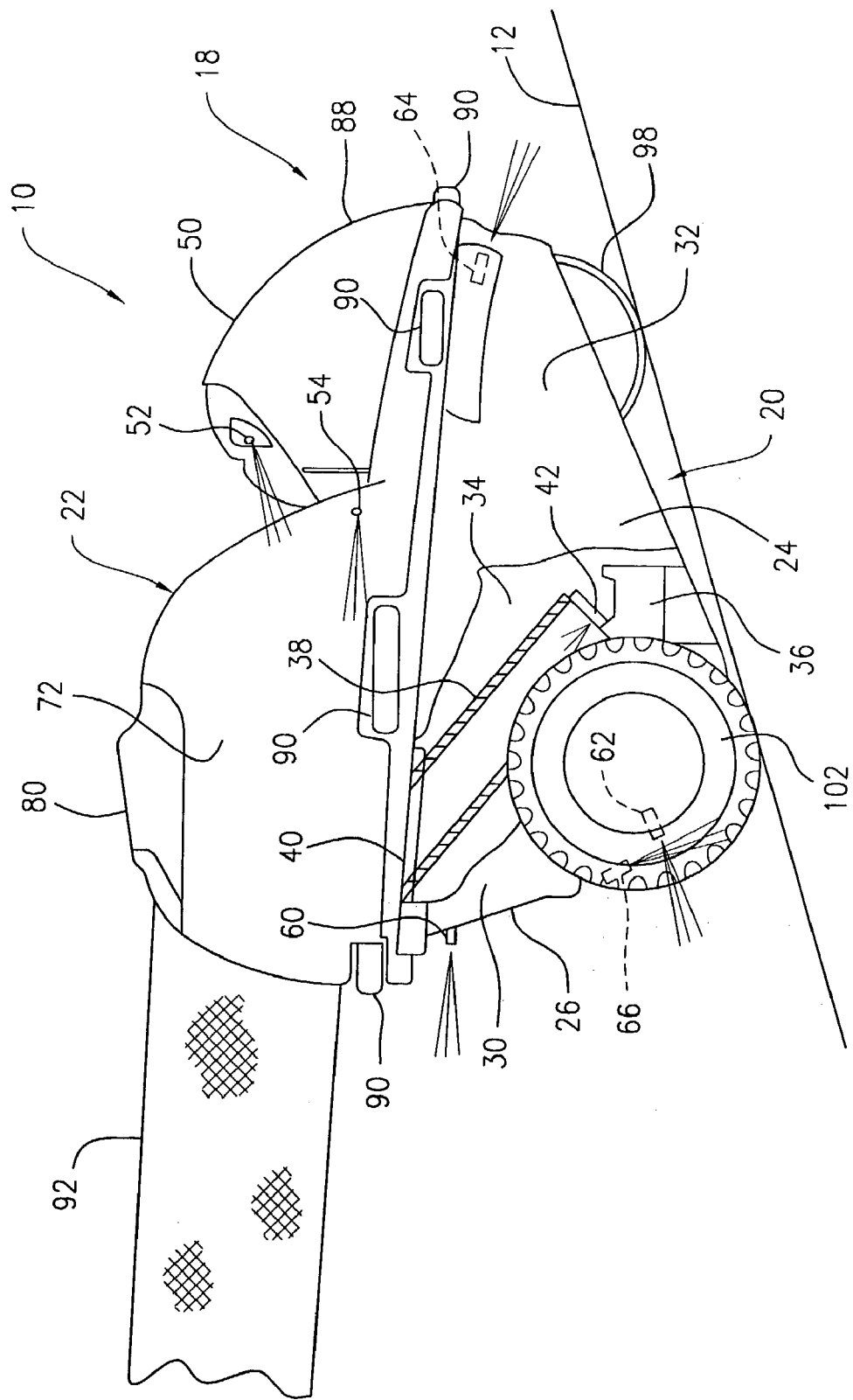
FIG. 2 is a side elevational view of the pool cleaner shown in FIG. 1.
Figure 2A:
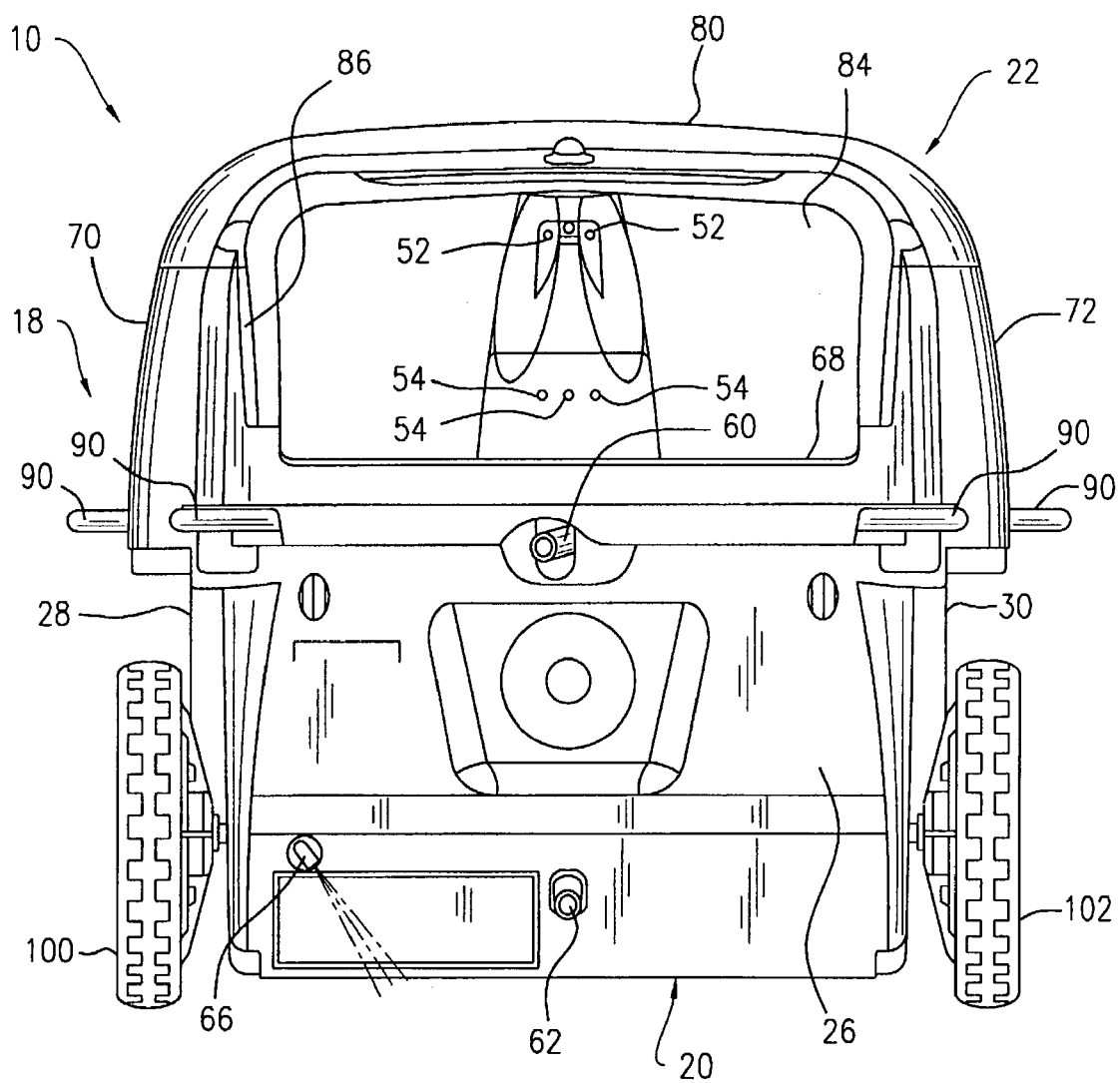
FIG. 2A is a rear elevational view of the pool cleaner shown in FIGS. 1 and 2.

Referring initially to FIGS. 1, 2 and 2A, there is shown a positive pressure swimming pool cleaner 10 constructed in accordance with a first embodiment of the present invention. Briefly, the cleaner 10 is adapted to operate in a manner similar to that of the cleaners disclosed in U.S. Pat. Nos. 6,090,219 and 6,365,039 and International Patent Publication No. WO 99/33582 (i.e., International Patent Application No. PCT/US98/27623), the disclosures of which are incorporated herein by reference. To facilitate consideration and discussion, the basic operation of the cleaner 10 will be discussed first, followed by a detailed discussion of its components.

With reference to FIG. 1, the cleaner 10 is adapted to clean an interior wall 12 of a swimming pool 14 and an upper surface 16 of a body of water contained therein. As a result, the cleaner 10, in typical operation, alternates between (1) a water surface cleaning mode (also referred to hereinafter as the "top mode"), in which it rises proximate to the water surface 16 for removing floating debris therefrom, and (2) a wall surface cleaning mode (also referred to hereinafter as the "bottom mode"), in which it descends proximate to the interior wall 12 of the swimming pool 14 to remove debris therefrom. The cleaner 10 is also adapted to periodically alternate to a spin-out mode or state from the bottom or top mode, in which the cleaner 10 spins away from the direction of its generally forward motion in an arcuate sideward path (see FIG. 16B) so as to prevent the cleaner 10 from being trapped by an obstruction (e.g., a corner of a swimming pool).

Figure 7A:
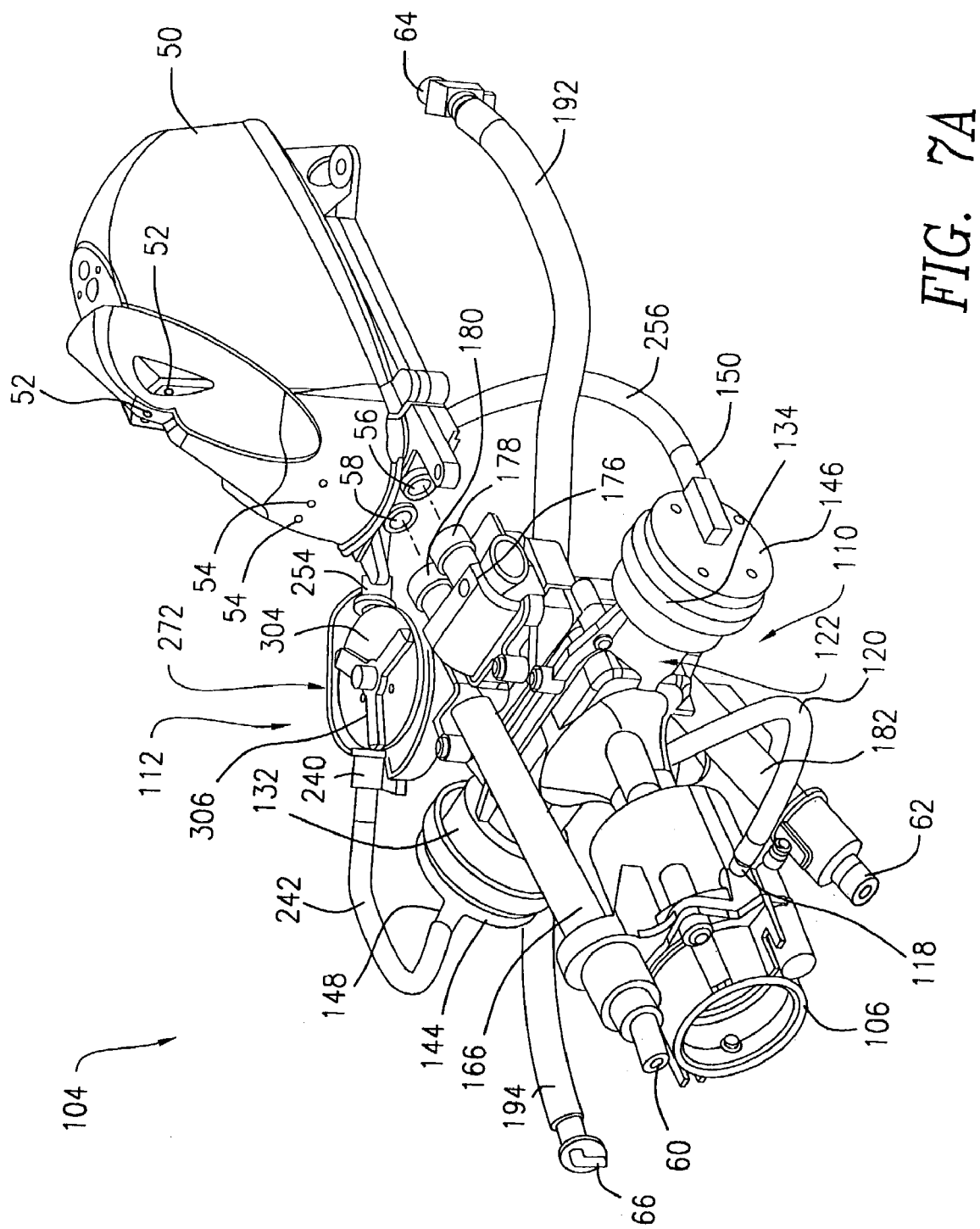
FIG. 7A is a top perspective view of a water distribution system of the pool cleaner shown in FIGS. 1-2A and 6.
Figure 7B:
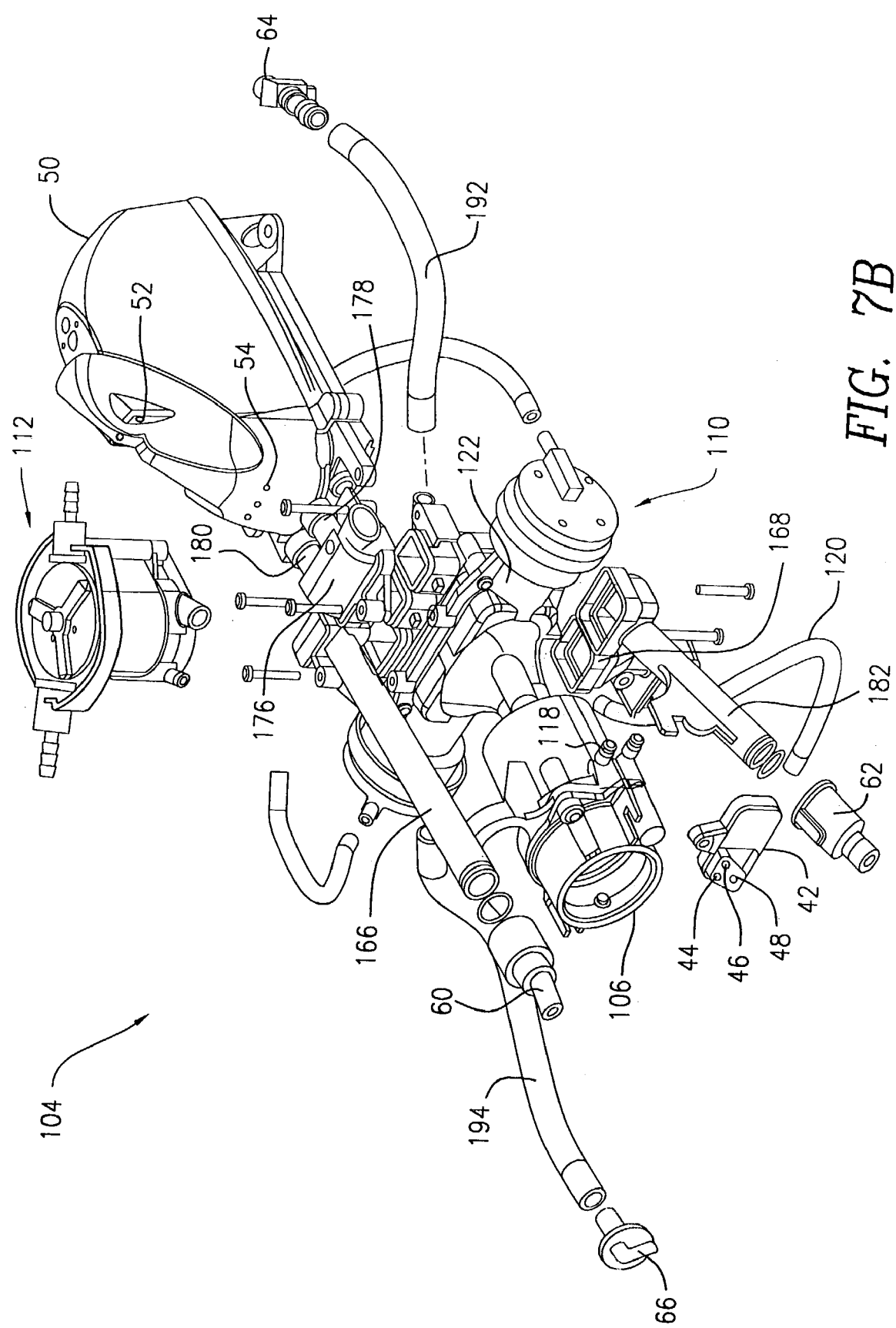
FIG. 7B is an exploded perspective view of the water distribution system shown in FIG. 7A.
Figure 7C:
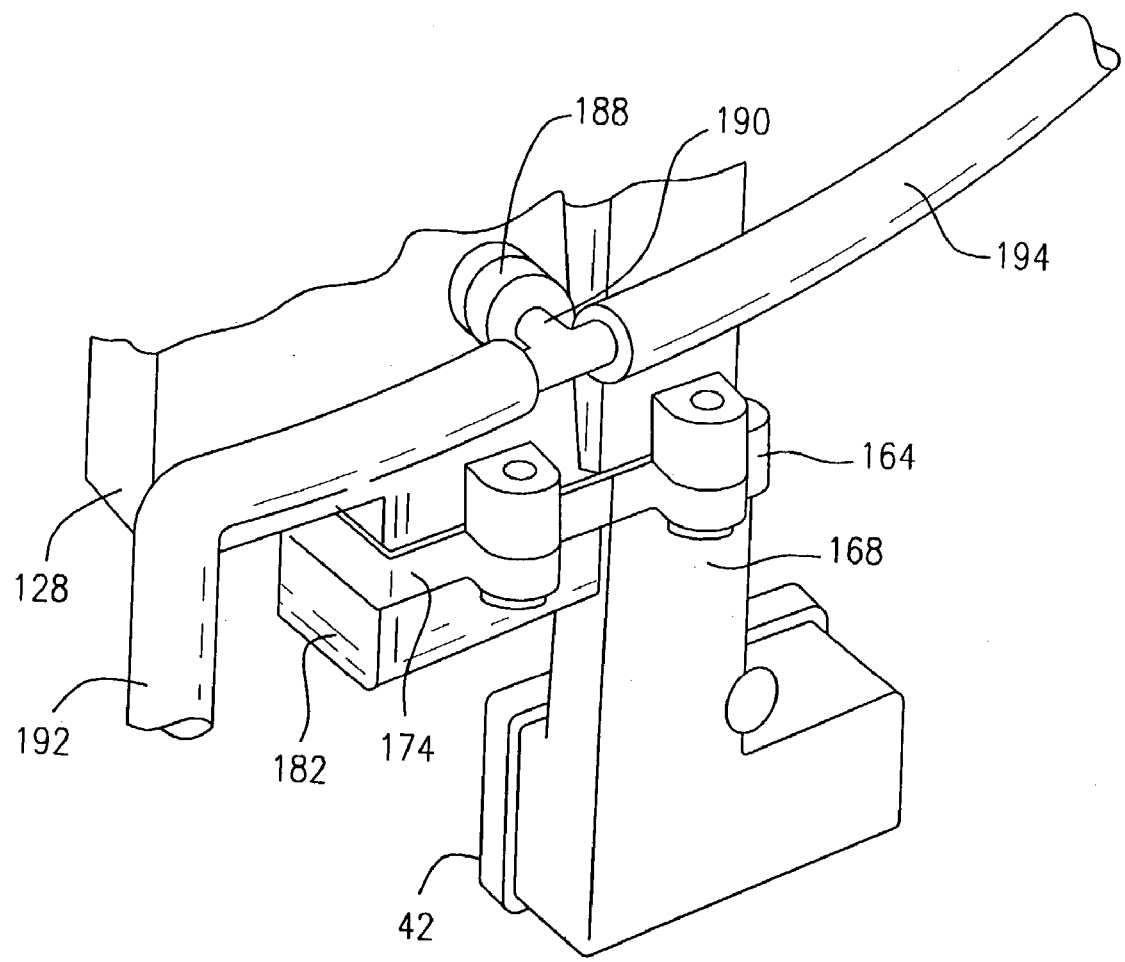
FIG. 7C is a perspective view of a portion of the water distribution system shown in FIG. 7A.

With reference to FIGS. 2, 2A, 4, 5 and 5A, the cleaner 10 is equipped with a housing or body 18 having a chassis 20 and a cover 22 removably or fixedly attached to the chassis 20. The chassis 20 includes a generally concave wall 24 having an inclined rear wall section 26, a pair of substantially vertical side wall sections 28, 30, and an inclined front wall section 32. A chamber 34 is defined by the concave wall 24 and the cover 22. A funnel-shaped vacuum inlet 36 (see FIG. 2) is provided on the underside of the chassis 20, while a suction tube 38 extends from the vacuum inlet 36 in an upward and rearward direction, terminating at an upper end 40 (see FIG. 5). A vacuum jet nozzle 42 (see FIGS. 2 and 7B) is mounted adjacent to the vacuum inlet 36 and oriented to discharge a high velocity stream of water through the suction tube 38 for removing debris from the interior wall 12 of the swimming pool 14 when the cleaner 10 is in its wall surface cleaning or bottom mode. The vacuum nozzle 42 is provided with one or more jets (e.g., jets 44, 46, 48 (see FIG. 7B) arranged in a triangular orientation).

Now referring to FIGS. 2, 2A, 4, 5, 5A, 6 and 7A, the chassis 20 is also equipped with a nose gear 50 located at the front wall section 32 and projecting upwardly therefrom. The nose gear 50 is equipped with a plurality of skimmer jets 52 and a plurality of debris retention jets 54, as well as a skimmer jet port 56 communicating with the skimmer jets 52 and a debris retention jet port 58 communicating with the debris retention jets 54. A forward thrust jet nozzle 60 extends through an opening formed in the rear wall section 26 of the chassis 20 for discharging a high velocity stream of water so as to cause the cleaner 10 to move in a generally forward path when the cleaner 10 is in its wall cleaning mode. Likewise, a lift/thrust jet nozzle 62 extends through the rear wall section 26 for discharging a high velocity stream of water so as to place the cleaner 10 proximate to the pool water surface 16 and move the cleaner 10 along same when the cleaner 10 is in its water surface cleaning mode.

A front spin-out jet nozzle 64 is also mounted to the front wall section 32 of the chassis 20, while a rear spin-out jet nozzle 66 is mounted to the rear wall section 26 of the chassis 20 (see FIGS. 2, 2A and 6-7B). More particularly, the front and rear spin-out jet nozzles 64, 66 are angled generally downwardly and are oriented at an angle relative to the longitudinal axis of the cleaner 10 (see the arrows in FIG. 6 indicating the direction in which the front and rear spin-out jet nozzles 64, 66 are oriented relative to the longitudinal axis of the cleaner 10) so as to cause the cleaner 10 to spin in a predetermined direction (e.g., in a clockwise direction) and to thereby move away from its forward path in a arcuate sideward path (as illustrated in broken line representation in FIG. 16B), when the cleaner 10 is in its spin-out mode. Because both of the front and rear spin-out jet nozzles 64, 66 are directed downwardly, when the cleaner 10 is in the spin-out mode, it is lifted vertically, facilitating the spinning or rotating motion of the cleaner 10. Alternatively, the front and rear spin-out jet nozzles 64, 66 can have different orientations and can be positioned at different locations on the cleaner 10. For instance, the rear spin-out jet nozzle 66 can be positioned on the central axis of the rear wall section 26 and can be oriented substantially horizontally so as to produce a horizontally discharged spin-out jet directed toward the vertical side wall section 30, thereby further facilitating the rotation of the cleaner 10.

With reference to FIGS. 2, 2A, 4, 5 and SA, the cover 22 includes a deck 68 and a pair of side walls 70, 72 projecting from the deck 68. The deck 68 includes an access opening 74 formed therein and an enclosure wall 76 (see FIG. 5A) depending from the deck 68 around the access opening 74. A door (i.e., a cap) 78 is pivotally mounted to the deck 68 for closing the access opening 74. The cover 22 also includes a cross member 80 spanning between the side walls 70, 72. A hole 82 is also formed in the deck 68 adjacent a rear end thereof. More particularly, the hole 82 is sized and shaped so as to receive the upper end 40 of the suction tube 38. The upper end 40 of the suction tube 38 is positioned flush with the deck 68 of the cover 22. A rear debris opening 84 is defined by the deck 68, the side walls 70, 72 and the cross member 80. A slot 86 (see FIGS. 2A and 4) is formed around the rear debris opening 84. The cover 22 also includes a nose cap 88 for partially covering the nose gear 50. Diverter wheels 90 are rotatably mounted between the cover 22 and the chassis 20 along the periphery of the chassis 20 for deflecting the cleaner 10 away from an obstruction or a wall of a swimming pool.

Figure 4:
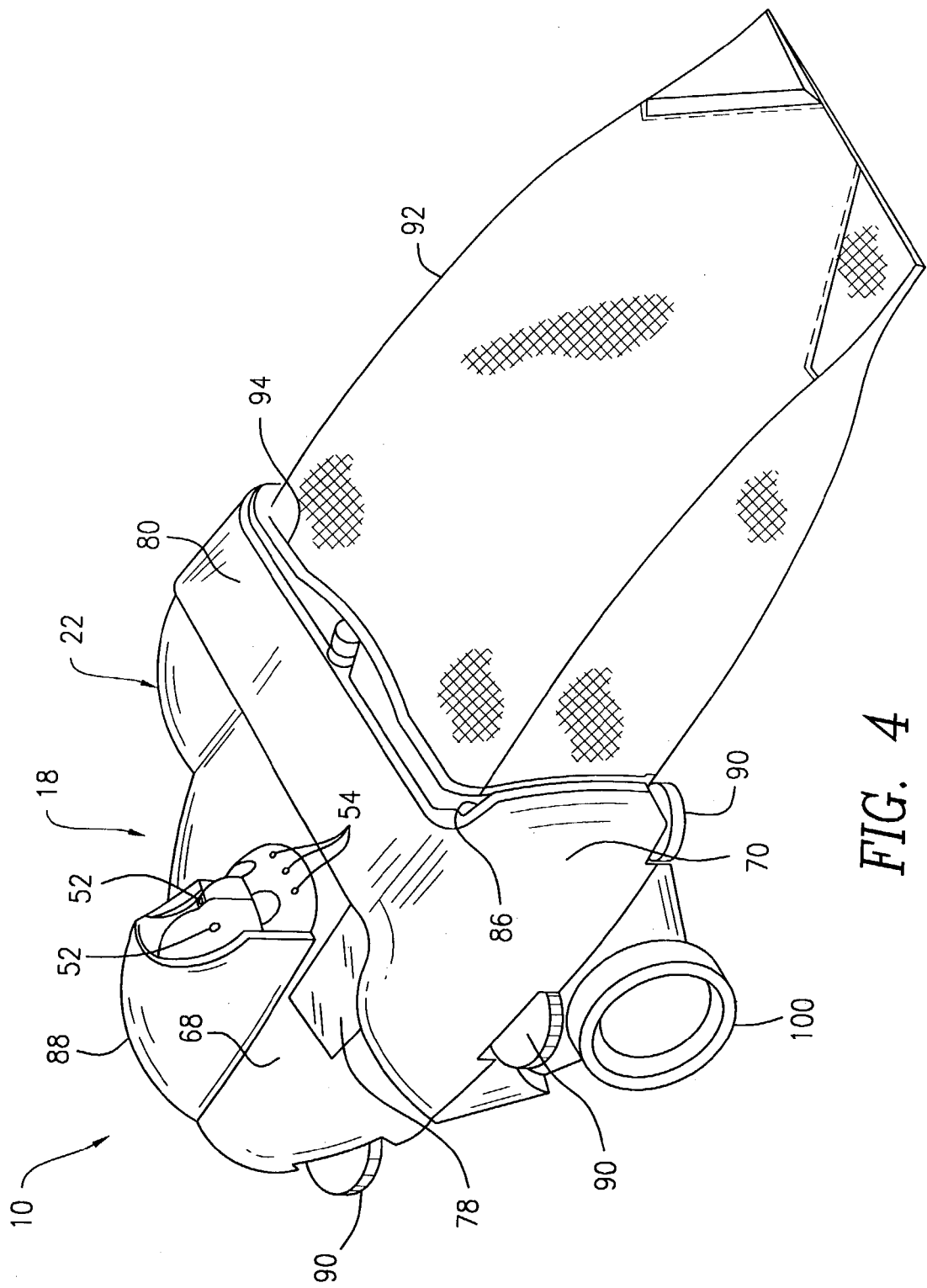
FIG. 4 is a rear perspective view of the pool cleaner shown in FIGS. 1-2A.
Figure 5:
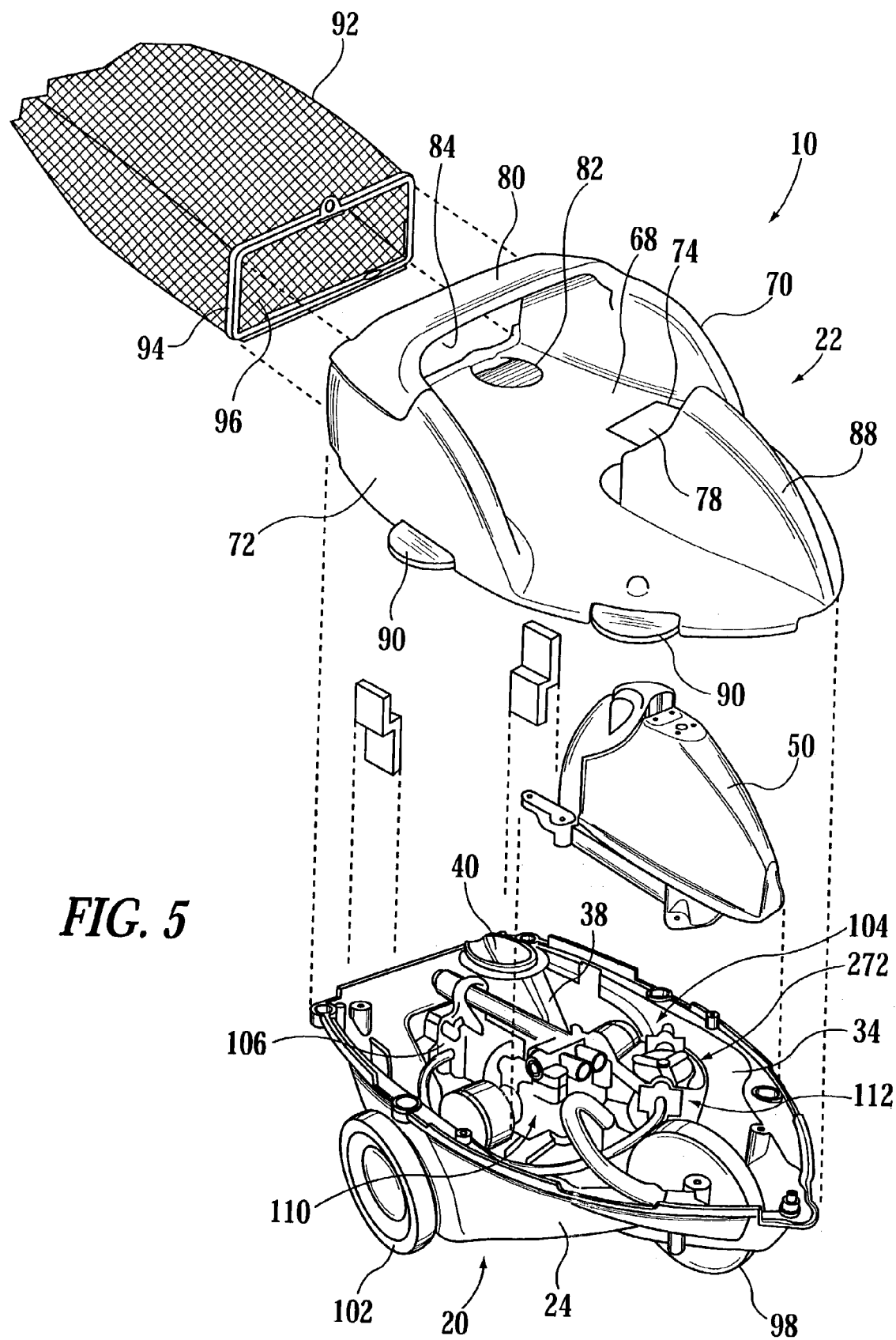
FIG. 5 is an exploded perspective view of the pool cleaner shown in FIGS. 1-2A.

Turning attention to FIGS. 2A, 4 and 5, a filter bag 92 is removably attached to the cleaner 10 for receiving debris through the rear debris opening 84. More particularly, the filter bag 92, which has a construction similar to the filter bags disclosed in International Patent Publication No. WO 99/33582 and its corresponding U.S. Pat. No. 6,365,039, includes a ring 94 defining a mouth 96 of the filter bag 92. The ring 94 is removably received in the slot 86 and retained therein by a retainer member for attaching the filter bag 92 to the cleaner 10.

A front center wheel 98 (see FIG. 2) is mounted to the front wall section 32 of the chassis 20, while rear wheels 100, 102 (see FIG. 2A) are mounted to the side wall sections 28, 30, respectively, of the chassis 20. The front and rear wheels 98, 100, 102, which are freely rotatable, are adapted to support the chassis 20 and hence the cleaner 10 on the wall 12 of the swimming pool 14.

Figure 3:
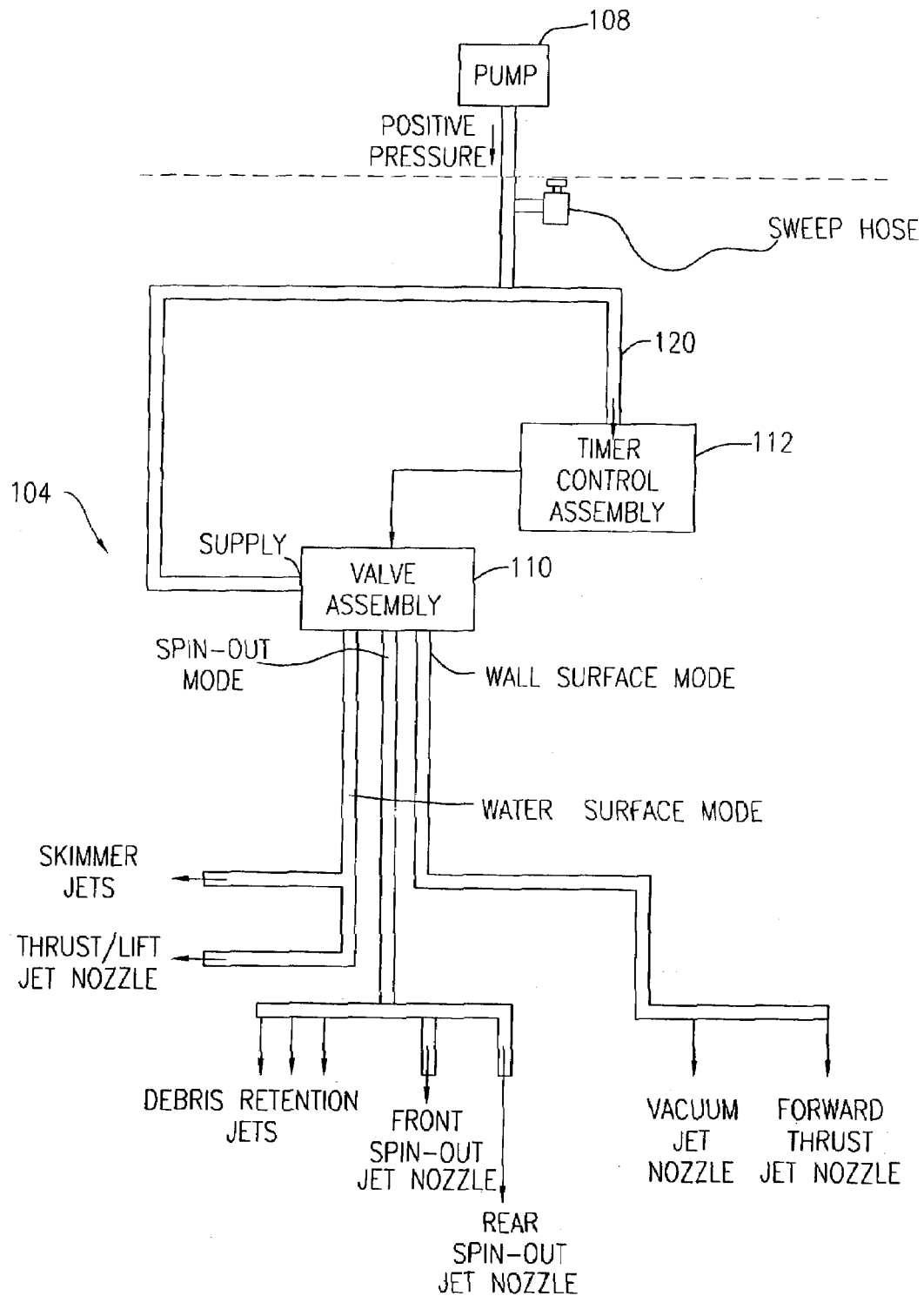
FIG. 3 is a functional block diagram depicting a water flow distribution of the pool cleaner shown in FIGS. 1-2A.
Figure 6:
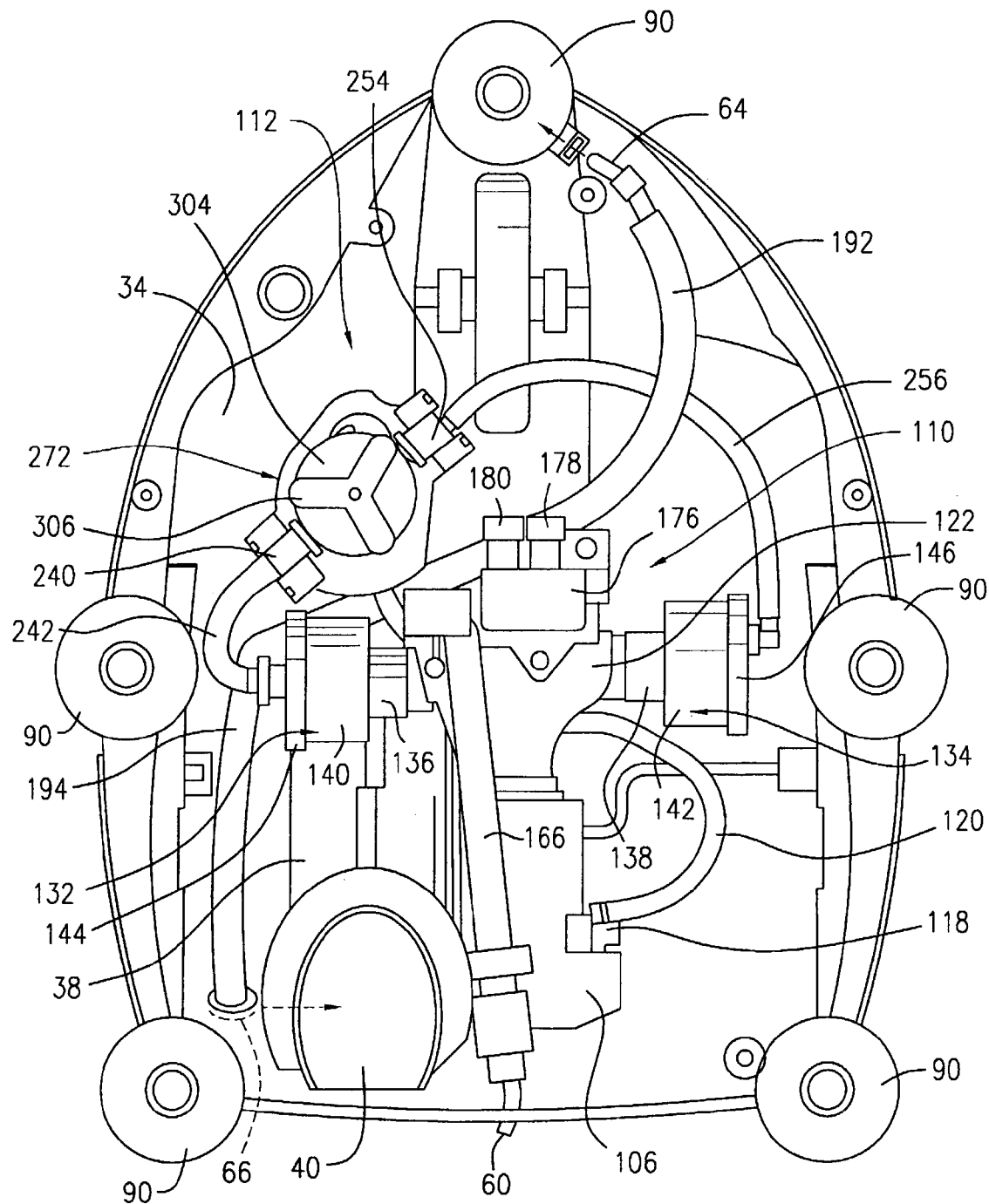
FIG. 6 is a top plan view of the pool cleaner shown in FIGS. 1-2A without its cover.

Now referring to FIGS. 3, 5 and 6, a water distribution system 104 is mounted in the chamber 34 of the cleaner 10 for controlling the operation of the cleaner 10. Briefly, the water distribution system 104 includes a water supply inlet 106 for receiving a supply of pressurized water from a pressurized water source 108 (e.g., a pump), a valve assembly 110 for directing a supply of pressurized water received from the water supply inlet 106 to one or more of the jets and nozzles discussed above and a timer assembly 112 for controlling the operation of the valve assembly 110. Each of these components of the water distribution system 104 will be discussed in greater detail hereinbelow.

With reference to FIGS. 6-8B, the supply inlet 106 is adapted to be coupled to a connecting end 114 (see FIGS. 1 and 13) of a supply hose 116 connected to the pressurized water source 108. In this regard, the connecting end 114 of the supply hose 116 and the supply inlet 106 are provided with a quick connect/disconnect mechanism, such as twist-lock connectors, for facilitating quick and easy connection of the supply hose 116 to the supply inlet 106. The supply inlet 106 has a port 118 connected to the timer assembly 112 via a connecting hose 120 for supplying the timer assembly 112 with a continuous supply of pressurized water so as to activate or energize same.

Referring to FIGS. 6-8B and 10, the valve assembly 110 includes a valve housing 122 having a valve chamber 124 (see FIG. 10) and a pair of housing sections 126, 128 (see FIG. 8B) attached to one another and defining the valve chamber 124 therebetween. The housing section 126 includes an inlet 130 connected to the supply inlet 106 for receiving a continuous supply of pressurized water therefrom. Cylinders 132, 134 are attached to opposing ends of the housing section 126. The cylinders 132, 134 are provided with small diameter cylinder sections 136, 138 (see FIGS. 6 and 10), respectively, each of which is in fluid communication with the valve chamber 124, and large diameter cylinder sections 140, 142 (see FIGS. 6 and 10), respectively, which extend outwardly from the small diameter cylinder sections 136, 138, respectively. Caps 144, 146 are mounted to the large diameter cylinder sections 140, 142, respectively, so as to close off open ends of the cylinders 132, 134, respectively. The caps 144, 146 include ports 148, 150, respectively, which are in fluid communication with the cylinders 132, 134, respectively, and which are connected to the timer assembly 112 for purposes to be discussed hereinafter.

Figure 8A:
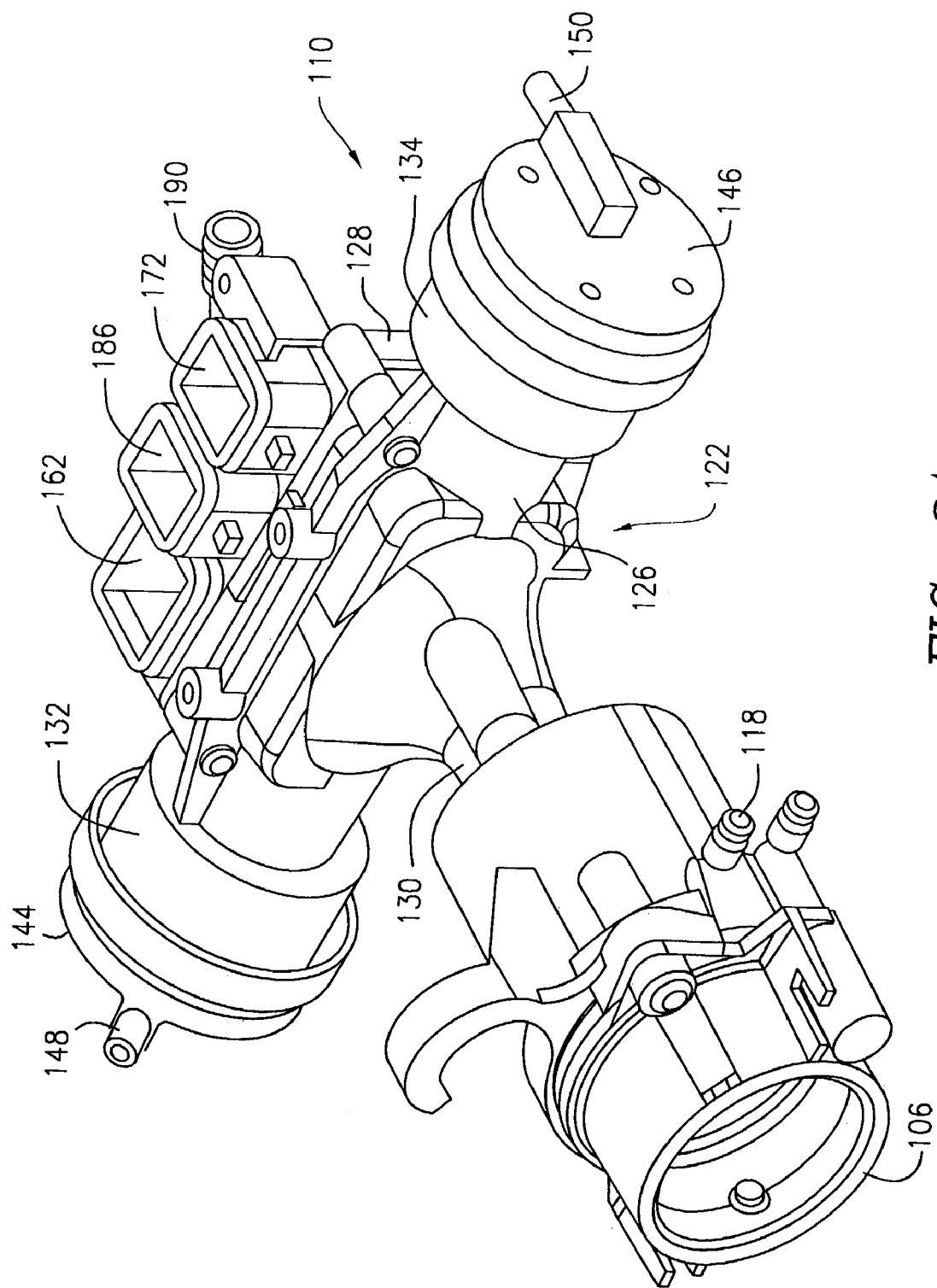
FIG. 8A is a top perspective view of a valve assembly of the water distribution system shown in FIGS. 7A and 7B.
Figure 8B:
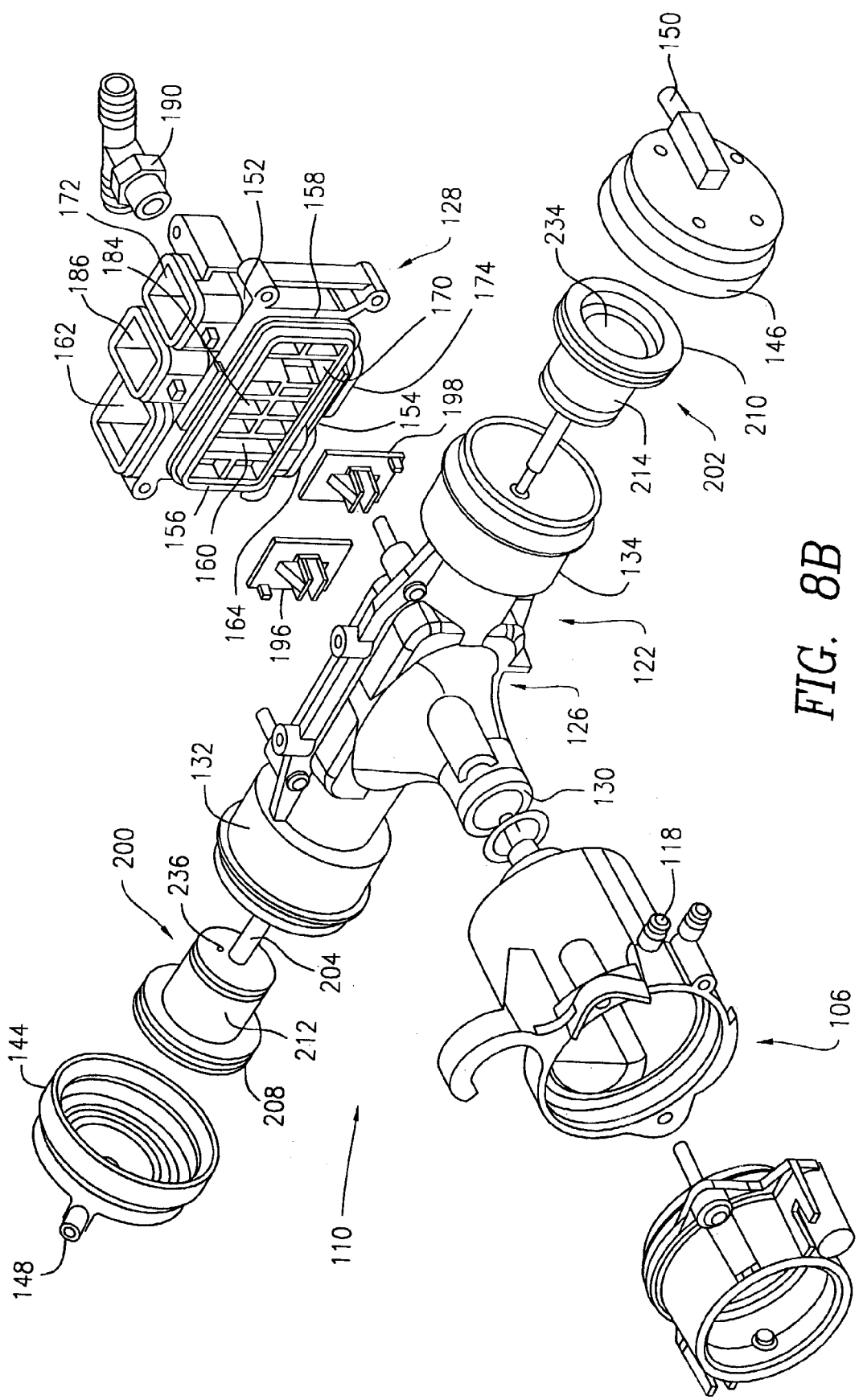
FIG. 8B is an exploded perspective view of the valve assembly shown in FIG. 8A.
Figure 10:
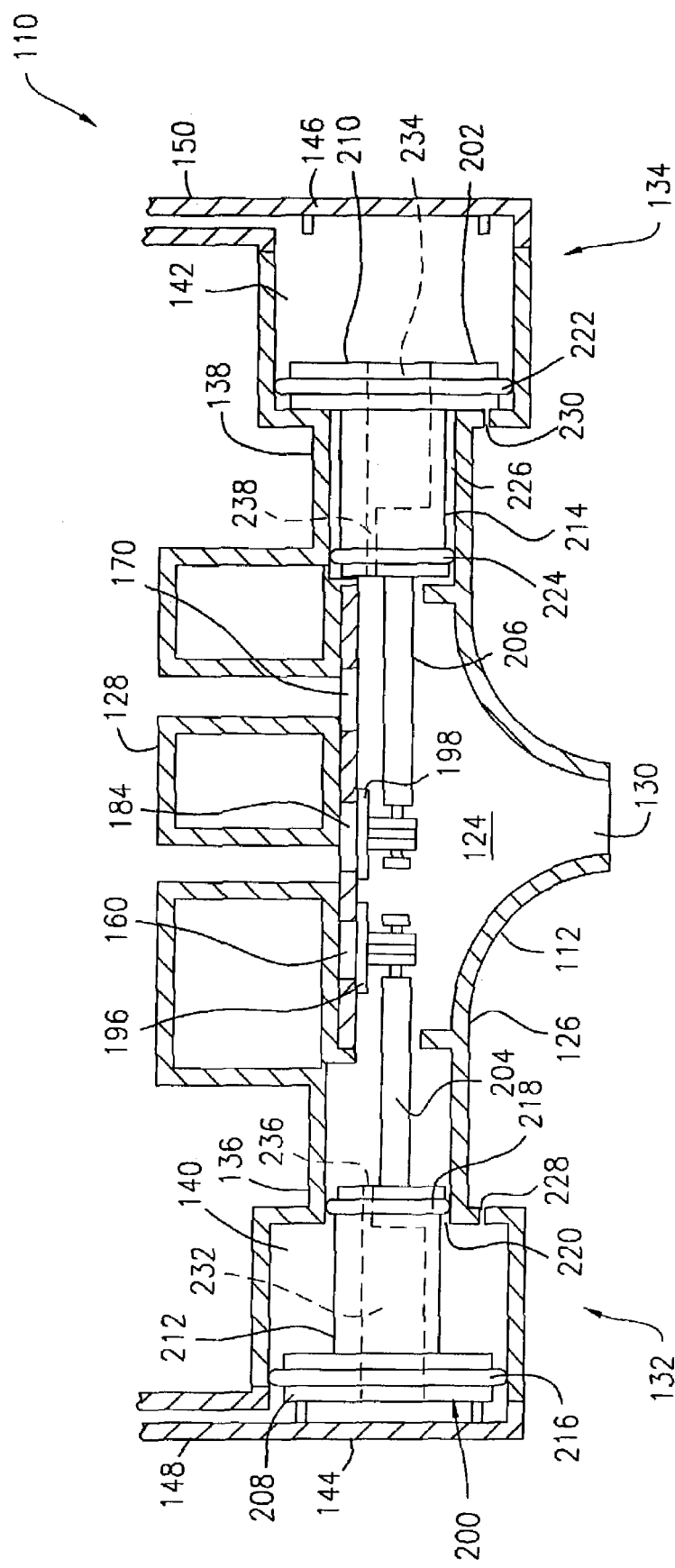
FIG. 10 is a schematic cross-sectional view of the valve assembly shown in FIGS. 8A and 8B.

Now referring primarily to FIGS. 8A, 8B and 10, the valve housing 122 includes a plurality of outlets formed in the housing section 128 for distributing pressurized water from the valve chamber 124 to one or more of the jets and nozzles discussed above. More particularly, the housing section 128, which is provided with an upper end 152, a lower end 154 and a pair of sides 156, 158, includes a bottom mode outlet 160 (see FIGS. 8B and 10) positioned adjacent to the side 156. The bottom mode outlet 160 communicates with a pair of bottom mode ports 162, 164 (see also FIG. 7C) formed on the upper and lower ends 152, 154, respectively, of the housing section 128. A tube 166 (see FIG. 7A) and a tube 168 (see FIGS. 7B and 7C) connect the bottom mode ports 162, 164, respectively, to the forward thrust jet nozzle 60 and the vacuum jet nozzle 42, respectively, such that when the cleaner 10 is in its bottom mode, pressurized water is supplied from the valve chamber 124 to the forward thrust jet nozzle 60 and the vacuum jet nozzle 42 through the bottom mode outlet 160 of the housing section 128.

The housing section 128 also includes a top mode outlet 170 (see FIGS. 8B and 10) located adjacent to the side 158 of the housing section 128. The top mode outlet 170 communicates with a pair of top mode ports 172, 174 formed on the upper and lower ends 152, 154, respectively, of the housing section 128. A connecting member 176 (see FIGS. 7A and 7B) is mounted to the upper end 152 of the housing section 128 and includes a pair of channels 178, 180, one of which (i.e., the channel 178) connects the top mode port 172 to the skimmer jet port 56 and hence the skimmer jets 52 of the nose gear 50. Similarly, a tube 182

(see FIGS. 7A and 7B) connects the top mode port 174 to the lift/thrust jet nozzle 62. As a result, when the cleaner 10 is in its top mode, pressurized water is supplied from the valve chamber 124 to the skimmer jets 52 and the lift/thrust jet nozzle 62 through the top mode outlet 170 of the housing section 128.

The housing section 128 is also equipped with a spin-out mode outlet 184 (see FIGS. 8B and 10) positioned between the bottom mode and top mode outlets 160, 170. A spin-out mode port 186 is formed on the upper end 152 of the housing section 128 and is connected to the debris retention jet port 58 and hence the debris retention jets 54 of the nose gear 50 through the channel 180 of the connecting member 176 (see FIG. 7A). A second spin-out mode port 188 (see FIG. 7C) is formed on the housing section 128, while a T-connector 190 is attached to the spin-out mode port 188. The T-connector 190 is connected to the front and rear spin-out jet nozzles 64, 66 via hoses 192, 194 (see FIGS. 6-7B), respectively. In this manner, when the cleaner 10 is in its spin-out mode, pressurized water is supplied to the front and rear spin-out jet nozzles 64, 66 and the debris retention jets 54 from the valve chamber 124 through the spin-out mode outlet 184 of the housing section 128.

With reference to FIGS. 8B and 10, the valve assembly 110 also includes a pair of valve members 196, 198 mounted in the valve chamber 124 for directing pressurized water from the valve chamber 124 to one of the bottom mode, top mode and spin-out mode outlets 160, 170, 184. The valve member 196 is sized and shaped so as to cover and hence close the bottom mode outlet 160 or the spin-out mode outlet 184, while the valve member 198 is sized and shaped so as to cover and hence close the top mode outlet 170 or the spin-out mode outlet 184.

Still referring to FIGS. 8B and 10, in order to reciprocate the valve members between their operating positions, pistons 200, 202 are mounted in the cylinders 132, 134, respectively. More particularly, the piston 200, which has a rod 204 coupled to the valve member 196, is movable between an extended position, in which the piston 200 is positioned outwardly from the valve chamber 124 (see FIG. 10), and a retracted position, in which the piston 200 is positioned adjacent to the valve chamber 124 (see FIG. 1C). When the piston 200 is in its extended position, the valve member 196 is positioned over, and thereby closes, the bottom mode outlet 160. Conversely, when the piston 200 is in its retracted position, the valve member 196 is positioned over, and thereby closes, the spin-out mode outlet 184.

Like the piston 200, the piston 202 has a connecting rod 206 coupled to the valve member 198. The piston 202 is movable between an extended position, in which the piston 202 is positioned outwardly from the valve chamber 124 (see FIG. 10B), and a retracted position, in which the piston 202 is positioned adjacent to the valve chamber 124 (see FIG. 10). When the piston 202 is in its extended position, the valve member 198 is positioned over, and hence closes, the top mode outlet 170. Conversely, when the piston 202 is in its retracted position, the valve member 198 is positioned over, and hence closes, the spin-out mode outlet 184.

In order to be movable between their retracted and extended positions, the pistons 200, 202 are provided with a "stepped" construction. That is, the pistons 200, 202 include large diameter areas 208, 210, respectively, and small diameter areas 212, 214, respectively, projecting from the large diameter areas 208, 210, respectively. The large diameter areas 208, 210 are sized and shaped so as to be movably received in the large diameter cylinder sections 140, 142, respectively, of the cylinders 132, 134, respectively. Likewise, the small diameter areas 212, 214 are sized and shaped so as to be movably received in the small diameter cylinder sections 136, 138, respectively. Sealing members 216, 218 (see FIG. 10) are mounted on the large and small diameter areas 208, 212, respectively, of the piston 200 so as to prevent or inhibit flow of pressurized water between the valve chamber 124 and the large diameter cylinder section 140 through a space 220 formed between the cylinder 132 and the piston 200. Similarly, sealing members 222, 224 (see FIG. 10) are mounted on the large and small diameter areas 210, 214, respectively, of the piston 202 so as to prevent or inhibit flow of pressurized water between the valve chamber 124 and the large diameter cylinder section 142 through a space 226 formed between the cylinder 134 and the piston 202. A discharge opening 228 (see FIG. 10) is formed in the cylinder 132 for discharging water present in the space 220 during the movement of the piston 200, while a discharge opening 230 is formed in the cylinder 134 for discharging water present in the space 226 during the movement of the piston 202.

Now referring to FIGS. 8B and 10, the pistons 200, 202 are provided with openings 232, 234, respectively, extending from the large diameter areas 208, 210, respectively, and terminating in the small diameter areas 212, 214, respectively. Holes 236, 238 are also formed in the small diameter areas 212, 214, respectively. More particularly, the hole 236 communicates with the opening 232 and the valve chamber 124 such that a continuous supply of pressurized water can be provided to the port 148 of the cap 144 from the valve chamber 124 through the hole 236 and the opening 232. Likewise, the hole 238 communicates with the opening 234 and the valve chamber 124 such that a continuous supply of pressurized water can be provided to the port 150 of the cap 146 from the valve chamber 124 through the hole 238 and the opening 234.

Referring primarily to FIGS. 7A, 7B, 9A-9C and 10A, a relief valve 240 is connected to the port 148 of the cylinder 132 of the valve assembly 110 via a connecting tube 242 for causing movement of the piston 200 between its retracted and extended positions. More particularly, the relief valve 240 is provided with a housing 244, which has an inlet 246, and a cap 247, which has an outlet opening 248. The inlet 246 is interconnected to the port 148 of the cylinder 132 by the tube 242 such that pressurized water can be supplied from the valve chamber 124 to the relief valve 240 through the hole 236 and opening 232 of the piston 200 (as indicated by arrows A in FIG. 10A) and the tube 242 (as indicated by arrow B in FIG. 10A). A ball or valve member 250 is mounted within the housing 244 and retained therein by the cap 247 attached to the housing 244 (see FIG. 10A). The ball 250 is movable between an open position, in which the ball 250 is spaced from the outlet opening 248, and a closed position, in which the ball 250 is urged against the outlet opening 248. An urging member 252 (e.g., a spring) is mounted in the housing 244 for constantly urging the ball 250 toward its closed position.

When the relief valve 240 is in its closed position (see FIG. 10C), pressurized water is inhibited from being released from the tube 242. As a result, the downstream side of the piston 200 (i.e., the tube 242) is pressurized by the pressurized water present therein or supplied thereto from the valve chamber 124. As a result, the pressure in the downstream side of the piston 200 (referred to hereinafter as "the downstream pressure $P_D$") is substantially equal to the pressure in the upstream side (e.g., the valve chamber 124) of the piston 200 (referred to hereinafter as "the upstream pressure $P_U$"). While the downstream pressure $P_D$ is substantially equal to the upstream pressure $P_U$, because of the stepped construction of the piston 200 (i.e., the surface of the piston 200 adjacent the downstream side has an area greater than the surface of the piston 200 adjacent the upstream side), a larger force is applied to the piston 200 from the downstream side thereof. As a result, the piston 200 is caused to move to its retracted position (see FIG. 10C), when the relief valve 240 is in the closed position.

Conversely, when the relief valve 240 is in its open position (see FIG. 10A), pressurized water is vented or released from the tube 242 through the relief valve 240, thereby depressurizing the downstream side of the piston 200. The upstream pressure $P_U$ is hence substantially greater than the downstream pressure $P_D$. As a result, the piston 200 is caused to move to its extended position, when the relief valve 240 is in the open position.

Now referring primarily to FIGS. 7A, 7B, 9A, 9D and 10A, a relief valve 254 is connected to the port 150 of the cylinder 134 of the valve assembly 110 via a connecting tube 256 for causing the piston 202 to move between its retracted and extended positions. More particularly, the relief valve 254 is provided with a housing 258, which has an inlet 260, and a cap 261, which has an outlet opening 262. The inlet 260 is interconnected to the port 150 of the cylinder 134 by the tube 256 such that pressurized water can be supplied from the valve chamber 124 to the relief valve 254 through the hole 238 and opening 234 of the piston 202 and the tube 256. A ball or valve member 264 is mounted within the housing 258 and is retained therein by the cap 261 attached to the housing 258 (see FIG. 10A). The ball 264 is movable between an open position, in which the ball 264 is spaced from the outlet opening 262, and a closed position, in which the ball 264 is urged against the outlet opening 262. An urging member 266 (e.g., a spring) is mounted in the housing 258 for constantly urging the ball 264 toward its closed position.

The relief valve 254 interacts with the piston 202 of the valve assembly 110 in a manner basically identical to the manner discussed above in connection with the relief valve 240 and the piston 200. The operation of the piston 202 in relation to the relief valve 254 will be discussed in greater detail herinafter.

Figures 9A, 9B:
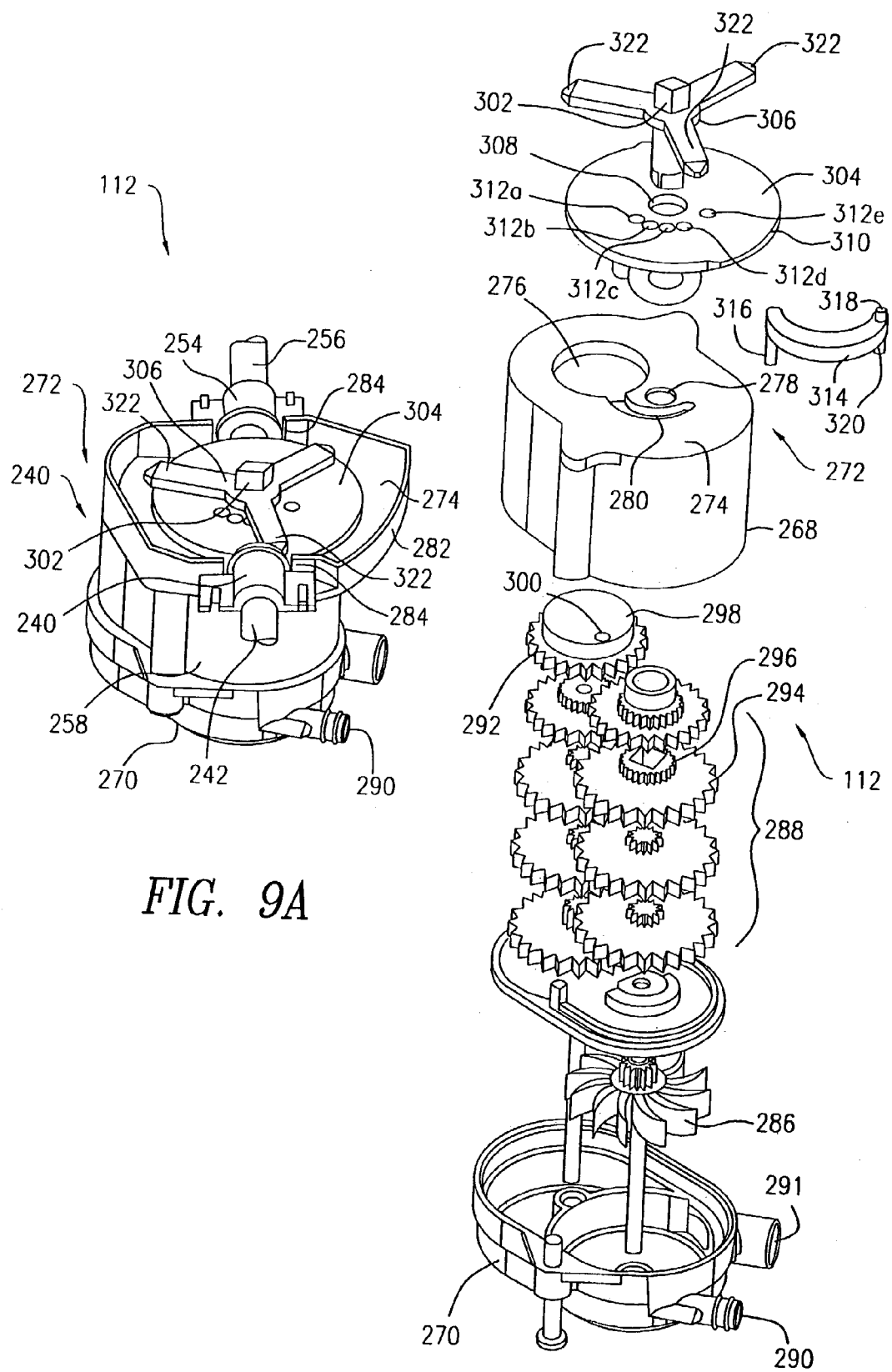
FIG. 9A is a perspective view of a timer control assembly of the water distribution system shown in FIGS. 7A and 7B.
FIG. 9B is an exploded perspective view of the timer assembly shown in FIG. 9A.
Figure 9C:
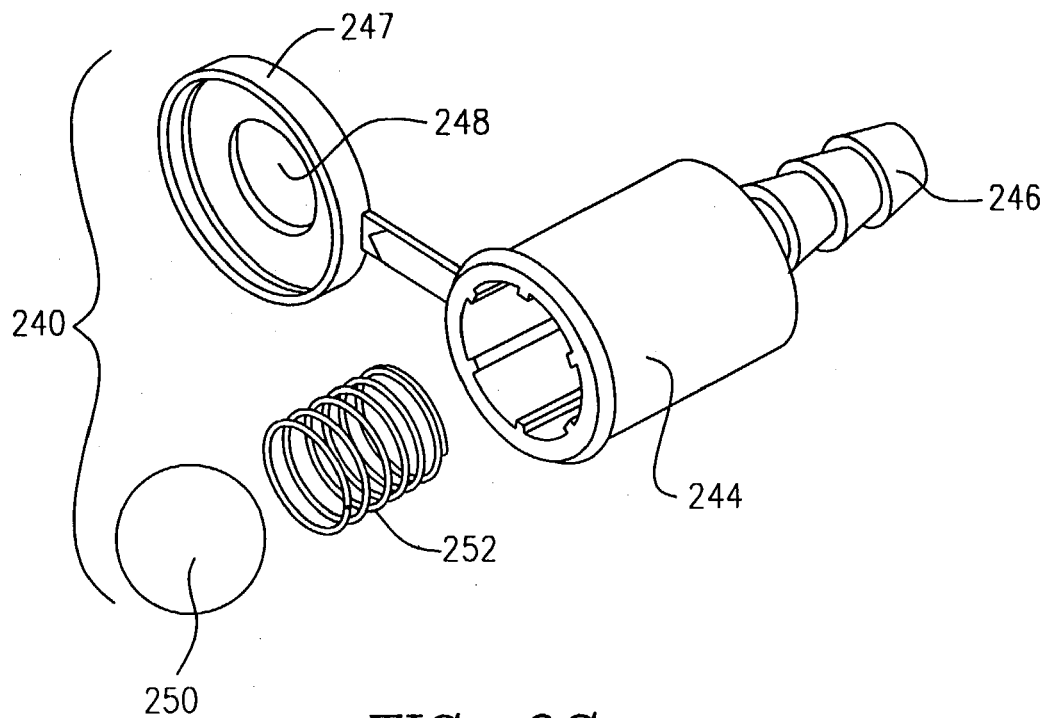
FIG. 9C is an exploded perspective view of a relief valve of the timer assembly shown in FIGS. 9A and 9B.
Figure 9D:
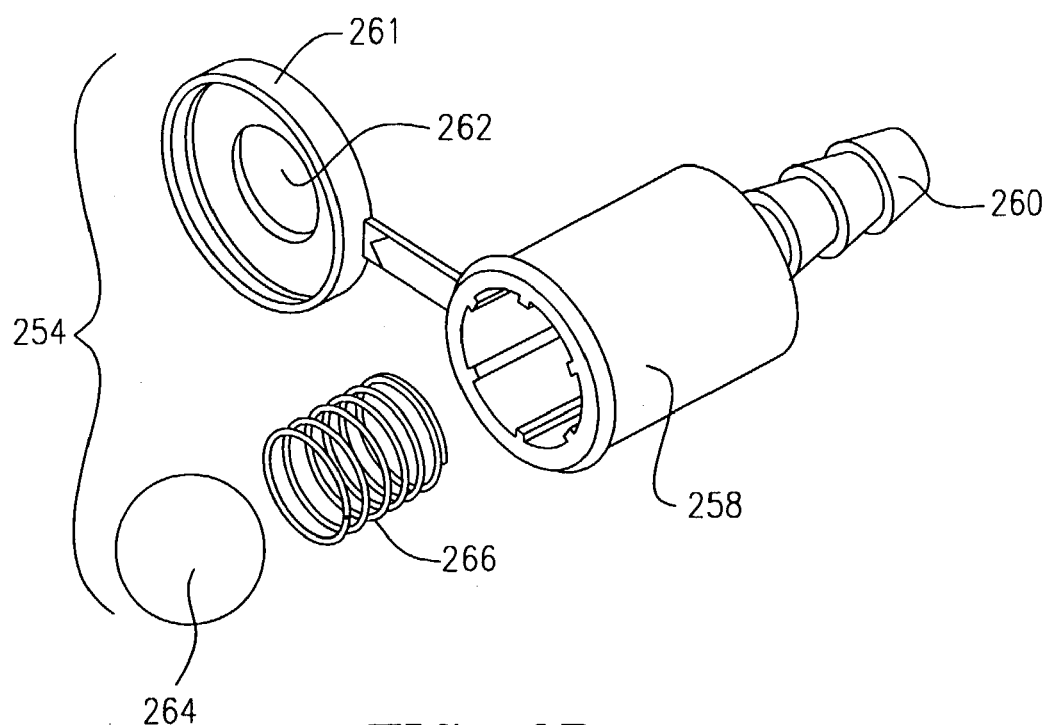
FIG. 9D is an exploded perspective view of another relief valve of the timer assembly shown in FIGS. 9A and 9B.

With reference to FIGS. 9A and 9B, the timer assembly 112, which is adapted to periodically actuate the relief valves 240, 254, includes a timer housing 268 and an end cap 270 attached to the timer housing 268. A control area 272 is provided on the housing 268 opposite the end cap 270. More particularly, the control area 272 is defined by a bottom 274, which includes a pair of openings 276, 278 and an arcuate slot 280, and an enclosure wall 282, which extends from the periphery of the bottom 274. The enclosure wall 282 includes a pair of diametrically opposed mounting slots 284, each of which is sized and shaped so as to receive a corresponding one of the relief valves 240, 254.

Now referring to FIG. 9B, the timer assembly 112 includes a turbine 286 and a gear train 288 coupled to the turbine 286. The turbine 286 and the gear train 288 are housed in the timer housing 268, enclosed by the end cap 270, which includes an inlet 290 for receiving pressurized water from the supply inlet 106 through the hose 120 so as to rotate the turbine 286, as well as a vent 291. The gear train 288 includes drive gears 292, 294, each of which is adapted to rotate at a predetermined speed (e.g., 0.05 rpm for the drive gear 292 and 0.4 rpm for the drive gear 294). The drive gear 294 is provided with a rectangularly shaped aperture 296, while the drive gear 292 has a circular cam driver 298 projecting therefrom for conjoint rotation therewith. The cam driver 298, which is received in the opening 276 of the control area 272, includes a hole 300 which is offset from the center of the drive gear 292 such that it moves in a circular path in response to the rotation of the drive gear 292.

Still referring to FIGS. 9A and 9B, a drive shaft 302 is connected to the drive gear 294 for conjoint rotation therewith. The timer assembly 112 is also provided with a top/bottom mode cam 304 and a spin-out mode cam 306 removably mounted on the drive shaft 302 in a stacked fashion. Each of the top/bottom mode cam 304 and the spin-out mode cam 306 is movable so as to periodically engage the relief valves 240, 254 for orienting them into their open positions from their normally closed positions as will be discussed in greater detail hereinafter. The top/bottom mode cam 304, which is located beneath the spin-out mode cam 306, has a circularly shaped aperture 308 for receiving the drive shaft 302 such that it is freely rotatable about the drive shaft 302 and is not hence driven by the drive shaft 302. The top/bottom mode cam 304 includes an arc-shaped cam portion 310 extending about 180° along the periphery of the top/bottom mode cam 304. Mode selection holes 312a-312e are formed in the top/bottom mode cam 304 and are arranged around the aperture 308 in an arcuate arrangement for purposes to be discussed hereinafter.

Figure 11A:
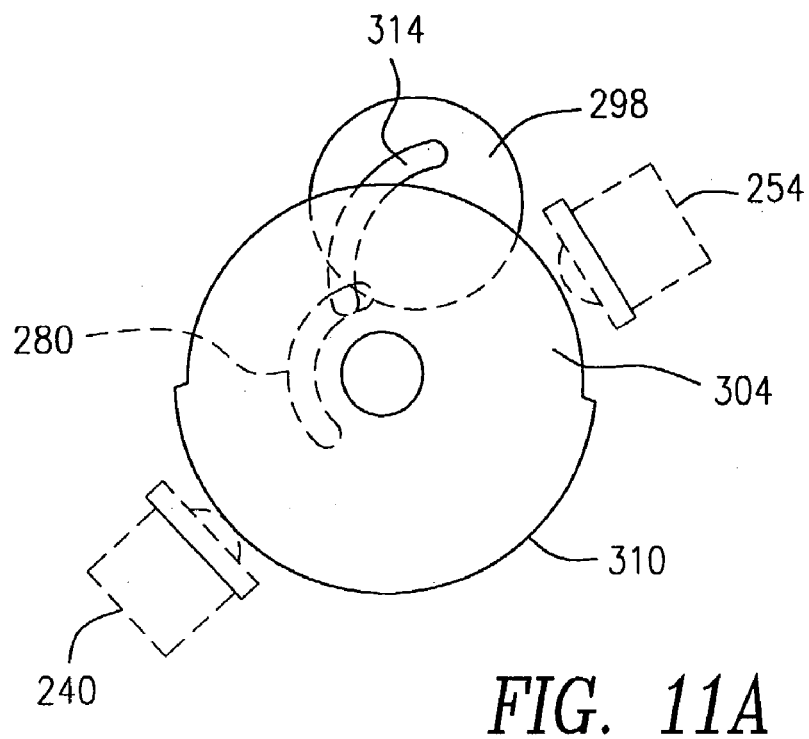
FIGS. 11A and 11B are schematic views of a top/bottom mode cam of the timer assembly shown in FIGS. 9A and 9B, illustrating its range of reciprocating motion.
Figure 11B:
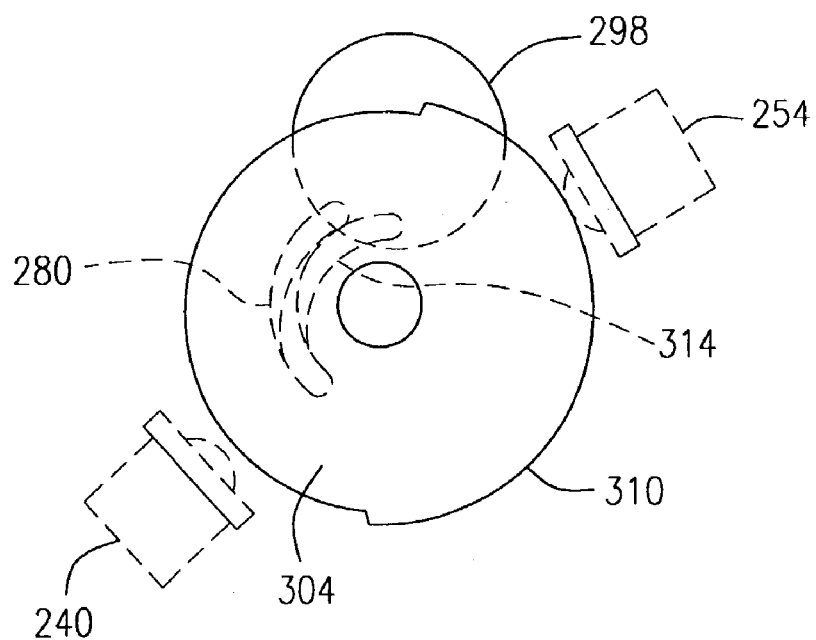

An arcuate link 314 (see FIG. 9B) connects the top/bottom mode cam 304 to the drive gear 292. More particularly, the link 314 includes a pin 316 at one end thereof and upper and lower pins 318, 320 at an opposite end thereof. The pin 316 is received in the hole 300 of the cam driver 298 of the drive gear 292. Similarly, the upper pin 318 is removably inserted into a selected one of the mode selection holes 312a-312e of the top/bottom mode cam 304, while the lower pin 320 is placed in the arcuate slot 280 of the control area 272 such that it is movable along the path defined by the arcuate slot 280. In this manner, the top/bottom mode cam 304 is linked to the drive gear 292 through the link 314 such that it is rotatable in reciprocating fashion (i.e. clockwise and counterclockwise) in response to the rotation of the drive gear 292. For instance, when the lower pin 320 of the link 314 is in the mode selection hole 312c of the top/bottom mode cam 304, the top/bottom mode cam 304 has a predetermined range of motion relative to the relief valves 240, 254, the range of motion being delimited by a clockwise end point (see FIG. 11A) and a counterclockwise end point (see FIG. 11B). In other words, the top/bottom mode cam 304 is adapted to reciprocate between these end points in response to the rotation of the drive gear 292. The remaining mode selection holes 312a, 312b, 312d, 312e have different ranges of motion associated therewith.

Unlike the top/bottom mode cam 304, the spin-out mode cam 306 is coupled to the drive shaft 302 such that it is rotatable conjointly with same. The spin-out mode cam 306 includes a plurality of radially projecting cam members 322. Each of the cam members 322 has a width different from one another for purposes to be discussed hereinafter.

Figure 5A:
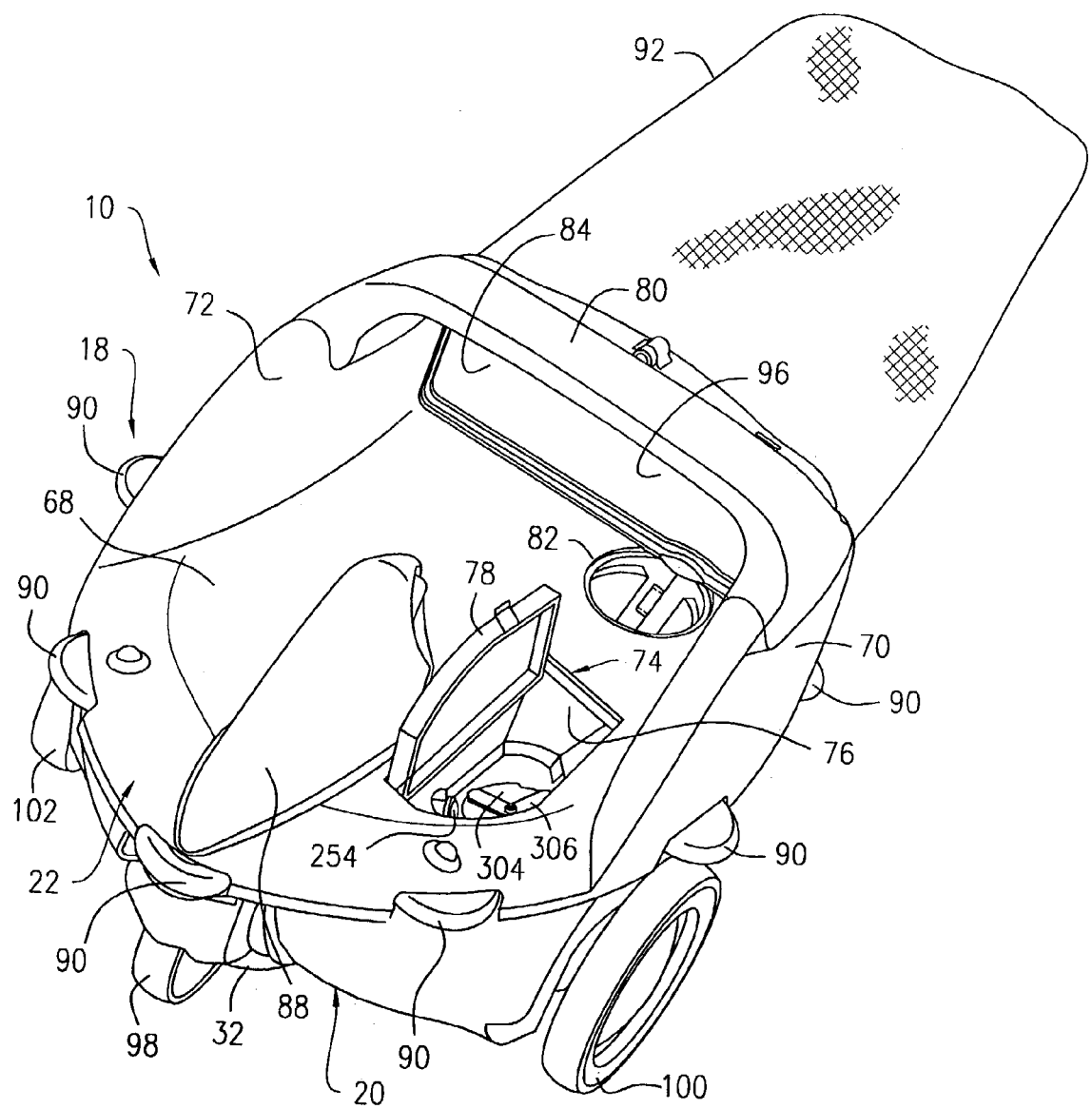
FIG. 5A is a front perspective view of the pool cleaner shown in FIGS. 1-2A.

Now referring to FIGS. 5 and 5A, the timer assembly 112 is mounted in the chamber 34 of the cleaner 10 such that the top/bottom mode cam 304 and the spin-out mode cam 306 are accessible through the access opening 74 of the cover 22 when the door 78 is in its open position. A spring (not shown) is provided for retaining the top/bottom mode cam 304 and the spin-out mode cam 306 in place. More particularly, when the door 78 is pivoted to close the access opening 74, the spring is positioned between the door 78 and the spin-out mode cam 306. Alternatively, the spring can be replaced by other retaining mechanisms (e.g., a rod or retainer attached to the door 78).

Figure 10A:
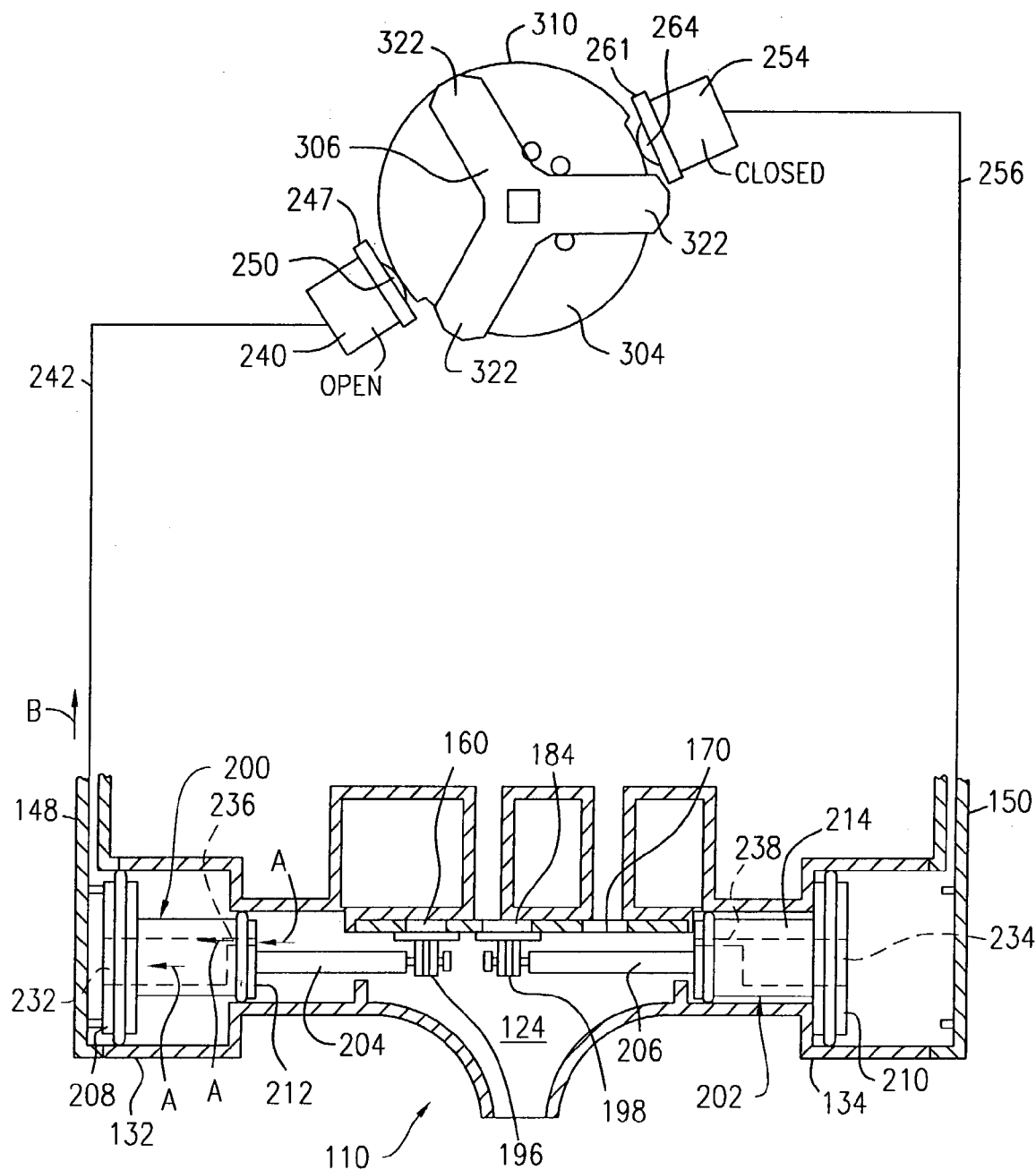
FIGS. 10A-10D are schematic cross-sectional views of the valve assembly shown in FIGS. 8A and 8B, illustrating its operation.
Figure 10B:
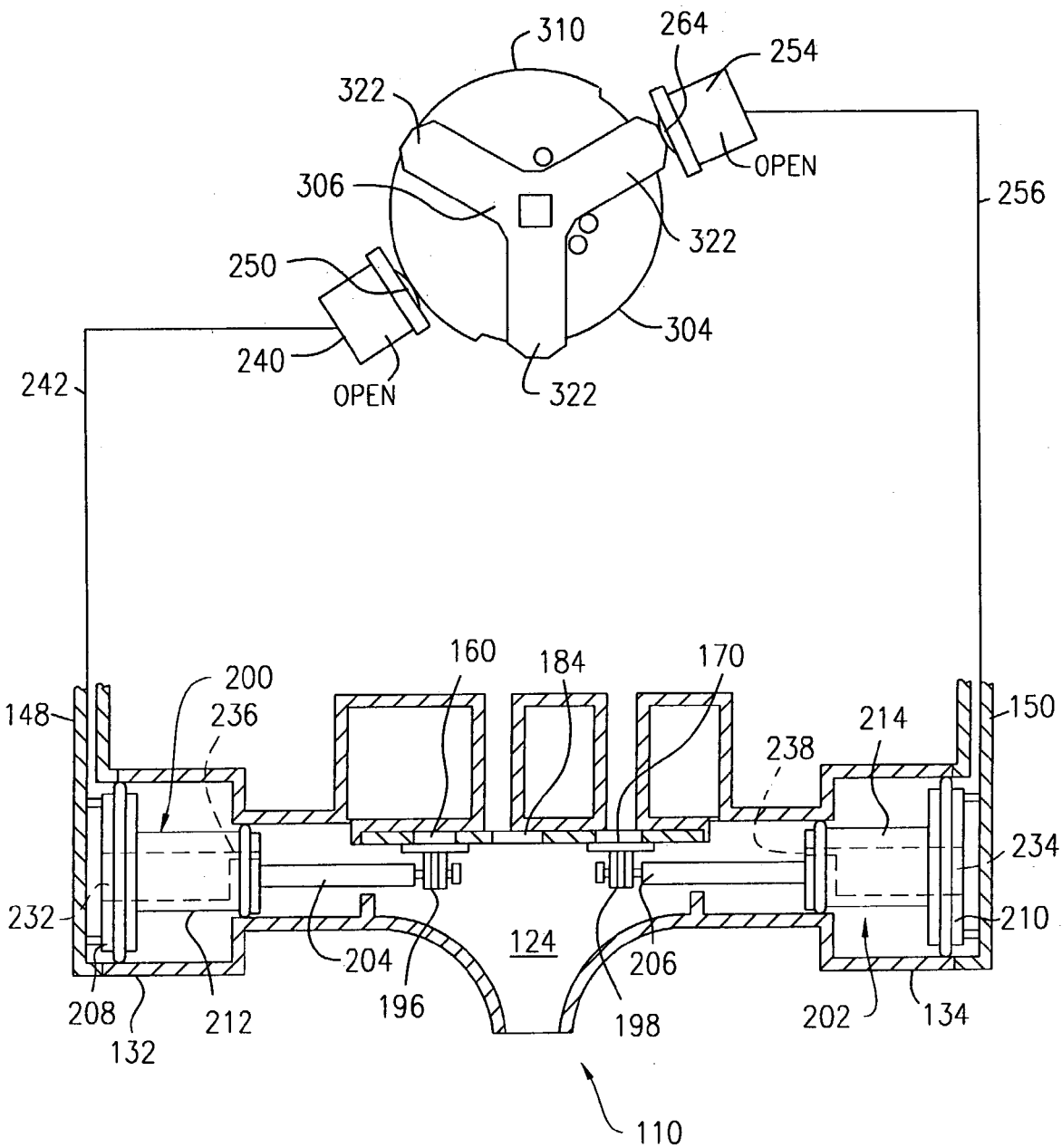
Figure 10C:
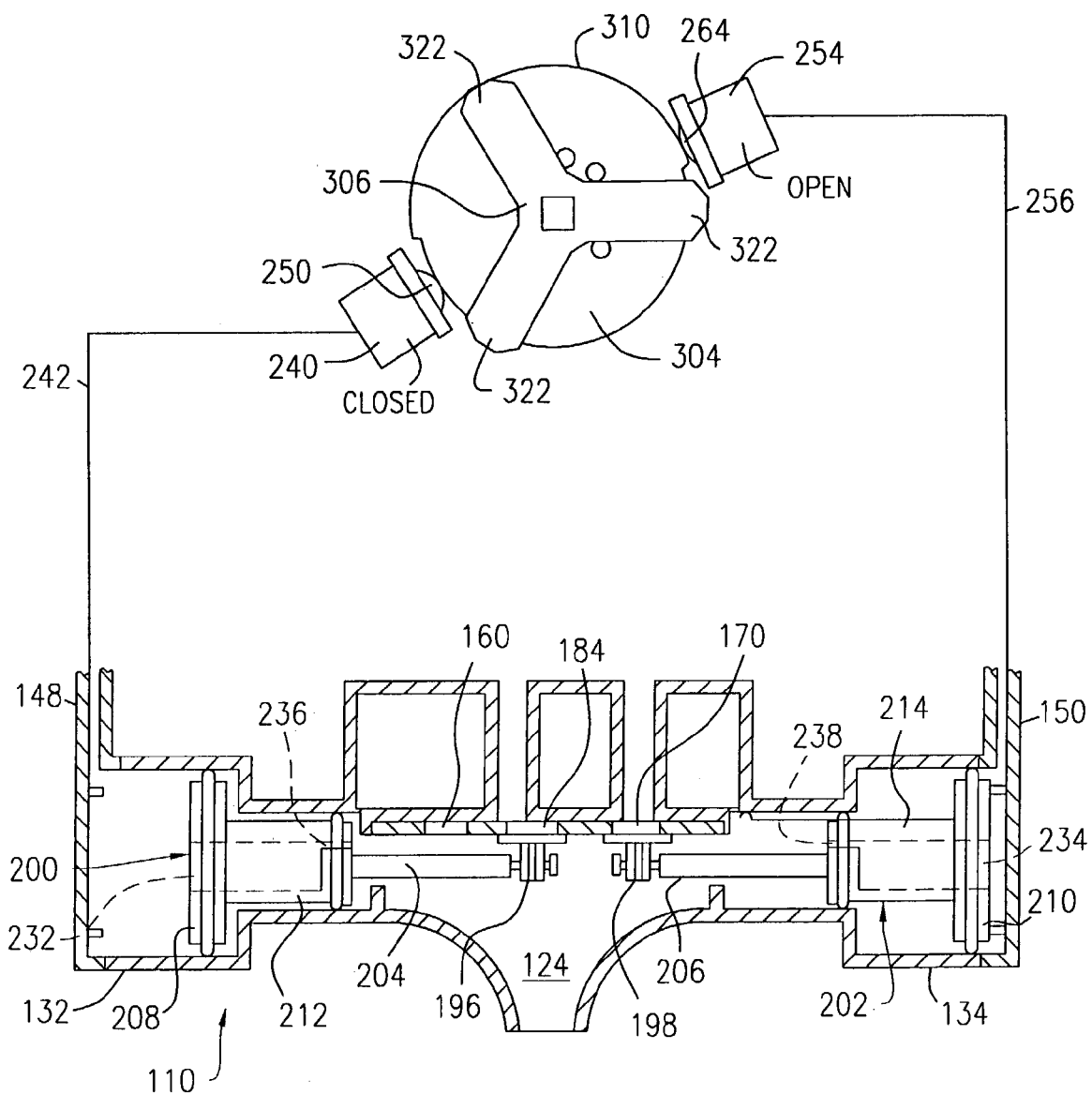

The operation of the cleaner 10 will be discussed hereinafter. During the operation of the cleaner 10, a constant supply of pressurized water is supplied to the supply inlet 106 of the cleaner 10 from the pressurized water source 108 through the supply hose 116. As a result, pressurized water is supplied to the valve chamber 124 of the valve assembly 110, pressurizing the valve chamber 124 and hence urging the pistons 200, 202 toward their extended positions. Pressurized water is continuously supplied from the valve chamber 124 to the tube 242 (i.e., the downstream side of the piston 200) and the tube 256 (i.e., the downstream side of the piston 202) through the hole 236 and opening 232 of the piston 200 and through the hole 238 and opening 234 of the piston 202, respectively (see FIG. 10). With reference to FIG. 10A, the relief valve 240 is engaged by the top/bottom mode cam 304, and is hence in its open position. When this happens, pressurized water supplied to the tube 242 is released through the relief valve 240 (i.e., the downstream side of the piston 200 is not pressurized). As a result, the pressure in the valve chamber 124 (i.e., the upstream side of the piston 200) is greater than the pressure in the tube 242 (i.e., the downstream side of the piston 200), causing the piston 200 to move into its extended position. In response, the valve member 196 is placed over, and hence closes, the bottom mode outlet 160.

The relief valve 254 illustrated in FIG. 10A is engaged by neither the top/bottom mode cam 304 nor the spin-out mode cam 306, and is hence in its closed position. In such circumstances, pressurized water supplied to the tube 256 is prevented from being released through the relief valve 254, and the tube 256 becomes pressurized to a level that is substantially identical to the pressure level of the valve chamber 124. As discussed above, due to the stepped construction of the piston 202 (i.e., the surface adjacent to the upstream side has an area smaller than that of the surface adjacent to the downstream side), a greater force is exerted on the piston 202 from the downstream side thereof, hence positioning the piston 202 in its retracted position (see FIG. 10A). As a result, the valve member 198 is positioned over the spin-out mode outlet 184, leaving only the top mode outlet 170 open. Accordingly, pressurized water is supplied from the valve chamber 124 to the lift/thrust jet nozzle 62 and the skimmer jets 52 through the top mode outlet 170 (i.e., the cleaner 10 is in the top mode, removing floating debris from the water surface 16 of the pool 14).

Throughout the operation of the cleaner 10, pressurized water is continuously supplied to the turbine 286 from the supply inlet 106 through the hose 120, thereby energizing the gear train 288 and causing the drive gears 292, 294 to rotate at predetermined speeds. As a result, the spin-out mode cam 306 rotates conjointly with the drive gear 294. As the spin-out mode cam 306 rotates, one of the cam members 322 comes in contact with the ball 264 of the relief valve 254, causing the ball 264 to move into its open position (see FIG. 10B). In response, pressurized water is vented or released from the tube 256 through the relief valve 254, depressurizing the downstream side of the piston 202 (i.e., the tube 256). As a result, the piston 202 moves into its extended position, causing the valve member 198 to close the top mode outlet 170 and thereby leaving only the spin-out mode outlet 184 open (see FIG. 10B). Pressurized water is then supplied from the valve chamber 124 to the front and rear spin-out jet nozzles 64, 66 and the debris retention jets 54 and hence causes the cleaner 10 to go into its spin-out mode.

As the spin-out mode cam 306 continues to rotate, the cam member 322 disengages the ball 264 of the relief valve 254, causing the ball 264 to move into its closed position and hence re-pressurizing the tube 256 (i.e., the downstream side of the piston 202) to a level substantially identical to that of the valve chamber 124 (i.e., the upstream side of the piston 202). In response, the piston 202 moves into its retracted position and causes the spin-out mode outlet 184 to be closed by the valve member 198, leaving only the top mode outlet 184 open and thereby causing the cleaner 10 to resume its top mode operation.

Throughout the operation of the cleaner 10, the top/bottom mode cam 304 continuously reciprocates between its two end points of motion in response to the rotation of the cam driver 298 of the drive gear 292. As the top/bottom mode cam 304 moves in reciprocating motion, the cam portion 310 of the top/bottom mode cam 304 disengages the relief valve 240 and engages the relief valve 254 (see FIG. 10C). In response, the relief valve 240 moves into its closed position, while the relief valve 254 moves into its open position. As a result, the piston 200 moves into its retracted position so as to close the spin-out mode outlet 184, while the piston 202 moves into its extended position so as to close the top mode outlet 170, leaving only the bottom mode outlet 160 open (see FIG. 10C). Pressurized water is then diverted from the valve chamber 124 to the forward thrust jet nozzle 60 and the vacuum jet nozzle 42, hence causing the cleaner 10 to initiate its bottom mode operation.

Figure 10D:
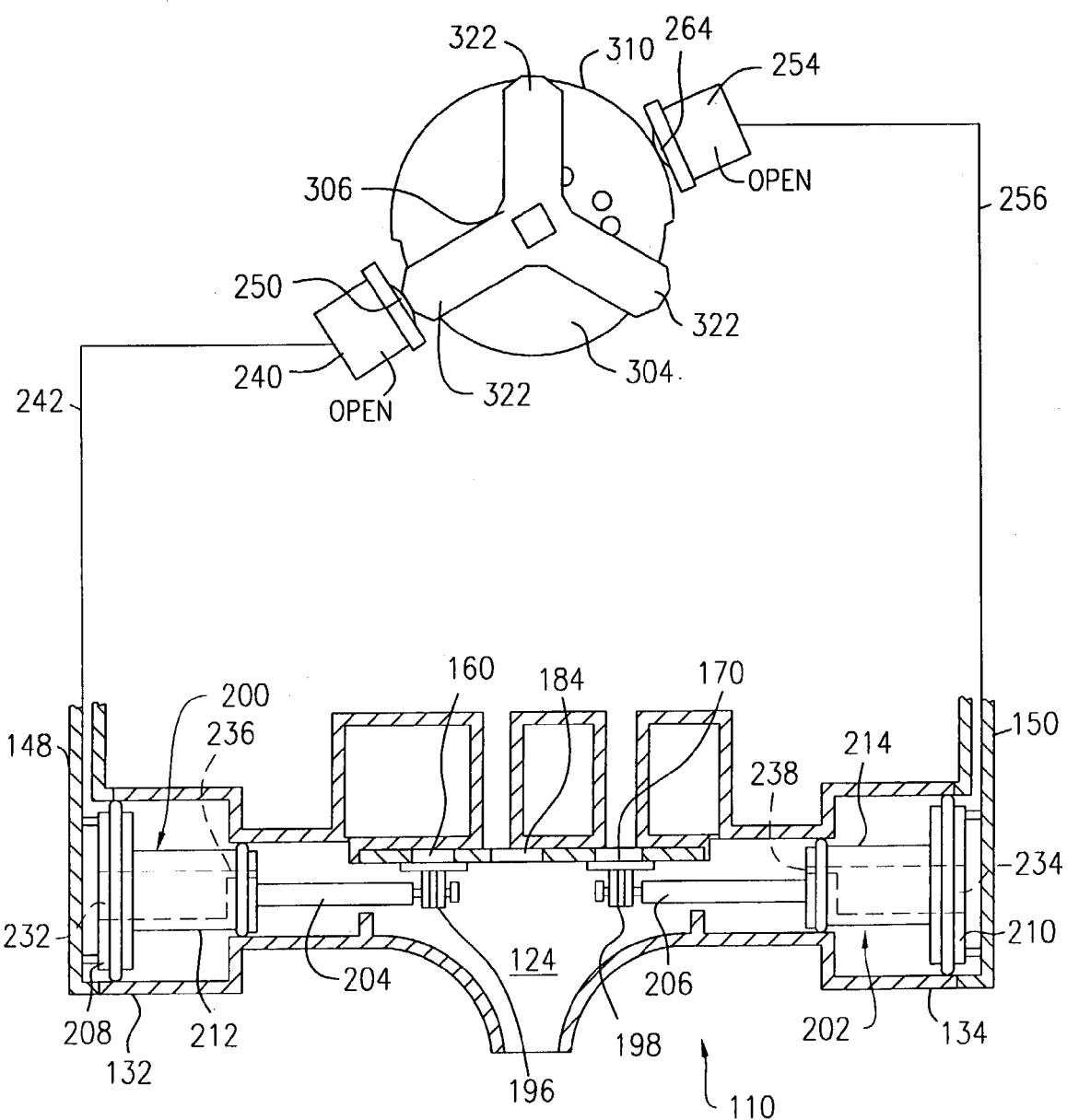

With reference to FIG. 10D, as the spin-out mode cam 306 rotates, one of the cam members 322 comes in contact with the relief valve 240, orienting same in its open position. In response, the piston 200 moves to its extended position and causes the closure of the bottom mode outlet 160, leaving only the spin-out mode outlet 184 open. As a result, the spin-out mode is initiated. After a lapse of a predetermined time, the spin-out mode cam member 322 disengages the relief valve 240, causing the cleaner 10 to resume its bottom mode operation.

The following table summarizes the relationship between the positions of the relief valves 240, 254 and the condition of the top mode, bottom mode and spin-out mode outlets 160, 170, 184 of the valve assembly 110 (i.e., the top, bottom mode operations of the cleaner 10).

| Relief Valve 240 | Relief Valve 254 | Valve Assembly Outlets |
| --- | --- | --- |
| Open | Closed | Top Mode Outlet Open |
| Open | Open | Spin-Out Mode Outlet Open |
| Closed | Open | Bottom Mode Outlet Open |

For the proper operation of the cleaner 10, the top/bottom mode cam 304 is sized and shaped such that only one of the relief valves 240, 254 is engaged by same at any one time. For instance, if the relief valve 240 is engaged by the cam portion 310 of the top/bottom mode cam 304, the relief valve 254 is disengaged from same and vice versa.

As indicated above, each of the mode selection holes 312a-312e (see FIG. 9B) of the top/bottom mode cam 304 has a different top mode/bottom mode ratio (i.e., the ratio between the amount of time during which the cleaner 10 is in the top mode and the amount of time during which the cleaner 10 is in the bottom mode) associated therewith. For instance, the mode selection hole 312c is positioned and arranged on the top/bottom mode cam 304 such that it engages the relief valves 240, 254 for a predetermined time while reciprocating between its preselected end points of motion (see FIGS. 11A and 11B) so as to achieve a 1:1 top mode/bottom mode ratio (i.e., the amount of time during which the cleaner 10 is in the top mode is roughly equal to the amount of time during which the cleaner 10 is in the bottom mode). More particularly, when the mode selection hole 312c is selected, the top/bottom mode cam 304 engages the relief valves 240, 254 for a substantially equal amount of time, thereby achieving a 1:1 top mode/bottom mode ratio. In contrast, the mode selection hole 312e has a 1:0 top mode/bottom mode ratio (i.e., the cleaner 10 is always in the top mode), while the mode selection hole 312a has a 0:1 top mode/bottom mode ratio (i.e., the cleaner 10 is always in the bottom mode). The mode selection hole 312b has a top mode/bottom mode ratio ranging between 1:1 and 0:1 (e.g., 1:2), while the mode selection hole 312d has a top mode/bottom mode ratio ranging between 1:1 and 1:0 (e.g., 2:1). Because of the mode section holes 312a-312e, the top mode/bottom mode ratio can be easily adjusted by coupling the link 314 to a desired one of the mode selection holes 312a-312e. The top mode/bottom mode ratios associated with the mode section holes 312a-312e are summarized hereinbelow.

| Holes | Top Mode | Bottom Mode |
| --- | --- | --- |
| Hole 312e | 100% | 0% |
| Hole 312d | about 67% | about 33% |
| Hole 312c | about 50% | about 50% |
| Hole 312b | about 33% | about 67% |
| Hole 312a | 0% | 100% |

It should also be appreciated that because the cam members 322 of the spin-out mode cam 306 have different widths, each of them is adapted to engage the relief valve 240 or the relief valve 254 for a different duration. As a result, the cleaner 10 is adapted to perform its spin-out mode operation for a different time period during each spin-out cycle, making its movement more random.

Figure 12A:
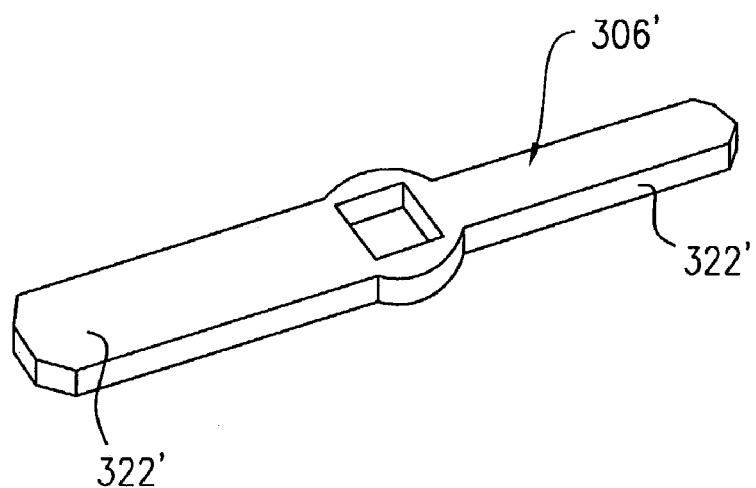
FIG. 12A is a perspective view of a replacement for a spin-out mode cam of the timer assembly shown in FIGS. 9A and 9B.
Figure 12B:
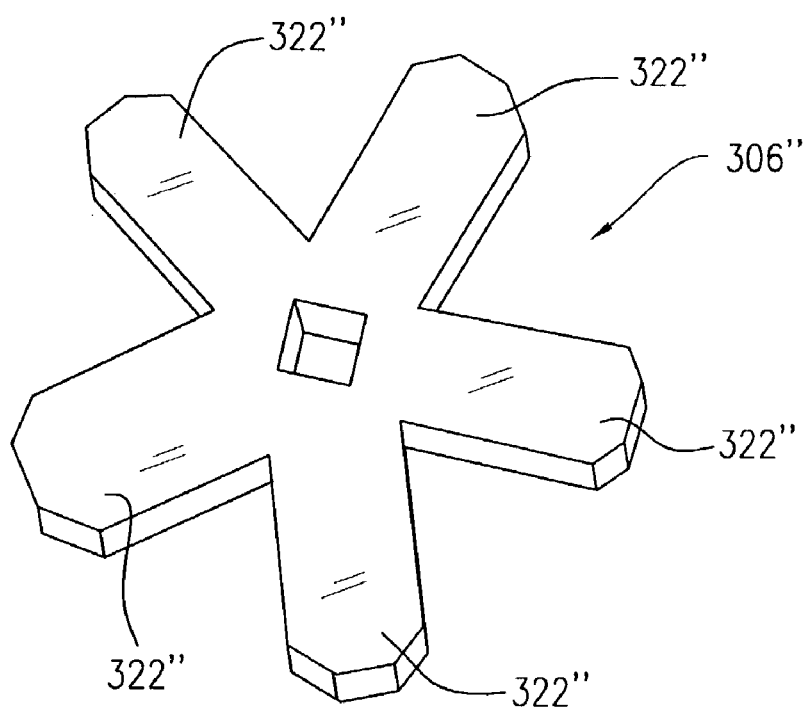
FIG. 12B is a perspective view of another replacement for the spin-out mode cam shown in FIGS. 9A and 9B.

Because the spin-out mode cam 306 is removably mounted on the drive shaft 302, it can be removed and replaced with different spin-out mode cams. For instance, FIGS. 12A and 12B illustrate two replacement spin-out mode cams 306', 306" having multiple cam members 322', 322", respectively. Due to the smaller number of cam members, the spin-out mode cam 306' is adapted for less frequent spin-out mode operations, and is hence useful, for instance, in connection with large pools or pools having minimum obstructions. On the other hand, due to the large number of cam members, the spin-out mode cam 306" is adapted for more frequent spin-out mode operations and is hence useful, for instance, in connection with small pools or pools having many obstructions or obstacles.

The spin-out mode cam 306 can be replaced with a replacement cam by accessing the control area 272 of the timer assembly 112 through the access opening 74 of the cover 22. More particularly, when the door 78 of the cover 22 is in its open position (see FIG. 5A), the spin-out mode cam 306 is accessible by a user. The spin-out mode cam 306 can be modified so that it is replaced together with the drive shaft 302 (i.e., the spin-out mode cam 306 can be formed integrally with the drive shaft 302). The top/bottom mode cam 304 is also accessible through the access opening 74. As a result, the selection or adjustment of the mode selection holes 312a-312e of the top/bottom mode cam 304 can be made through the access opening 74 without detaching the cover 22 from the chassis 20. In this manner, the cleaner 10 is adapted for easy and efficient adjustability, accommodating user preferences and/or needs.

Figure 13:
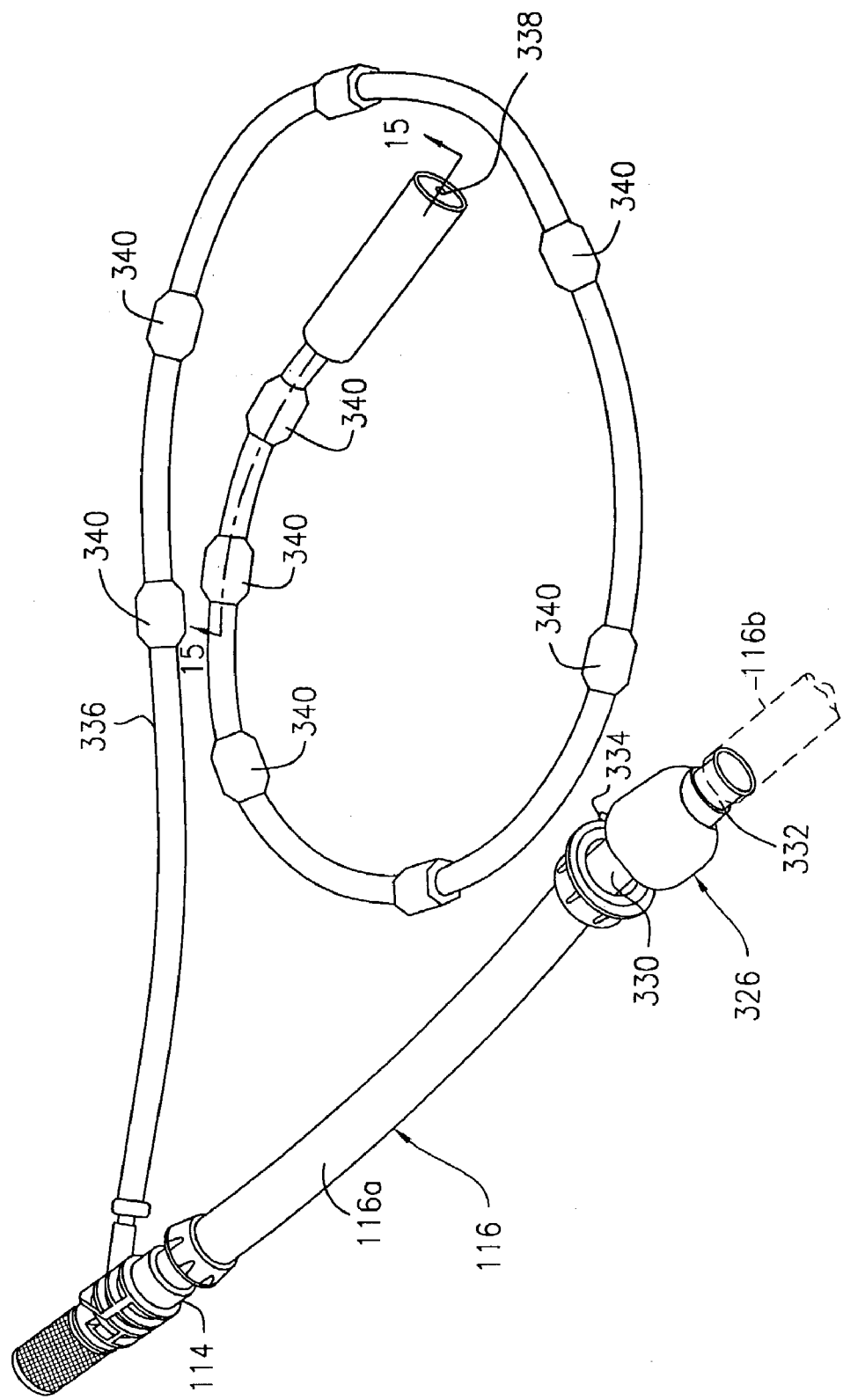
FIG. 13 is a perspective view of a hose assembly of the pool cleaner shown in FIG. 1.
Figure 14A:
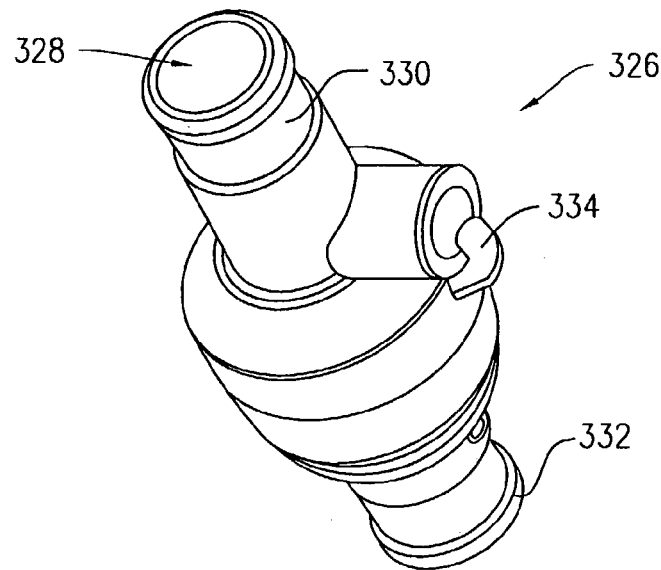
FIG. 14A is a perspective view of a swivel jet assembly of the hose assembly shown in FIG. 13.
Figure 14B:
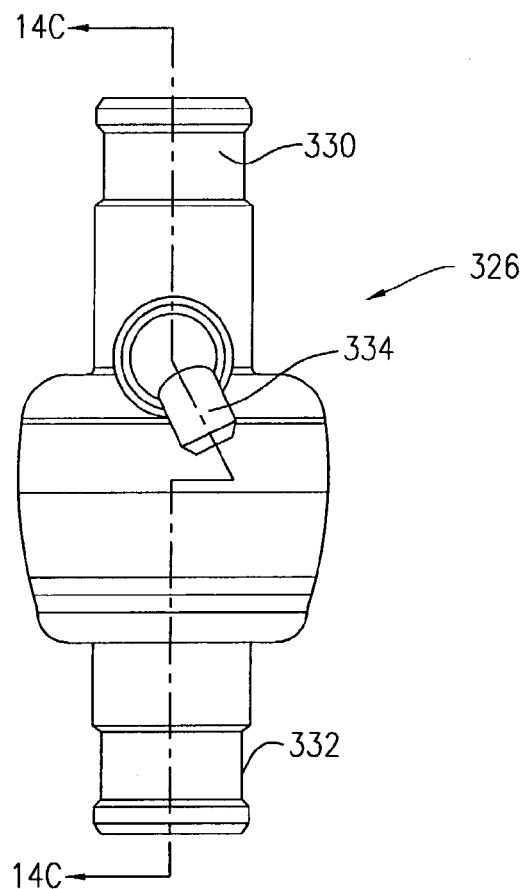
FIG. 14B is a bottom plan view of the swivel jet assembly shown in FIG. 14A.
Figure 14C:
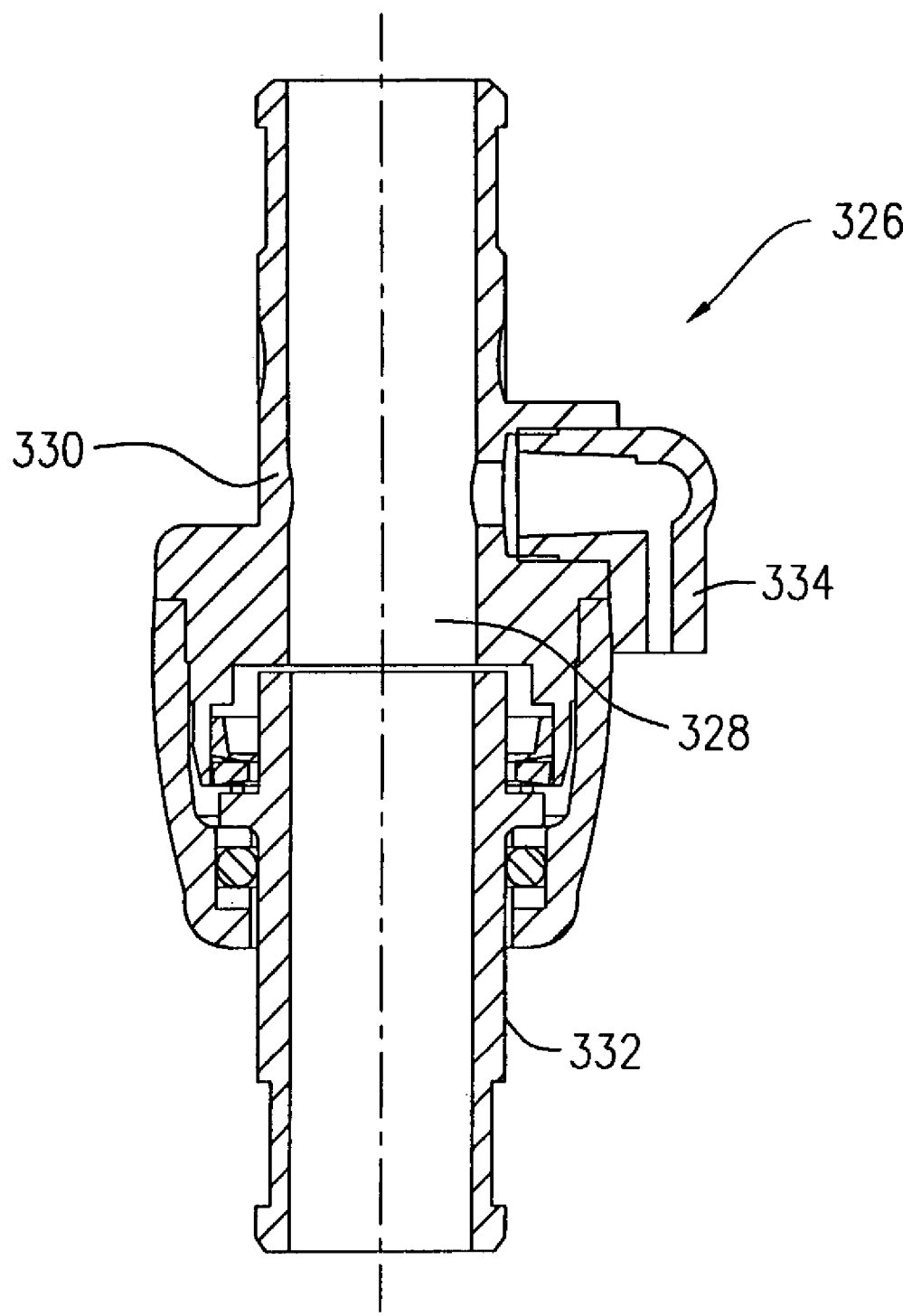
FIG. 14C is a cross-sectional view, taken along section line 14C-14C and looking in the direction of the arrows, of the swivel jet assembly shown in FIG. 14B.

Now referring to FIGS. 13-14C, the supply hose 116 is provided with a swivel jet assembly 326 mounted therein. More particularly, the supply hose 116 is divided into sections 116a, 116b by the swivel jet assembly 326. The section 116a, which is coupled to the cleaner 10, has a predetermined length such that the swivel jet assembly 326 trails the cleaner 10 at that predetermined length. The swivel jet assembly 326, which has a flow channel 328 therethrough, is provided with a pair of bodies 330, 332 rotatably connected to one another. The body 330 is connected to the section 116a of the supply hose 116, while the body 332 is connected to the section 116b of the supply hose 116. A nozzle 334 extends from the body 330 and communicates with the flow channel 328 so as to continuously discharge a high velocity stream of water during the operation of the cleaner 10. The nozzle 334 is oriented in a rearward direction (i.e., away from the cleaner 10) and is slanted relative to the longitudinal axis of the swivel jet assembly 326. The nozzle 334 is positioned such that when the hose 116 is properly attached to the cleaner 10, it is located at the bottom of the swivel jet assembly 326. Alternatively, the nozzle 334 can be position on the top of the swivel jet assembly 326.

Figure 16A:
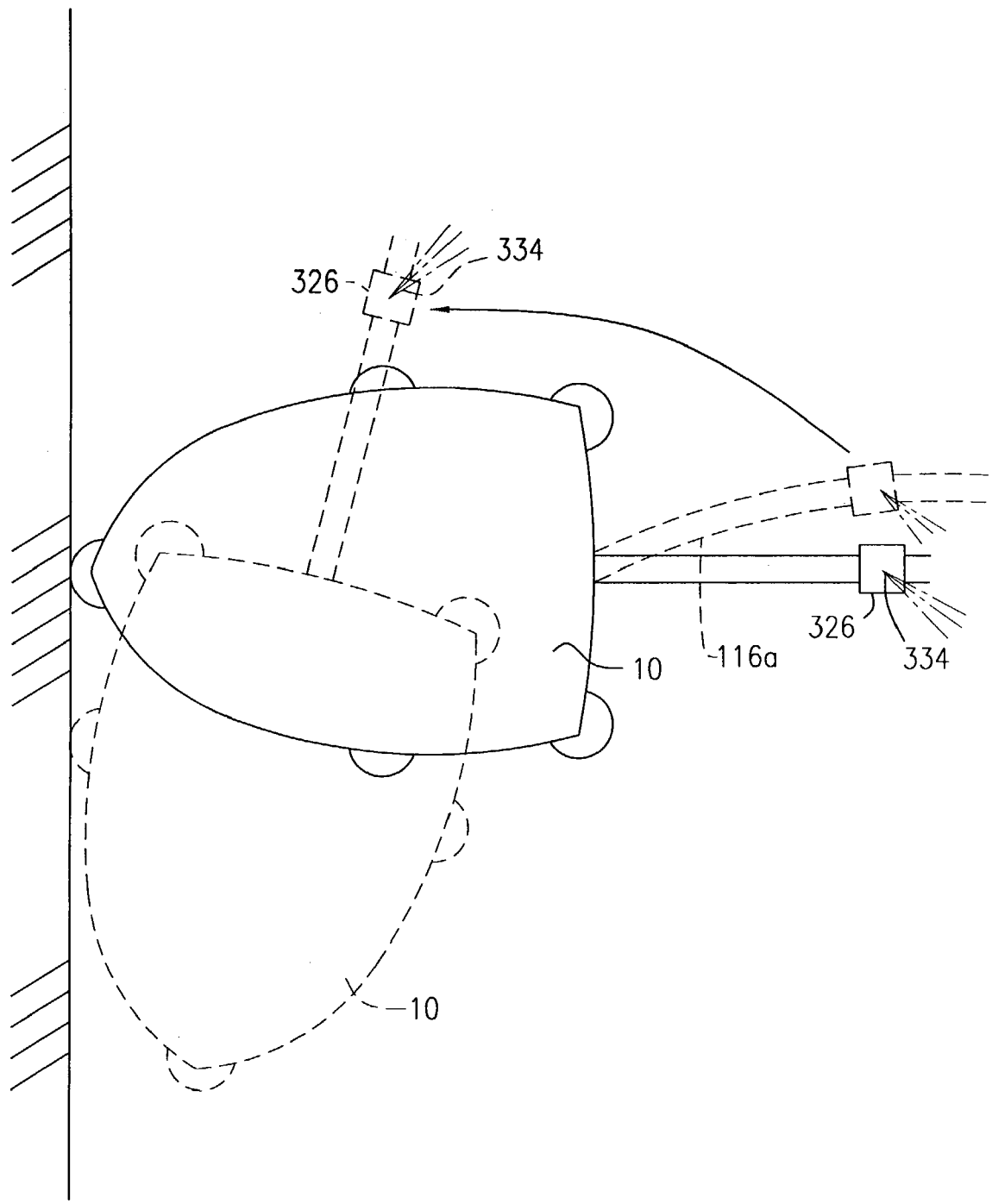
FIG. 16A is a schematic view of the pool cleaner shown in FIGS. 1-2A, illustrating the interaction between the pool cleaner and the swivel jet assembly during the operation of the pool cleaner.

In operation, the swivel jet assembly 326 functions to enhance the maneuverability of the cleaner 10 around obstructions and inhibit hose entanglement. For instance, when the cleaner 10 comes in contact with an obstruction (e.g., a wall of a swimming pool), its forward motion becomes restricted or inhibited (as represented by the solid line representation of the cleaner 10 in FIG. 16A). In response, the high velocity stream of water discharged from the nozzle 334 of the swivel jet assembly 326 causes the hose section 116a to bend and/or displaces the swivel jet assembly 326 away from the longitudinal axis of the cleaner 10 (see the broken line representation of the supply hose section 116a in FIG. 16A), causing the cleaner 10 to pivot in a generally counterclockwise direction and thereby dislodging same from the obstruction (as indicated by the broken line representation of the cleaner 10 in FIG. 16A).

Figure 16B:
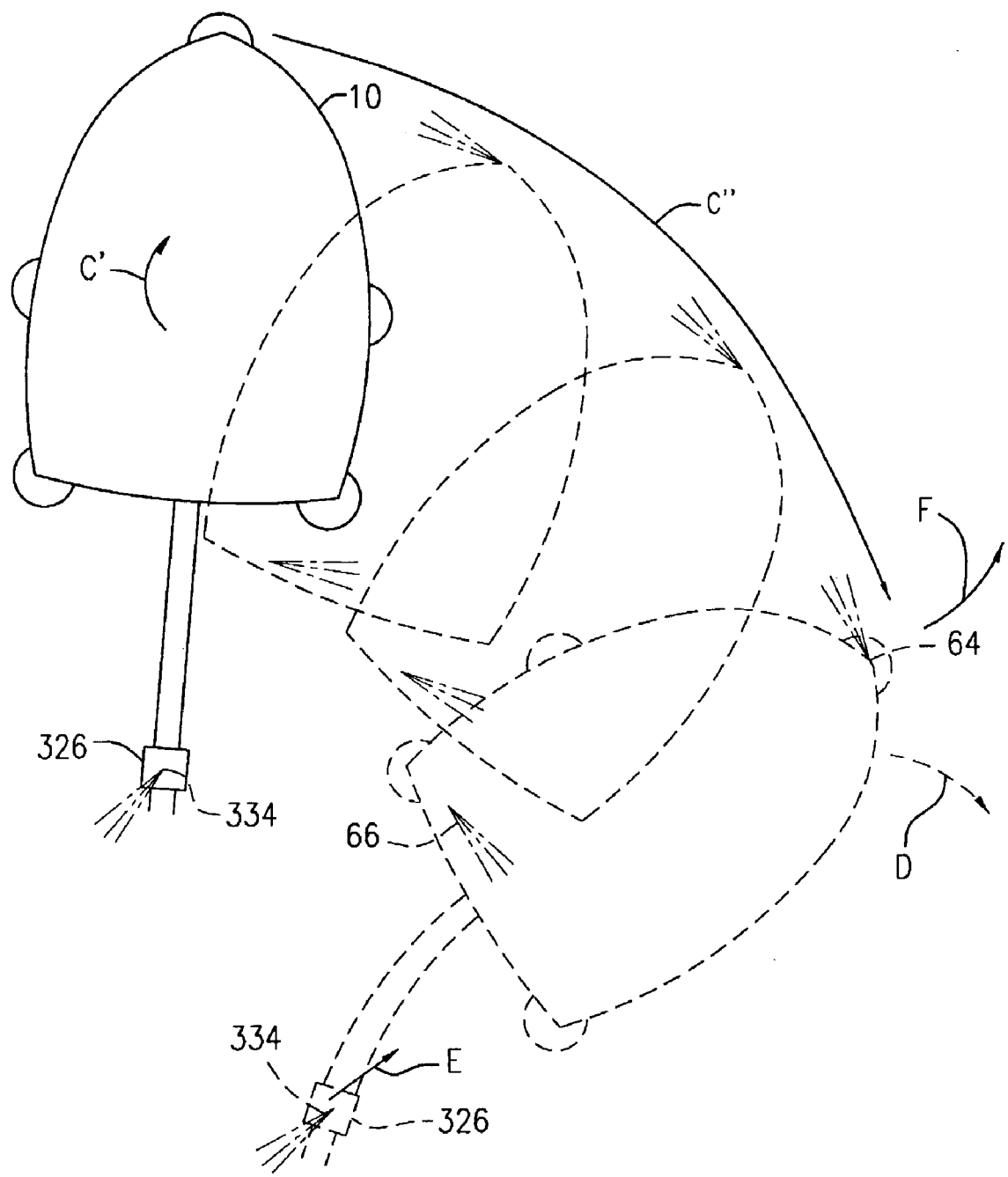
FIG. 16B is a schematic view of the pool cleaner shown in FIGS. 1-2A, illustrating its spin-out operation.

The swivel jet assembly 326 also facilitates the spin-out operation of the cleaner 10. Referring to FIG. 16B, when the cleaner 10 initiates its spin-out operation, due to the slanted orientation of the front and rear spin-out jet nozzles 64, 66, it rotates in a generally clockwise direction (as indicated by arrows C' in FIG. 16B) and moves in an arcuate sideway motion (as indicated by arrow C" in FIG. 16B). After the expiration of the spin-out mode cycle, the cleaner 10 tends to continue its clockwise rotation due to the bend created in the hose section 116a (as indicated by arrow D in FIG. 16B) Because of the force applied by the high velocity stream of water from the swivel jet assembly 326 (see arrow E in FIG. 16B), the cleaner 10 moves in a different direction (as indicated by arrow F in FIG. 16B), making the cleaner's movement more random. In addition, the swivel jet assembly 326 helps to tug the supply hose 116, reducing the amount of load carried by the cleaner 10.

Figure 15:
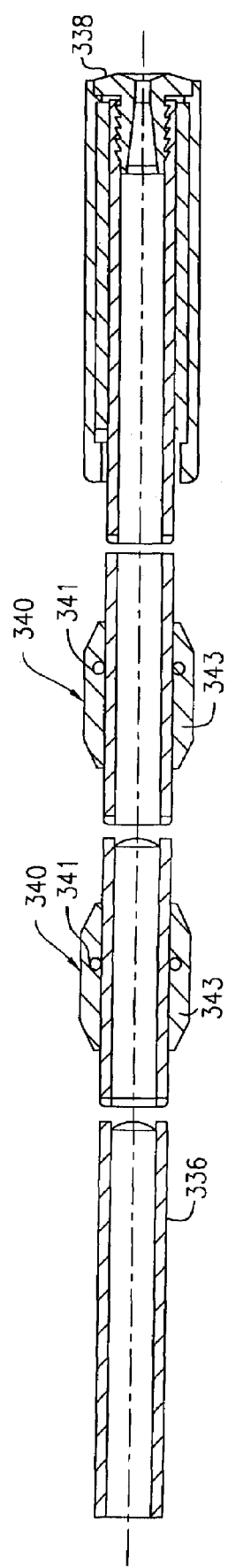
FIG. 15 is a partially exploded, cross-sectional view, taken along section line 15-15 and looking in the direction of the arrows, of the hose assembly shown in FIG. 13.

Referring back to FIG. 13, the supply hose 112 is also provided with a sweep hose 336 having a jet 338 at an end thereof. Beads 340 are mounted on the sweep hose 336 such that they are substantially immovable relative to the sweep hose 336 (see also FIG. 15). Each of the beads 340 includes a metal (e.g., stainless steel) ring 341 in a plastic enclosure 343. The plastic enclosures 343 are adapted for protecting the liner of a vinyl pool. The stainless steel rings 341 provide longer wear in concrete, granite, pebble-tech and similar pools. The stainless steel rings 341 also serve to remove hard deposits (e.g., calcium) from pool surfaces. The beads 340 in general also help to remove algae from pool surfaces.

It should be noted that the cleaner 10 can have numerous modifications and variations. For instance, the relief valves 240, 254 of the timer assembly 112 can be replaced with other types of valves. With reference to FIG. 1, the cleaner 10 can also be equipped with a pressure regulator 337 (e.g., the "L Type" flow regulator marketed by Neoperl, Waterbury, Conn.) can be mounted in a wall fitting end 339 of the supply hose 116 for maintaining a predetermined pressure.

FIGS. 17-21C depict a second embodiment of the present invention. Elements illustrated in FIGS. 17-21C, which correspond, either identically or substantially, to the elements described above with respect to the embodiment of FIGS. 1-16B, have been designated by corresponding reference numerals increased by one thousand. Unless otherwise stated, the embodiment of FIGS. 17-21C is constructed and assembled and operates in the same basic manner as the embodiment of FIGS. 1-16B.

Figure 17:
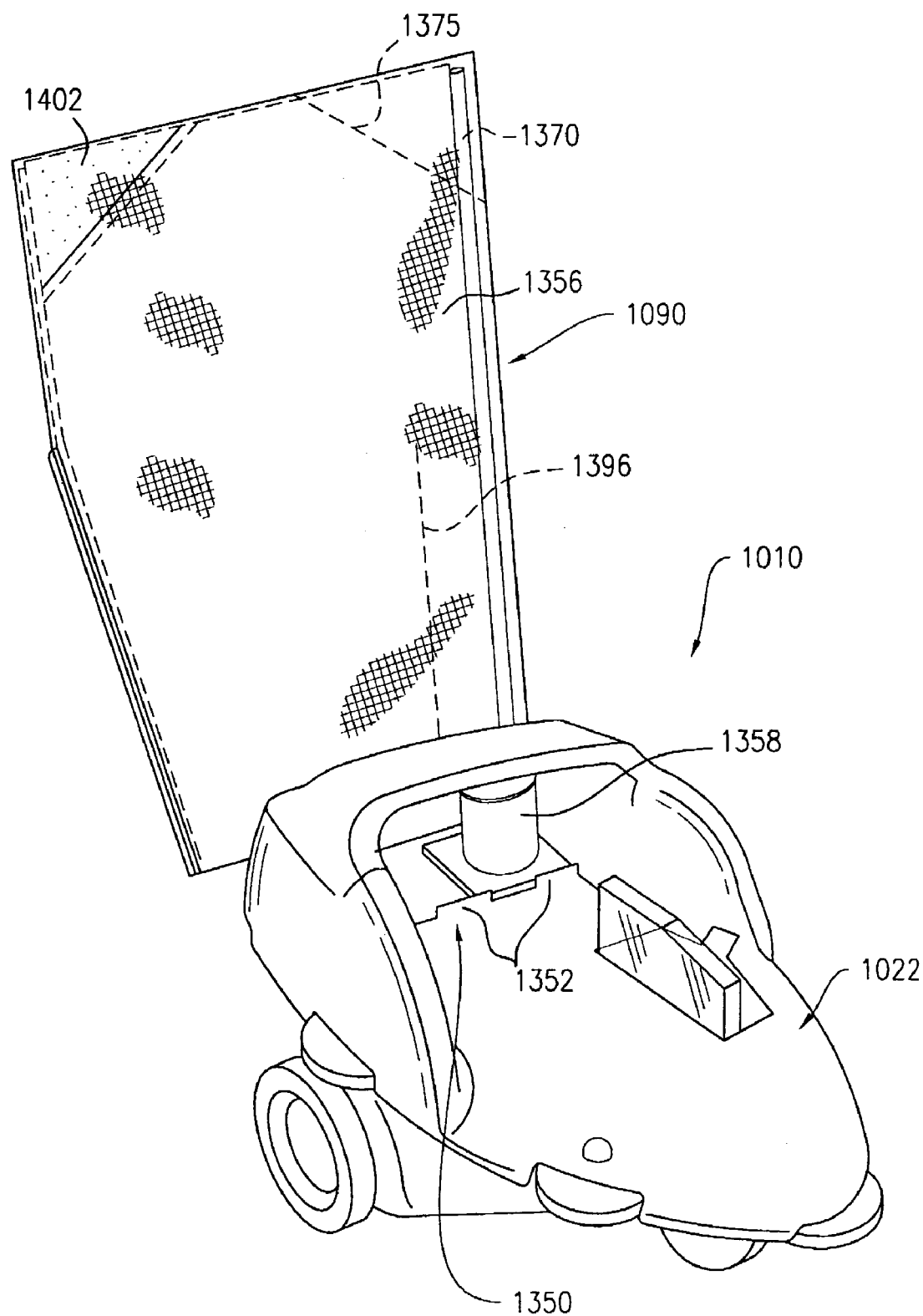
FIG. 17 is a perspective view of a pool cleaner constructed in accordance with a second exemplary embodiment of the present invention.
Figure 18:
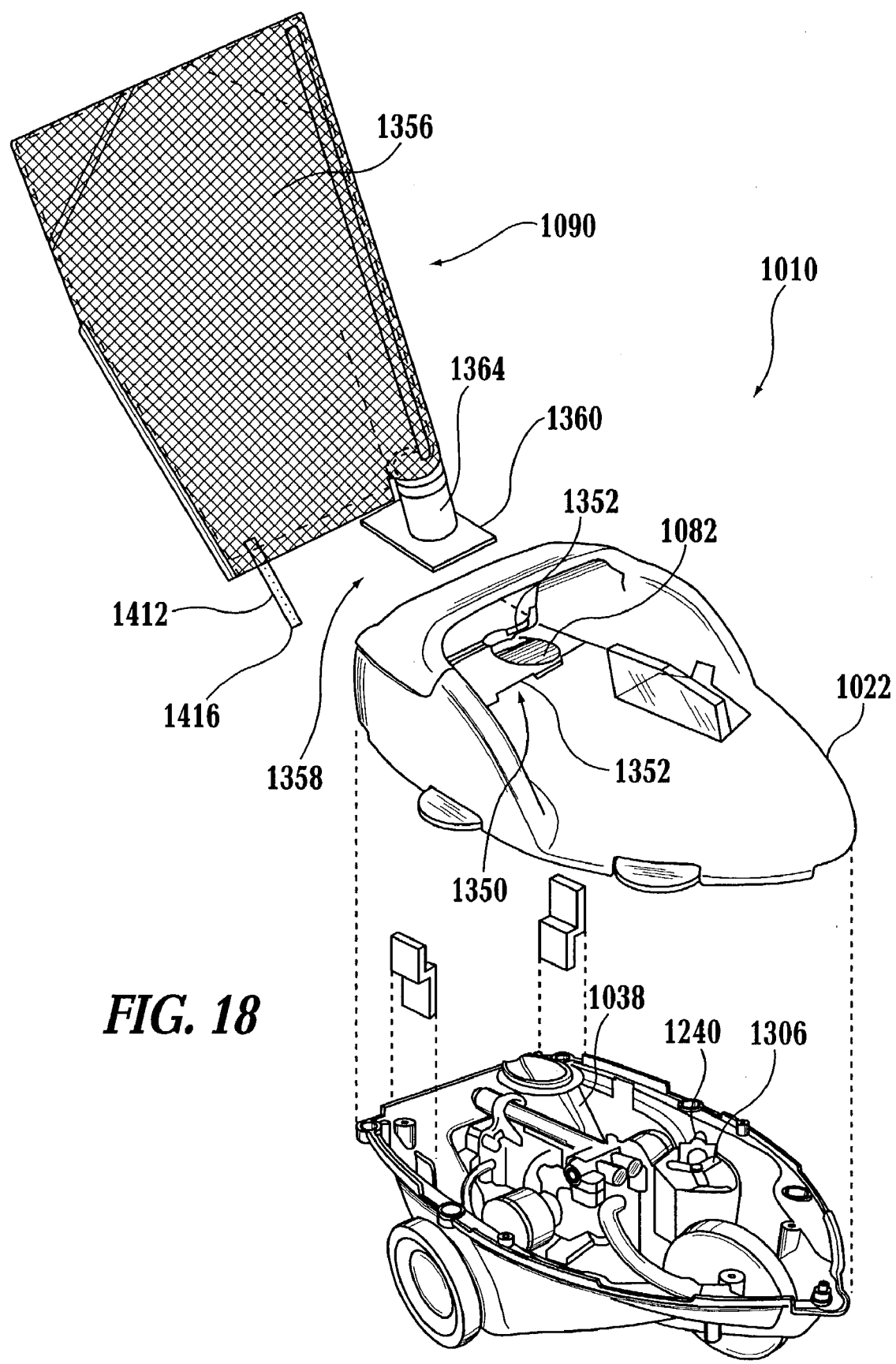
FIG. 18 is an exploded perspective view of the pool cleaner shown in FIG. 17.

FIGS. 17 and 18 show a pressure-type swimming pool cleaner 1010 constructed in accordance with the second embodiment of the present invention. While the cleaner 1010 is adapted for bottom mode and spin-out mode operations, it does not have a top mode (i.e., it remains proximate to an interior wall of a swimming pool throughout its operation). In such circumstances, the cleaner 1010 is devoid of the components of the embodiment of FIGS. 1-16B associated with the top mode operation. For instance, the cleaner 1010 is not provided with a lift/thrust jet nozzle or skimmer jets. Because a different type of filter bag is used in connection with the cleaner 1010 (as will be discussed in greater detail hereinafter), debris retention jets are not included in the cleaner 1010. In such circumstances, the cleaner 1010 is not provided with a nose gear.

Figure 20:
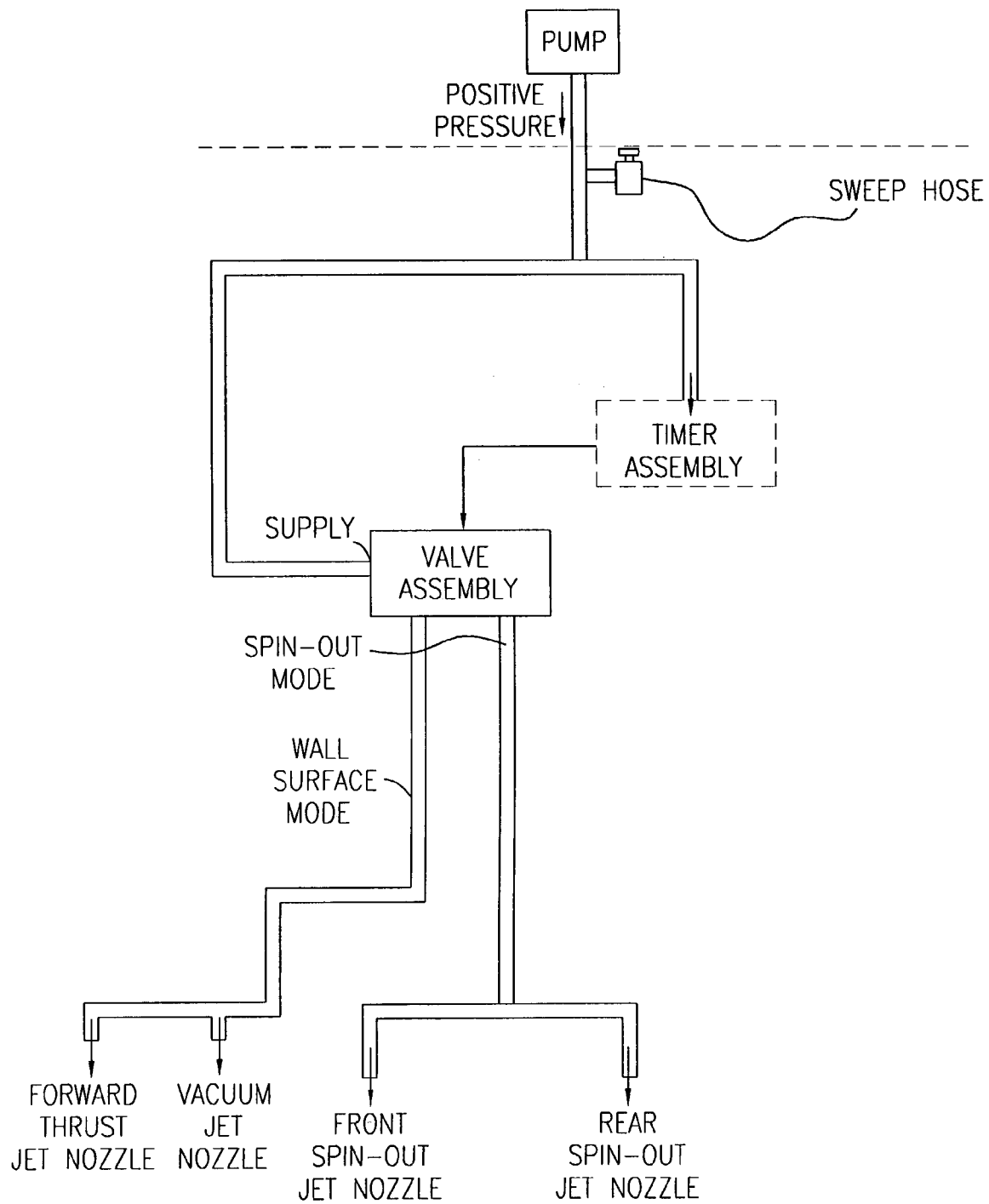
FIG. 20 is a functional block diagram depicting a water flow distribution system of the pool cleaner shown in FIGS. 17 and 18.
Figure 20A:
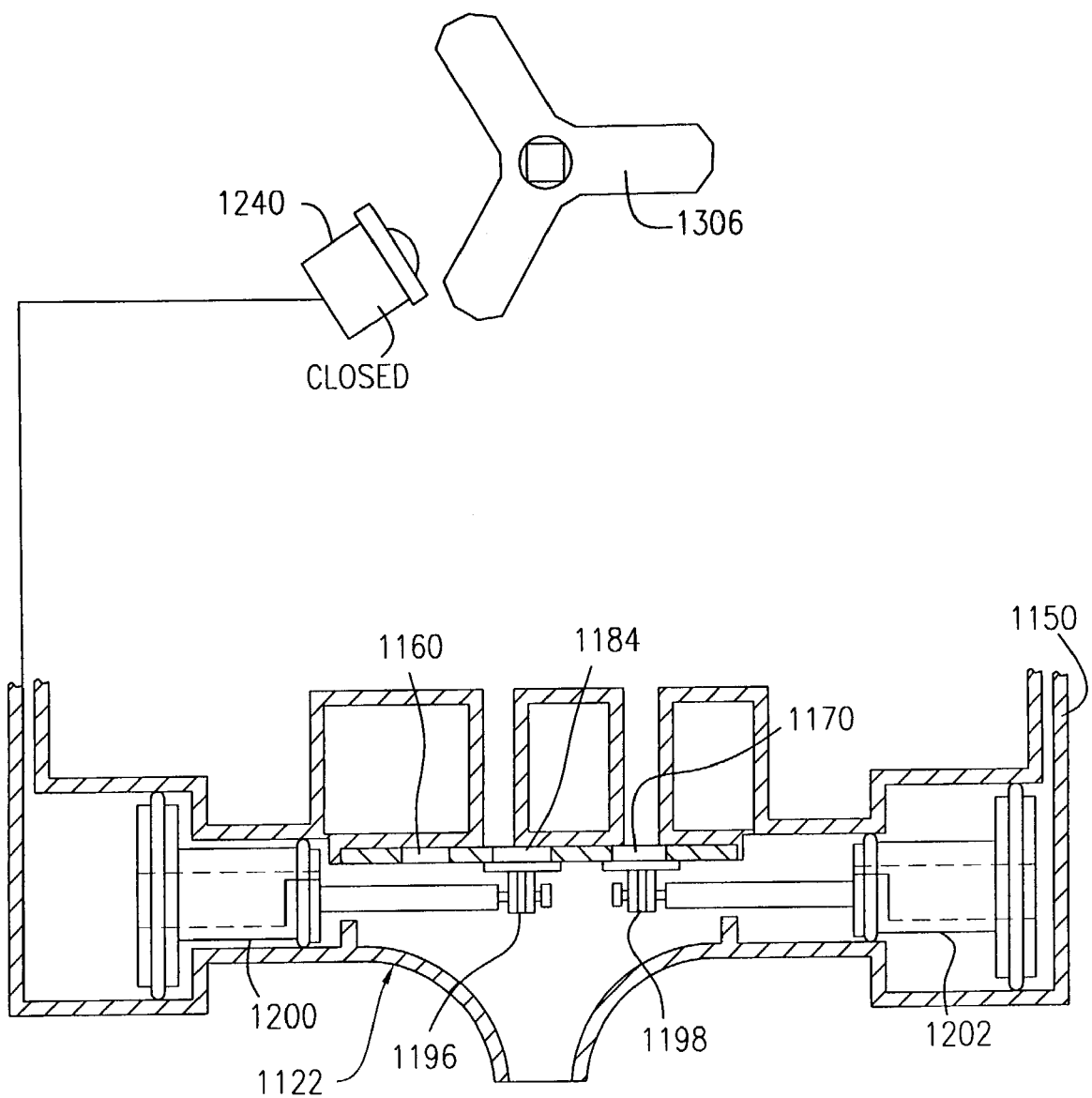
FIGS. 20A and 20B are schematic views illustrating the operation of the water distribution system shown in FIG. 20.
Figure 20B:
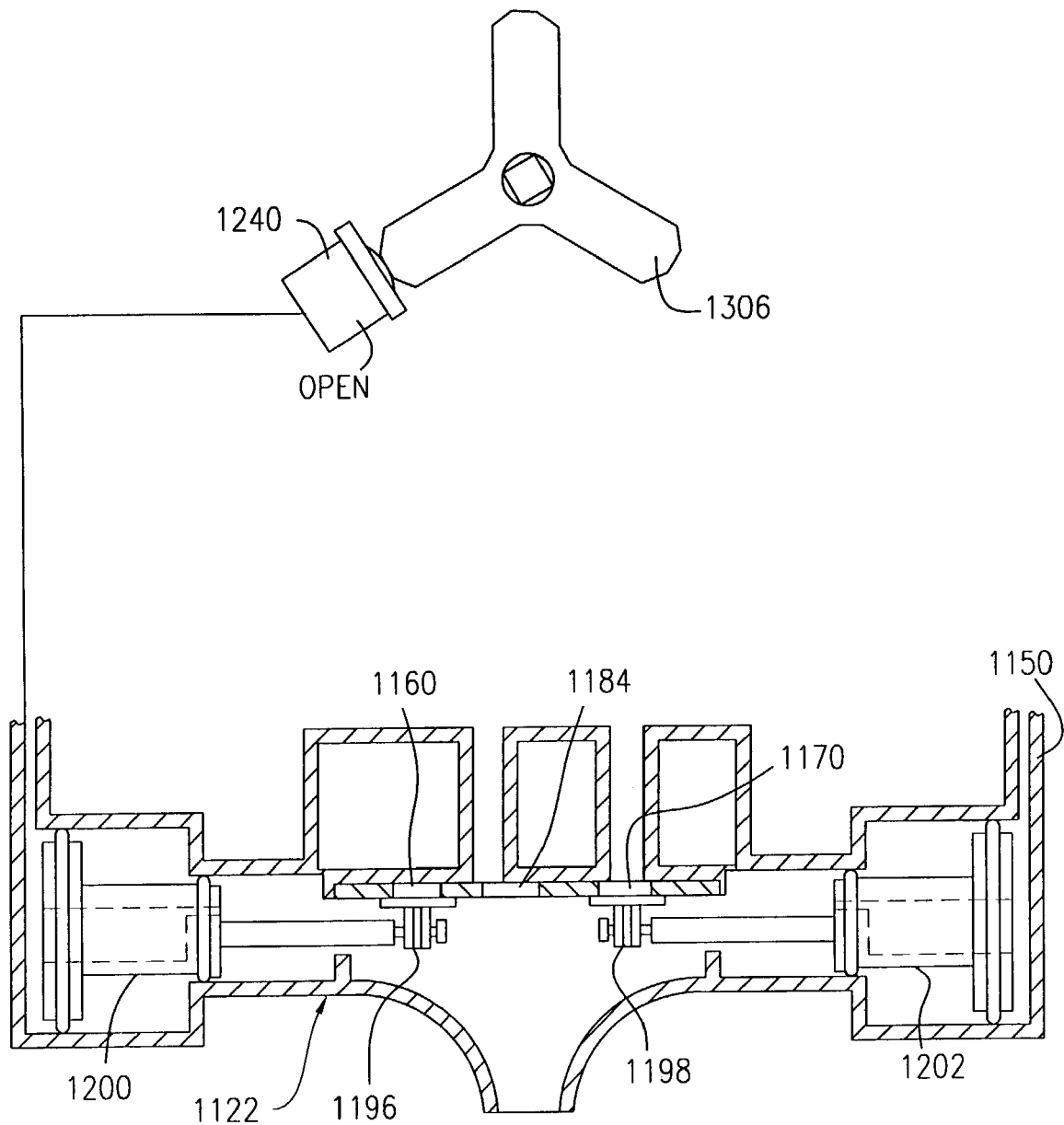
Figure 21A:
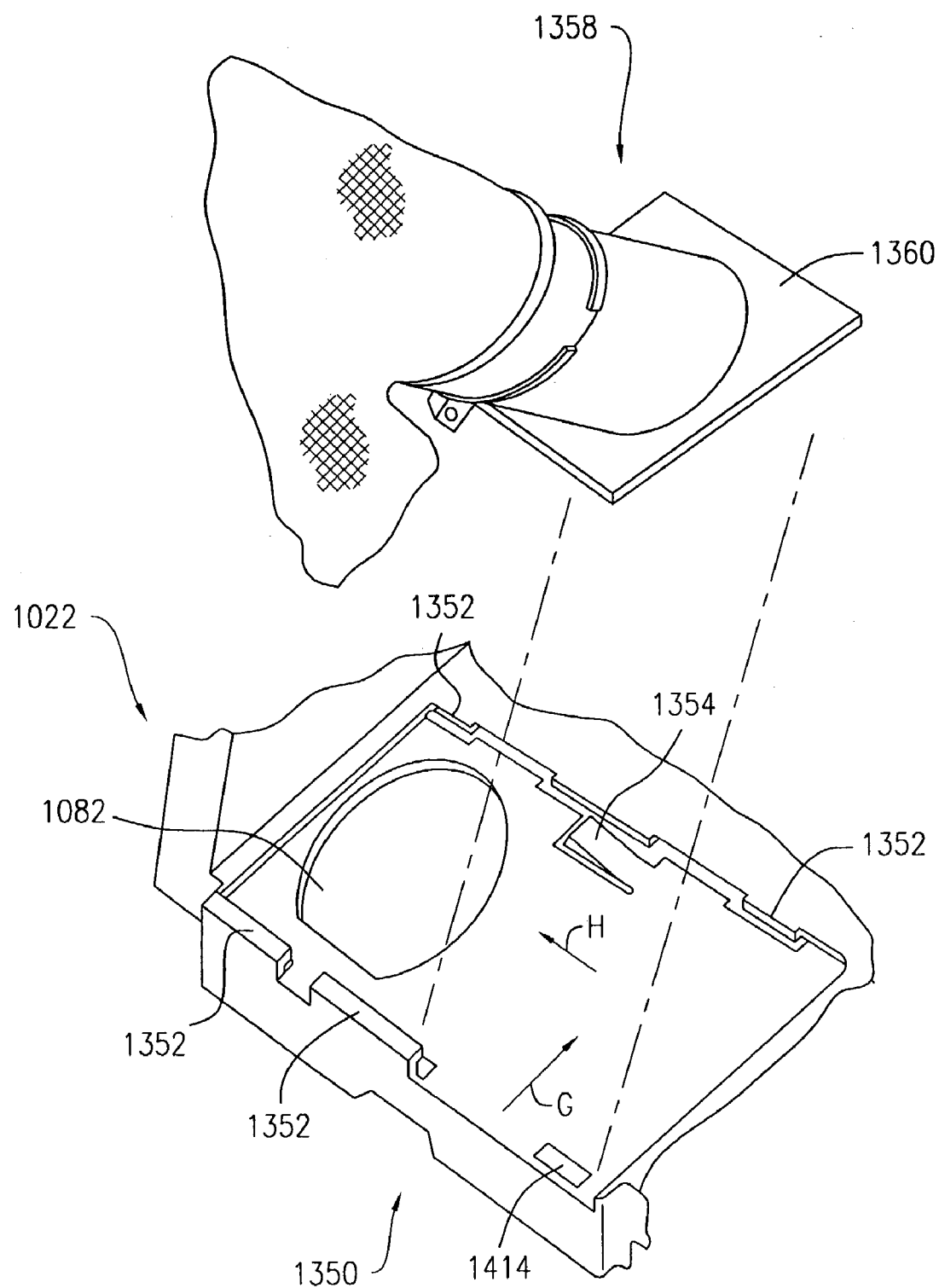
FIGS. 21A-21C are schematic views illustrating the process for mounting the debris bag assembly shown in FIGS. 19 and 19A to the pool cleaner.
Figure 21B:
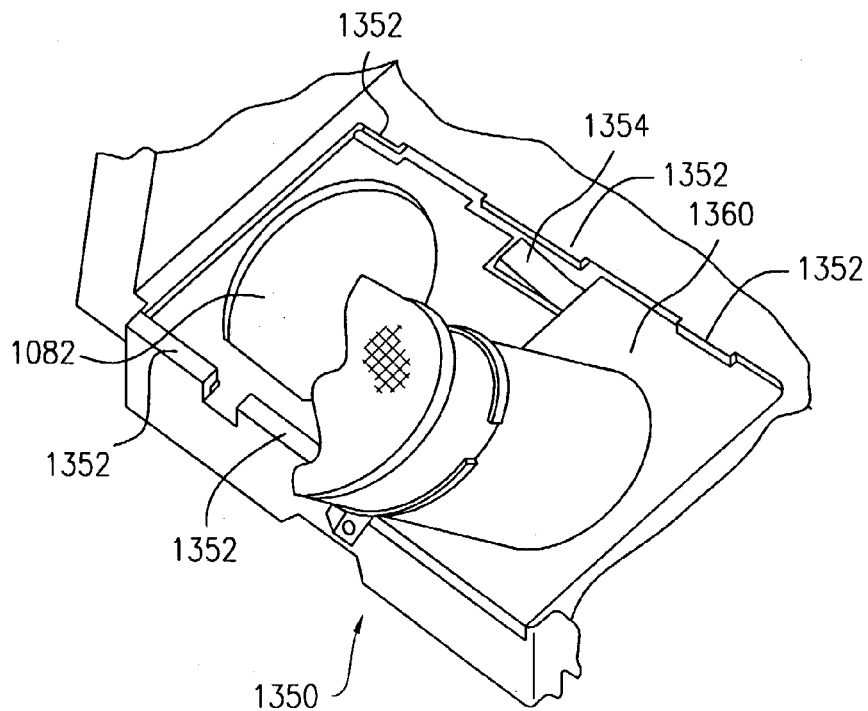
Figure 21C:
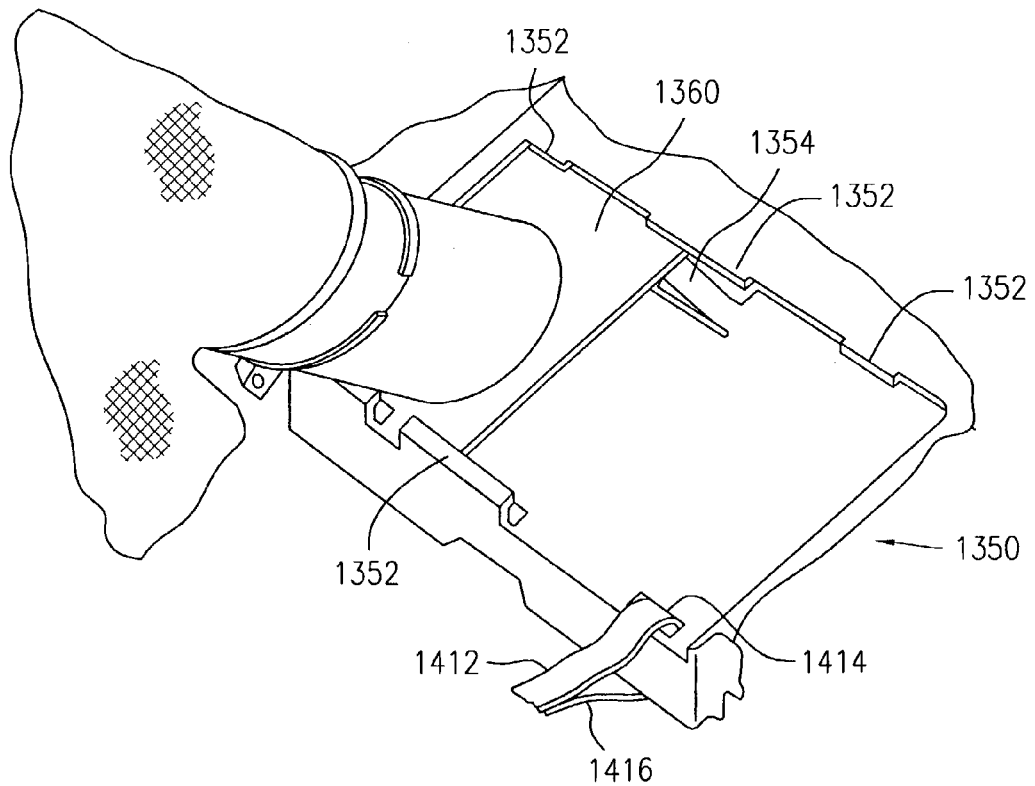

With reference to FIGS. 18, 20A and 20B, the cleaner 1010 is equipped with only one relief valve 1240 for operating a piston 1200 so as to move a valve member 1196 between a bottom mode position, in which the valve member 1196 is positioned over a spin-out mode outlet 1184 of a valve housing 1122 (see FIG. 20A), and a spin-out mode position, in which the valve member 1196 is positioned over a bottom mode outlet 1160 of the valve housing 1122 (see FIG. 20B). While the cleaner 1010 is provided with a piston 1202, it remains in its extended position throughout the operation of the cleaner 1010 so as to constantly position a valve member 1198 over a top mode outlet 1170 (see FIGS. 20A and 20B). More particularly, the valve housing 1122 has a port 1150, which is not sealed, thereby causing the downstream side of the piston 1202 to be constantly vented through the port 1150. As a result, the top mode outlet 1170 is closed throughout the operation of the cleaner 1010. Alternatively, the top mode outlet 1170 can be permanently plugged or sealed, thereby eliminating the need to provide the piston 1202 and the valve member 1198. In such circumstances, the port 1150 can be closed off.

Referring to FIGS. 20A and 20B, while the cleaner 1010 is provided with a spin-out mode cam 1306, it is not provided with a top/bottom mode cam. Like the spin-out mode cam 306 of the embodiment of FIGS. 1-16B, during the operation of the cleaner 1010, the spin-out mode cam 1306 rotates and periodically engages and disengages the relief valve 1240. When the relief valve 1240 is disengaged by the spin-out mode cam 1306, the piston 1200 is positioned in its retracted position, and the spin-out mode outlet 1184 is closed by the valve member 1196, leaving only the bottom mode outlet 1160 open (see FIG. 20A). As a result, the cleaner 1010 moves along an interior wall of a pool so as to remove debris therefrom. When the relief valve 1240 is engaged by the spin-out mode cam 1306, the piston 1200 is positioned in its extended position, and the bottom mode outlet 1160 is closed by the valve member 1196 (see FIG. 20B). As a result, the spin-out mode outlet 1184 is left open, thereby causing the cleaner 1010 to initiate its spin-out operation.

Now referring to FIGS. 18-19A and 21A, the cleaner 1010 has a cover 1022 including a hole 1082 for receiving debris removed from a pool through a suction tube 1038. The cover 1022 has a deck which includes a filter bag mounting area 1350 defined by tracks 1352 formed adjacent an end of the cover 1022. The cover 1022 also has a finger member 1354 provided on the deck of the cover 1022, as well as an opening 1082 formed in the cleaner deck. The suction tube 1038 terminates at an end which is positioned substantially flush with the cleaner deck.

Figure 19:
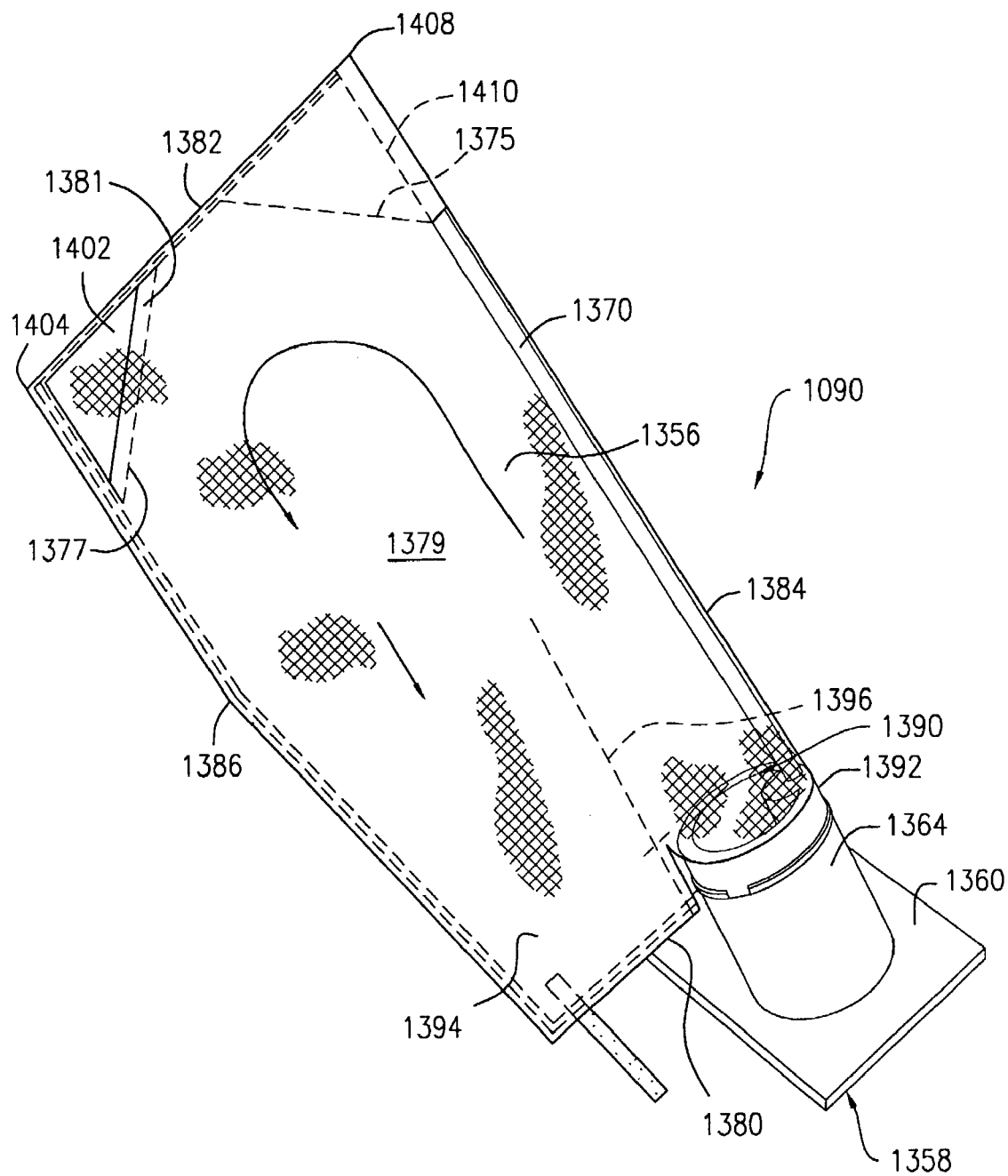
FIG. 19 is a perspective view of a debris bag assembly of the pool cleaner shown in FIGS. 17 and 18.
Figure 19A:
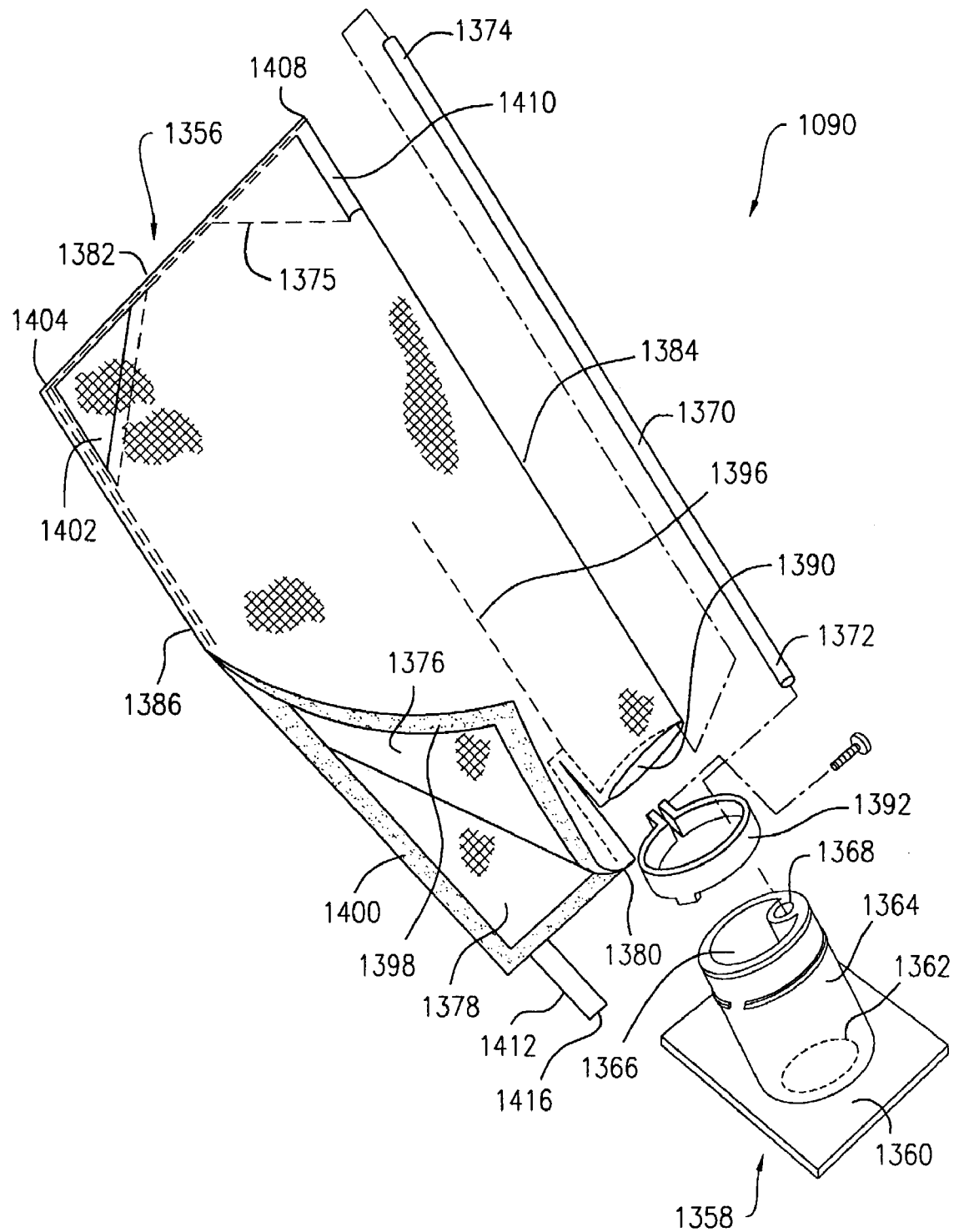
FIG. 19A is an exploded perspective view of the debris bag assembly shown in FIG. 19.

With reference to FIGS. 19 and 19A, the cleaner 1010 is also equipped with a filter bag assembly 1090. More particularly, the filter bag assembly 1090 includes a filter bag 1356 and a base plate member 1358 attached to the filter bag 1356. More particularly, the base member 1358 includes a base panel 1360 having an opening 1362 formed therein. The base panel 1360 is sized and shaped so as to be received between, and engage, the tracks 1352 of the filter mounting area 1350 for mounting the filter bag assembly 1090 to the deck of the cleaner 1010. More particularly, with reference to FIGS. 21A-21C, the base member 1358 is adapted to be mounted to the filter bag mounting area 1350 by sliding the base member 1358 toward the front of the cleaner 1010 (see arrow G in FIG. 21A) and then sliding same transversely toward the hole 1082 (see arrow H in FIG. 21A). When the base member 1358 is properly attached to the cleaner 1010, the opening 1362 of the base panel 1360 registers with the hole 1082 of the cover 1022. The finger member 1354 is adapted to retain the base member 1358 in place between the tracks 1352. A column 1364 projects from the base panel 1360 at an angle and includes a conduit 1366 extending completely through the column 1364. A mounting hole 1368 is formed in the column 1364, while a pole 1370 having a pair of ends 1372, 1374 is provided. The end 1372 of the pole 1370 is received in the mounting hole 1368.

Still referring to FIGS. 19 and 19A, the filter bag 1356 has a lower end 1380, an upper end 1382 and left and right sides 1384, 1386. The filter bag 1356 includes a pair of filter layers 1376, 1378 stitched (i.e., sewn) to one another along the left side 1384 and the upper end 1382 and partially along the right side 1386. The filter layers 1376, 1378 are also stitched to one another along a seam 1375 and a seam 1377. More particularly, the seam 1375 is angled and extends between the left side 1384 and the upper end 1382 of the filter bag 1356, while the seam 1377 is angled and extends between the right side 1386 and the upper end 1382. The left and right sides 1384, 1386, the seams 1375, 1377 and the upper end 1382 of the filter bag 1356 cooperate to define an inner cavity 1379 for receiving debris from the cleaner 1010. The seam 1377, the upper end 1382 and the right side 1386 of the filter bag 1356 cooperate to define a compartment 1381 which is permanently separated from the inner cavity 1379 by the seam 1377 and which does not hence form part of the inner cavity 1379.

The filter bag 1356 also includes a debris inlet 1390 formed adjacent to the lower end 1380 and the left side 1384. The debris inlet 1390 receives an end of the column 1364 and is retained thereto by a retainer ring 1392 for removably attaching the filter bag 1356 to the base member 1358. The filter bag 1356 also has a debris collection area 1394 located adjacent to the right side 1386 and the lower end 1380. More particularly, the filter layers 1376, 1378 are sewn together along a seam 1396 so as to separate the debris inlet 1390 from the debris collection area 1394. The seam 1396 extends generally upwardly from the lower end 1380. Strips of releasable fasteners 1398, 1400 (e.g., hook-and-loop type fasteners) are attached to the filter layers 1376, 1378, respectively, along the lower end 1380 and the right side 1386 of the filter bag 1356. In this manner, debris can be removed from the debris collection area 1394 of the filter bag 1356.

A float member 1402 is retained in the compartment 1381 which is located adjacent to a corner 1404 of the filter bag 1356 (see FIG. 19). Because of the float member 1402, during the operation of the cleaner 1010, the corner 1404 tends to be positioned above the debris collection area 1394, thereby facilitating the collection of debris in the debris collection area 1394.

Referring to FIG. 19, the seam 1375 is formed adjacent to a corner 1408 defined by the upper end 1382 and the left side 1384 and is oriented so as to deflect flow of water and hence debris from the inlet 1390 toward the debris collection area 1394 (as indicated by arrows in FIG. 19). In this regard, the seam 1377 functions to deflect flow of water toward the debris collection area 1394 to cause debris to settle in the debris collection chamber 1394. Because the float member 1402 is retained in the compartment 1381 and is not hence positioned in the inner cavity 1379, it does not interfere with water flow within the inner cavity 1379, thereby facilitating the settlement of debris in the debris collection area 1394.

Adjacent to the seam 1375, a pouch 1410 is formed for receiving the end 1374 of the pole 1370 (see FIGS. 19 and 19A). When assembled, the pole 1370 is placed within the filter bag 1356 so as to keep same in proper orientation. A mounting strip 1412 (see FIG. 19A) is attached to the filter bag 1356 adjacent the debris collection area 1394, while a slot 1414 is formed in the cover 1022 (see FIGS. 21A and 21C). The mounting strip 1412 has an end 1416 sized and shaped so as to be inserted through the slot 1414 and looped around for attachment to the mounting strip 1412 (see FIG. 21C). In this manner, the debris collection area 1394 is positioned adjacent to the cleaner 1010 so as to prevent the filter bag 1356 from sagging and creating a drag on the cleaner 1010.

Figure 22:
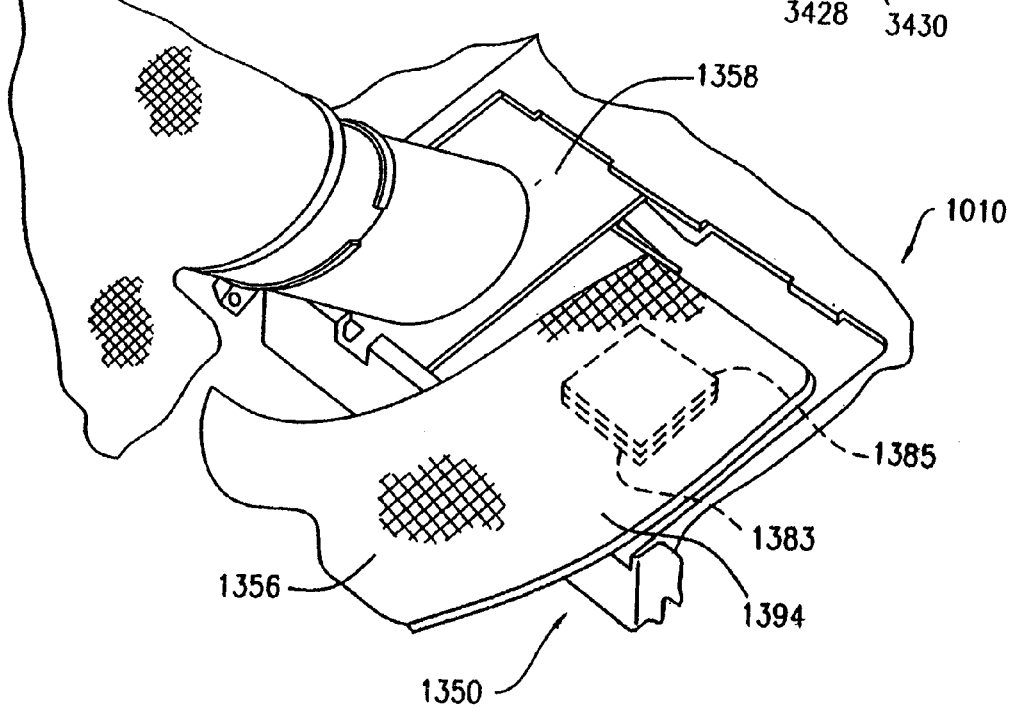
FIG. 22 is a schematic view of a modified version of a securing mechanism utilized in the debris bag assembly shown in FIG. 21C.

It should be noted that the cleaner 1010 can have numerous modifications and variations. For instance, the mounting strip 1412 can be replaced with other quick release devices to maintain the debris collection area 1394 close to the cleaner 1010. With reference to FIG. 22, a fastener 1383 can be mounted to the filter bag mounting area 1350 of the cleaner 1010, while a mating fastener 1385 can be affixed to the filter bag 1356 adjacent to the debris collection area 1394 for releasable attachment to the fastener 1383. The fastener 1383 can be recessed into the filter bag mounting area 1350 so as not to interfere with the mounting of the base member 1358 to the cleaner 1010. The filter bag 1356 can also be modified to have a second float positioned outside the inner cavity 1379, as shown in FIG. 4.

Figure 23A:
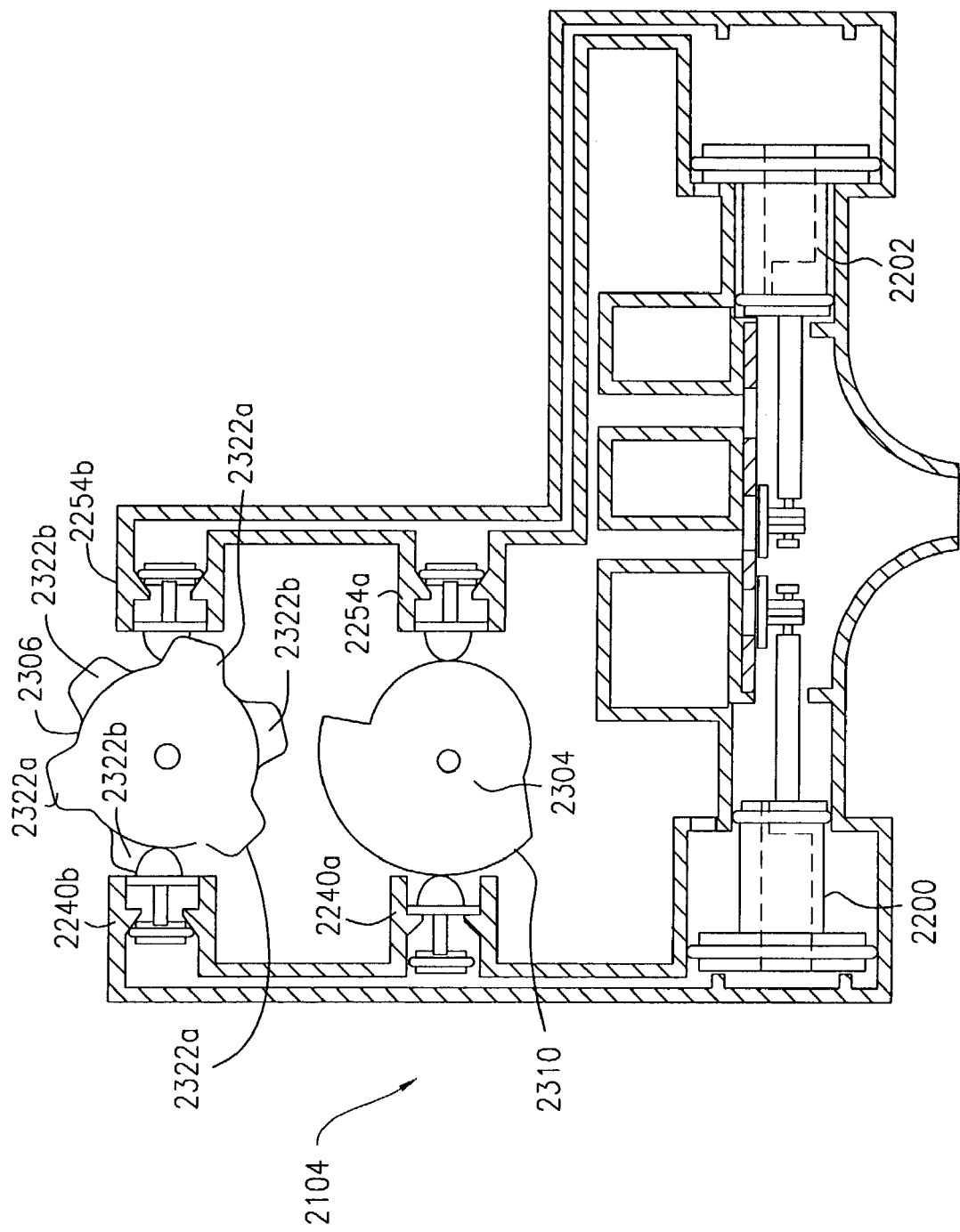
FIG. 23A is a schematic cross-sectional view of a modified version of the water distribution system shown in FIGS. 7A and 7B.
Figure 23B:
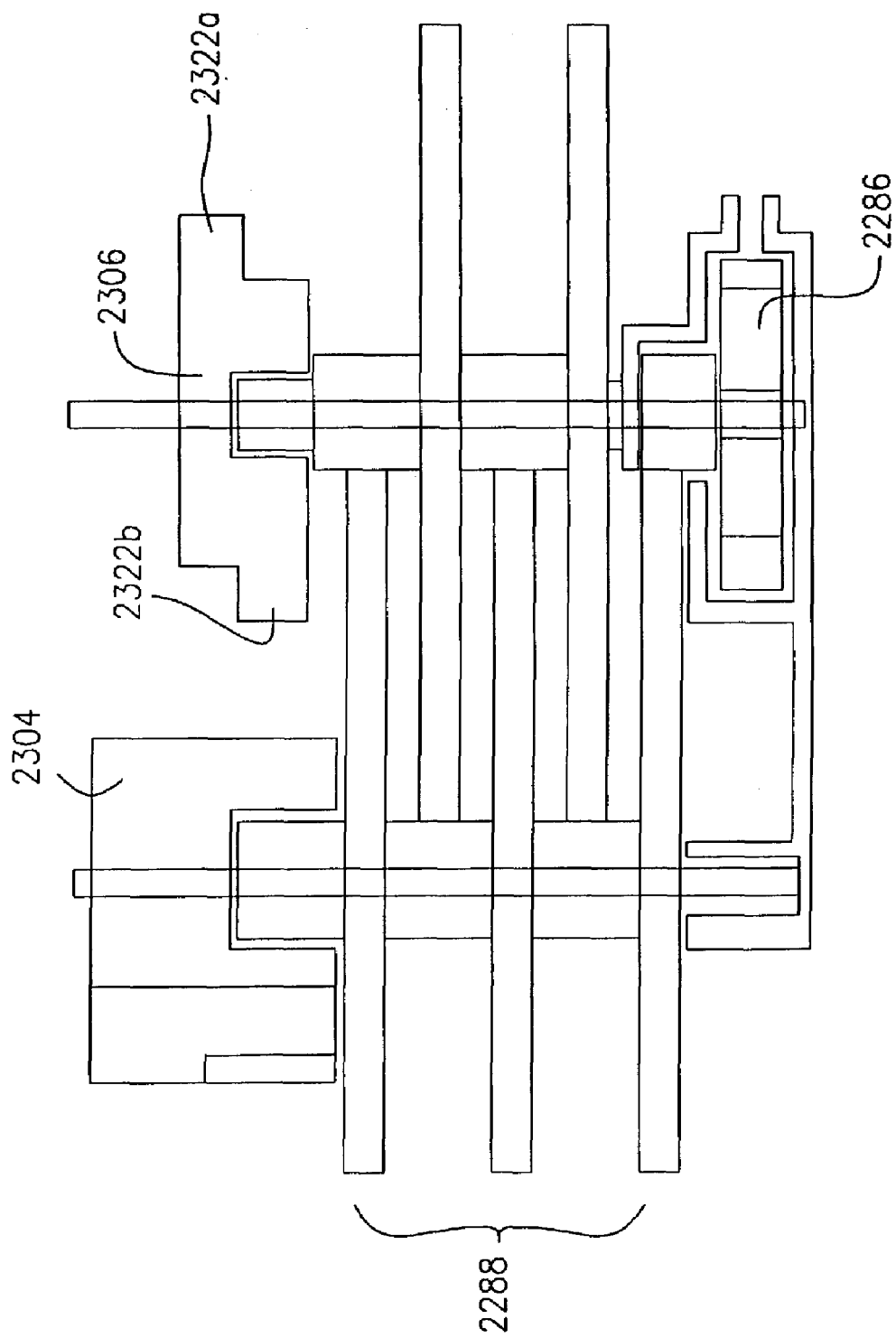
FIG. 23B is a schematic elevational view of the modified water distribution system shown in FIG. 23A.

FIGS. 23A and 23B illustrate a modified version of the water distribution system 104 of the embodiment shown in FIGS. 1-16B. Elements illustrated in FIGS. 23A and 23B, which correspond, either identically or substantially, to the elements described above with respect to the embodiment of FIGS. 1-16B, have been designated by corresponding reference numerals increased by two thousand. Unless otherwise stated, the modified version of FIGS. 23A and 23B is constructed and assembled and operates in the same basic manner as the water distribution system 104 of the embodiment of FIGS. 1-16B.

With reference to FIGS. 23A and 23B, a water distribution system 2104 has a pair of pistons 2200, 2202. The downstream side of the piston 2200 has a top/bottom mode relief valve 2240$a$ (e.g., a poppet valve) and a spin-out mode valve 2240$b$ (e.g., a poppet valve), while the downstream side of the piston 2202 has a top/bottom mode relief valve 2254$a$ (e.g., a poppet valve) and a spin-out mode valve 2254$b$ (e.g., a poppet valve). The water distribution system 2104 also has a top/bottom mode cam 2304 and a spin-out mode cam 2306 mounted side-by-side on a control area so as to engage the top/bottom mode relief valves 2240$a$, 2254$a$ and the spin-out mode relief valves 2240$b$, 2254$b$, respectively. The top/bottom mode cam 2304 has an arc-shaped cam portion 2310 and is adapted to rotate in a single direction (i.e., it does not reciprocate). Unlike the spin-out mode cam 306 of the embodiment of FIGS. 1-16B, the spin-out mode cam 2306 has a set of cam members 2322$a$ and a set of cam members 2322$b$. More particularly, the cam members 2322$a$ and the cam members 2322$b$ are vertically offset such that the cam members 2322$a$ are engageable only with the spin-out mode relief valve 2240$b$ and the cam members 2322$b$ are engageable only with the spin-out mode relief valve 2254$b$. The top/bottom mode cam 2304 and the spin-out mode cam 2306 are driven by a turbine 2286 and a gear train 2288.

When any of the top/bottom mode relief valve 2240$a$ and the spin-out mode relief valve 2240$b$ is in an open position, the downstream side of the piston 2200 is vented, and, as a result, the piston 2200 is in its extended position. Likewise, when any of the top/bottom mode relief valve 2254$a$ and the spin-out mode relief valve 2254$b$ is in an open position, the downstream side of the piston 2202 is vented, and, as a result, the piston 2202 is in its extended position. Conversely, when both of the top/bottom mode relief valve 2240$a$ and the spin-out mode relief valve 2240$b$ are in their closed positions, the downstream side of the piston 2200 is pressurized, and, as a result, the piston 2200 is in its retracted position. Similarly, when both of the top/bottom mode relief valve 2254$a$ and the spin-out mode relief valve 2254$b$ are in their closed positions, the downstream side of the piston 2202 is pressurized, and, as a result, the piston 2202 is in its retracted position. The positions of the pistons 2200 and 2202 in relation to the condition of the relief valves 2240$a$, 2240$b$, 2254$a$, 2254$b$ are summarized in the table of FIG. 23.

Figure 26:
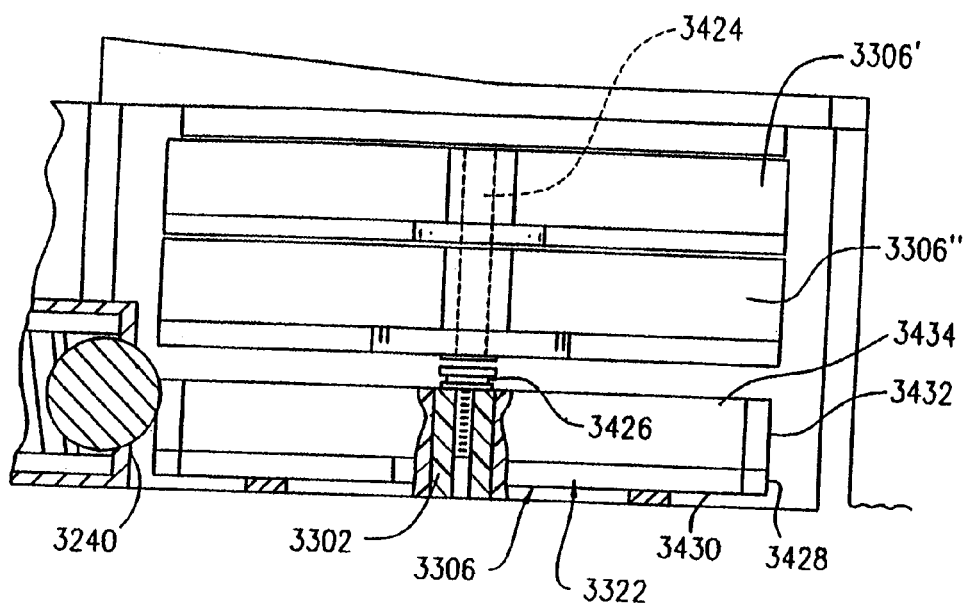
FIG. 26 is a cross-sectional view of the portion of the pool cleaner shown in FIG. 25.
Figure 27:
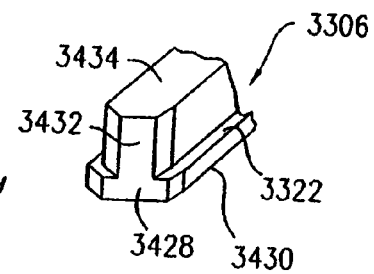
FIG. 27 is a perspective view of a cam member of a spin-out cam utilized in the pool cleaner shown in FIGS. 25 and 26.
Figure 25:
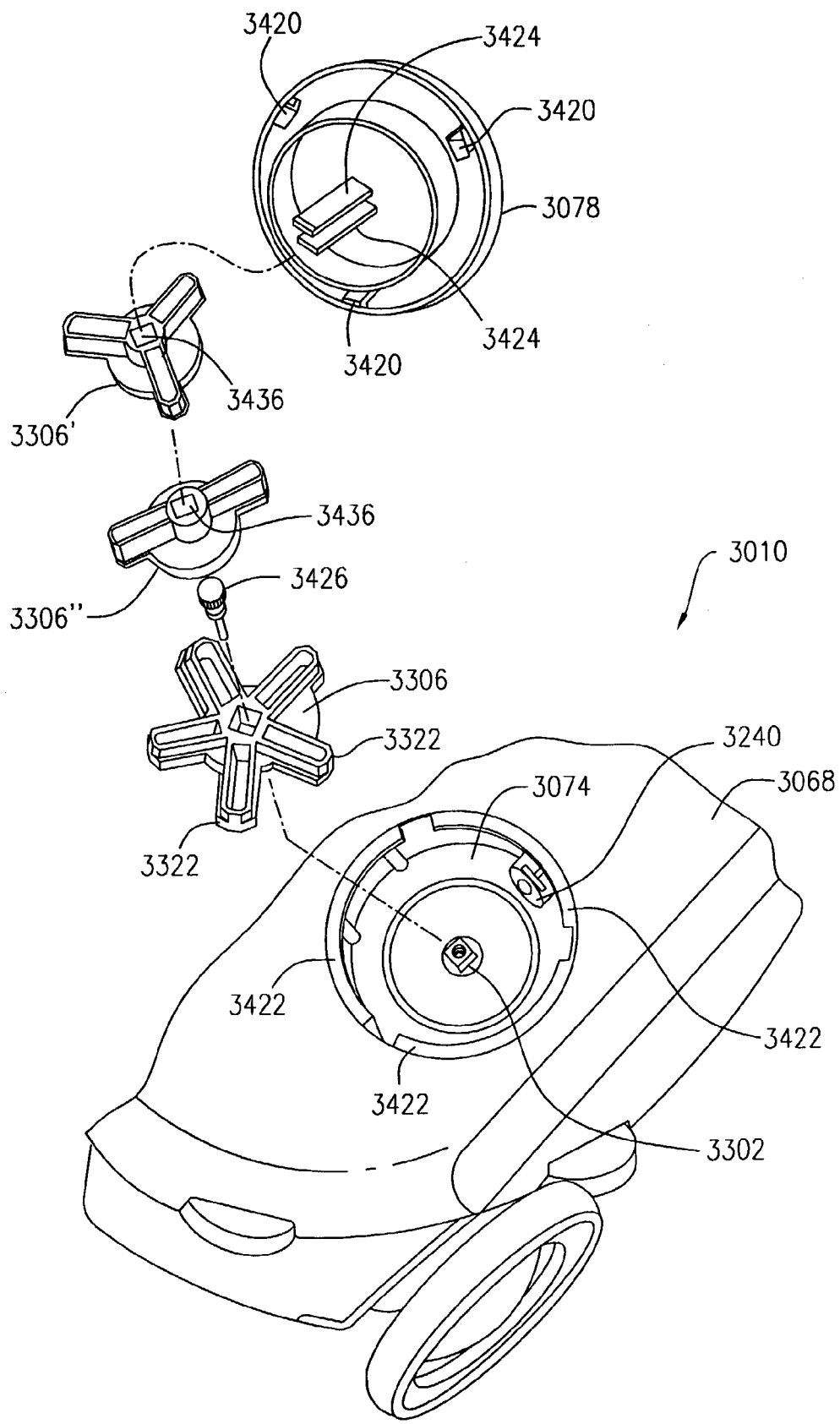
FIG. 25 is a partially exploded view of a portion of a swimming pool cleaner, illustrating modified versions of various components of the pool cleaner shown in FIGS. 1-16B.

FIGS. 25-27 illustrate modified versions of various components of the embodiment shown in FIGS. 1-16B. Elements illustrated in FIGS. 25-27, which correspond, either identically or substantially, to the elements described above with respect to the embodiment of FIGS. 1-16B, have been designated by corresponding reference numerals increased by three thousand. Unless otherwise stated, the modified versions illustrated in FIGS. 25-27 are constructed and assembled and operate in the same basic manner as their counterparts shown in FIGS. 1-16B. The modified versions shown in FIGS. 25-27 can be utilized in the embodiment illustrated in FIGS. 17-21C.

Referring to FIGS. 25-27, a cleaner 3010 has a deck 3068 equipped with an access opening 3074 formed therein. A cap 3078 is removably attached to the deck 3068 for covering the access opening 3074. In this regard, quick-release connectors 3420, 3422 (e.g., bayonet-type connectors) are provided on the cap 3078 and the deck 3068, respectively, for removably attaching the cap 3078 to the deck 3068. Fingers 3424 depend from the cap 3078 for purposes to be discussed hereinafter.

The cleaner 3010 is also equipped with a drive shaft 3302 and a spin-out cam 3306 mounted on the drive shaft 3302 for engaging a relief valve 3240 so as to cause the cleaner 3010 to periodically go into its spin-out mode. A screw 3426 removably secures the spin-out cam 3306 to the drive shaft 3302. The spin-out cam 3306 has a plurality of cam members 3322, each of which has a cam engaging surface 3428 on one side 3430 of the spin-out cam 3306 and a cam engaging surface 3432 on an opposite side 3434 of the spin-out cam 3306 (see FIGS. 26 and 27). The cam engaging surfaces 3428 are positioned such that when the spin-out cam 3306 is placed on the drive shaft 3302 with the side 3430 facing upwardly, only the cam engaging surfaces 3428 are engageable with the relief valve 3240. Likewise, the cam engaging surfaces 3432 are positioned such that when the spin-out cam 3306 is placed on the drive shaft 3302 with the side 3434 facing upwardly, only the cam engaging surfaces 3432 are engageable with the relief valve 3240. Each of the cam engaging surfaces 3428 has a width, and hence a spin-out duration, different from the width and the spin-out duration of the cam engaging surfaces 3432. As a result, the side 3430 of the spin-out cam 3306 (i.e., the cam engaging surfaces 3428) has a spin-out "program" different from the spin-out "program" associated with the side 3434 (i.e., the cam engaging surfaces 3432) of the spin-out cam 3306. For instance, the side 3430 of the spin-out cam 3306, which have a wider width and hence a longer spin-out duration, is suitable for summer use, while the side 3434 of the spin-out cam 3306, which has a shorter width and hence a shorter spin-out duration, is suitable for winter use. In such circumstances, the cleaner 3010 can be equipped for summer or winter use by simply changing the orientation of the spin-out cam 3306.

Referring to FIGS. 25 and 26, the cleaner 3010 is equipped with replacement spin-out cams 3306', 3306" carried in the access opening 3074 by the cap 3078. More particularly, each of the replacement cams 3306', 3306" has a hole 3436 for receiving the drive shaft 3302, as well as the fingers 3424 of the cap 3078. The replacement cams 3306', 3306" are removably mounted to the fingers 3432 of the cap 3078 and are hence readily available for replacing the spin-out cam 3306.

It will be understood that the embodiments described herein are merely exemplary and that a person skilled in the art may make many variations and modifications without departing from the spirit and scope of the invention. All such variations and modifications, including those discussed above, are intended to be included within the scope of the invention as defined in the appended claims.

We claim:

1. A fluid distribution system adapted for controlling the operation of a device for cleaning a swimming pool and the like, comprising a housing having an inlet for receiving a supply of pressurized fluid, a pair of outlet openings and a valve chamber positioned between said inlet and said outlet openings, said housing including a piston chamber positioned on one side thereof and having a first side, which is located adjacent said valve chamber and is in fluid communication with said valve chamber, and a second side, which is spaced outwardly from said first side; a piston movably mounted in said piston chamber so as to be movable between a first position, in which said piston causes one of said outlet openings to be closed, and a second position, in which said piston causes another of said outlet openings to be closed, said piston having a first side, which is located adjacent said first side of said piston chamber and has a first size, and a second side, which is located adjacent said second side of said piston chamber and has a second size which is greater than said first size of said first side of said piston, said piston having a passage extending therethrough so as to permit flow of pressurized fluid from said valve chamber to said second side of said piston chamber; and at least one valve in fluid communication with said second side of said piston chamber such that when said valve is in a closed condition, said second side of said piston chamber is pressurized by pressurized fluid flowing from said valve chamber to said second side of said piston chamber through said passage of said piston so as to cause said piston to move to its said first position and such that when said valve is in an open condition, said second side of said piston chamber is depressurized so as to cause said piston to move to its said second position, whereby flow of pressurized fluid from said valve chamber to one of said outlet openings is selectively controlled by causing said valve to be in said open or closed condition.

2. The system of claim 1, further comprising engaging means for engaging said valve so as to cause said valve to be in its open condition, said valve being in its closed position when said engaging means is disengaged from said valve.

3. The system of claim 2, wherein said engaging means includes a cam movable relative to said valve.

4. The system of claim 3, further comprising rotating means for rotating said cam about a rotational axis.

5. The system of claim 4, wherein said rotating means includes a turbine and a gear train connected to said cam.

6. The system of claim 1, wherein said piston includes a first body portion adjacent said first side and a second body portion adjacent said second side, said first body portion having a first diameter, said second portion having a second diameter, said first diameter being smaller than said second diameter.

7. The system of claim 6, wherein said piston chamber includes a first chamber section adjacent said first side for movably receiving said first body portion of said piston and a second chamber section adjacent said second side for movably receiving said second body portion of said piston.

8. The system of claim 7, wherein said first chamber section has a third diameter, and said second chamber section has a fourth diameter, said third diameter being smaller than said fourth diameter.

9. The system of claim 8, further comprising a first sealing member positioned between said first chamber section and said first body portion for inhibiting flow of pressurized fluid between said first chamber section and said first body portion.

10. The system of claim 9, further comprising a second sealing member positioned between said second chamber section and said second body portion for inhibiting flow of pressurized fluid between said second chamber section and said second body portion.

11. A device for cleaning a swimming pool and the like, comprising a body sized and shaped so as to be movable in a pool of water for removing debris therefrom; moving means, including a fluid-operated valve assembly, for moving said body in the pool of water; and a controller carried by said body and coupled to said moving means for controlling the operation of said moving means, said controller including at least one valve, which is in fluid communication with said valve assembly, a first cam, which has a first cam surface, and a second cam, which has a second cam surface, each of said first and second cams being movable relative to said at least one valve such that said first and second cam surfaces are independently engageable with said at least one valve, said at least one valve being movable between open and closed positions in response to the engagement of one of said first and second cam surfaces with said at least one valve, said moving means causing said body to move generally along a first path when said at least one valve is in its said closed position, said moving means causing said body to move generally along a second path different from said first path when said at least one valve is in its said open position, and said first and second cams being independently rotatable about a substantially common axis.

12. The device of claim 11, wherein said first and second cams are arranged in a stacked manner.

13. The device of claim 12, wherein said second cam is rotatable in a single direction; and wherein said first cam is pivotable between a pair of end points.

14. The device of claim 11, further comprising driving means for driving said first and second cams.

15. The device of claim 14, wherein said driving means includes a gear train, said first and second cams being driven by said gear train.

16. The device of claim 15, wherein said gear train includes first and second drive gears for driving said first and second cams, respectively.

17. The device of claim 16, wherein said first drive gear is interconnected to said first cam, said first drive gear being positioned laterally offset relative to said first cam; and said second drive gear is connected to said second cam, said second gear being positioned substantially coaxially relative to said second cam.

18. The device of claim 17, wherein said driving means includes a link connecting said first drive gear to said first cam such that said cam is pivotable between said end points in response to the rotation of said first drive gear;

said second cam is connected to said second drive gear such that it is rotatable conjointly with said second drive gear; and said driving means including a turbine rotatable so as to drive said gear train.

19. The device of claim 11, wherein said at least one valve includes a first valve and a second valve, both of which are in fluid communication with said fluid-operated valve assembly, said first and second cams being independently engageable with said first and second valves.

20. A device for cleaning a swimming pool and the like, comprising a body sized and shaped so as to be movable in a pool of water for removing debris therefrom; moving means, including a fluid-operated valve assembly, for moving said body in the pool of water; and a controller carried by said body and coupled to said moving means for controlling the operation of said moving means, said controller including a valve, which is in fluid communication with said valve assembly, and a cam, which has a cam surface, said cam being movable relative to said valve such that said cam surface is periodically engageable with said valve, said valve being positioned in an open position when it is engaged by said cam surface, said valve being positioned in a closed position when it is not engaged by said cam surface, said moving means causing said body to move generally along a first path when said valve is in its said closed position, said moving means causing said body to move generally along a second path different from said first path when said valve is in its said open position, said cam surface having a predetermined width such that said body is movable generally along said second path for a preset duration, said cam being removably mounted in said body such that it can be removed from said body and be replaced with a replacement cam including a cam surface which has a width different from said predetermined width of said cam surface of said cam so as to cause said body to move generally along said second path for a different duration.

21. The device of claim 20, wherein said body has an access opening for allowing said cam to be removed from said body through said access opening.

22. The device of claim 21, wherein said body has a cover removably attached to said body so as to cover said opening.

23. The device of claim 22, wherein said cover includes mounting means for removably mounting said replacement cam to said cover such that said replacement cam is carried in said body.

24. The device of claim 23, wherein said mounting means includes a mounting member projecting from said cover, said replacement cam including a hole therein, said mounting member releasably engaging said hole.

25. A device for cleaning a swimming pool and the like, comprising a body sized and shaped so as to be movable in a pool of water for removing debris therefrom; moving means, including a fluid-operated valve assembly, for moving said body in the pool of water; and a controller carried by said body and coupled to said moving means for controlling the operation of said moving means, said controller including a valve, which is in fluid communication with said valve assembly, and a cam, which has a cam surface, said cam being movable relative to said valve such that said cam surface is periodically engageable with said valve, said valve being positioned in an open position when it is engaged by said cam surface, said valve being positioned in a closed position when it is not engaged by said cam surface, said moving means causing said body to move generally along a first path when said valve is in its said closed position, said moving means causing said body to move generally along a second path different from said first path when said valve is in its said open position, said controller including a drive member rotatable about a first axis and coupled to said cam so as to cause said cam to pivot between a pair of end points about a second axis, and said second axis being laterally offset relative to said first axis.

26. The device of claim 25, wherein said controller includes a link connecting said drive member to said cam such that said cam is pivotable between said end points in response to the rotation of said drive member.

27. The device of claim 26, wherein said cam includes a plurality of openings arranged in an actuate manner, said link having an end sized and shaped so as to be coupled to one of said openings.

28. The device of claim 27, wherein said openings includes first and second openings, said first opening being positioned in said cam such that when said link is coupled to said first opening, said cam surface constantly engages said valve, whereby said body moves only along said first path, said second opening being positioned in said cam such that when said link is coupled to said second opening, said cam surface is constantly disengaged from said valve, whereby said body moves only along said second path.

29. A device for cleaning a swimming pool and the like, comprising a body sized and shaped so as to be movable in a pool of water for removing debris therefrom; moving means, including a fluid-operated valve assembly, for moving said body in the pool of water; and controller carried by said body and coupled to said moving means for controlling the operation of said moving means, said controller including a valve, which is in fluid communication with said valve assembly, and a cam movable relative to said valve, said cam being sized and shaped such that it can be positioned relative to said valve in a first position or a second position, said cam having first and second cam surfaces, respectively, said first and second surfaces being arranged such that, when said cam is positioned in said first position, only said first cam surface is engageable with said valve and such that, when said cam is positioned in said second position, only said second cam surface is engageable with said valve, said valve being positioned in an open position when it is engaged by one of said first and second cam surfaces, said valve being positioned in a closed position when it is not engaged by one of said first and second cam surfaces, said moving means causing said body to move generally along a first path when said valve is positioned in said closed position, said moving means causing said body to move generally along a second path different from said first path when said valve is positioned in said open position, said first and second cam surfaces having first and second widths, respectively, which are different from one another such that each of said first and second cam surfaces is engageable with said valve for a different duration, thereby causing said body to move generally along said second path for a different duration.

30. The device of claim 29, further comprising a filter bag having an upper end, a lower end, which is attached to said body for receiving from said body the debris removed thereby from the pool water, an inner cavity, which is in communication with said lower end for receiving from said lower end the debris received thereby from said body, a compartment, which is located adjacent said upper end and separated from said inner cavity by a seam formed in said filter bag, and a float member, which is retained in said compartment.

* * * * *

UNITED STATES PATENT AND TRADEMARK OFFICE
CERTIFICATE OF CORRECTION

PATENT NO. : 7,318,448 B2 Page 1 of 1
APPLICATION NO. : 10/282223
DATED : January 15, 2008
INVENTOR(S) : Eric C. Fleischer et al.

It is certified that error appears in the above-identified patent and that said Letters Patent is hereby corrected as shown below:

Column 1, line 8, delete the word "field" and replace with --filed--.

Column 1, lines 56-57, "thereth" and "rough" should be one word and read as --therethrough--.

Column 5, line 22, delete "SA" and replace with --5A--.

Column 7, line 42, delete "1C" and replace with --10C--.

Column 14, line 24, delete the word "position" and replace with --positioned--.

Column 14, line 50, add --.-- after the parenthesis at the end of the sentence.

Column 15, line 9, delete "Conn." and replace with --Connecticut--.

Signed and Sealed this

Sixteenth Day of September, 2008

JON W. DUDAS
*Director of the United States Patent and Trademark Office*